US005631835A

United States Patent [19]
Hagenbuch

[11] Patent Number: 5,631,835
[45] Date of Patent: *May 20, 1997

[54] APPARATUS FOR IDENTIFYING CONTAINERS FROM WHICH REFUSE IS COLLECTED AND COMPILING A HISTORICAL RECORD OF THE CONTAINERS

[76] Inventor: LeRoy G. Hagenbuch, 4602 N. Rosemead Dr., Peoria, Ill. 61614

[*] Notice: The term of this patent shall not extend beyond the expiration date of Pat. No. 5,416,706.

[21] Appl. No.: 483,681

[22] Filed: Jun. 7, 1995

Related U.S. Application Data

[63] Continuation of Ser. No. 403,069, Mar. 13, 1995, which is a continuation of Ser. No. 206,531, Mar. 4, 1994, Pat. No. 5,416,706, which is a continuation of Ser. No. 102,531, Aug. 4, 1993, Pat. No. 5,327,347, which is a continuation of Ser. No. 964,126, Oct. 20, 1992, abandoned, which is a continuation of Ser. No. 351,179, May 12, 1989, abandoned, which is a continuation-in-part of Ser. No. 874,273, Jun. 13, 1996, Pat. No. 4,831,539, and Ser. No. 717,042, Apr. 1, 1985, Pat. No. 4,839,835, which is a continuation-in-part of Ser. No. 604,739, Apr. 27, 1984, Pat. No. 4,630,227, said Ser. No. 874,273, Jun. 13, 1986, Pat. No. 4,831,539, is a continuation-in-part of Ser. No. 604,739, Apr. 27, 1984, Pat. No. 4,630,227.

[51] Int. Cl.$^6$ .................. G01G 19/415; G01G 19/08
[52] U.S. Cl. .................. 364/424.07; 364/567; 177/136
[58] Field of Search .................. 364/424.07, 567, 364/424.01, 403; 235/385, 462; 340/991, 994, 989; 177/139, 141

[56] References Cited

U.S. PATENT DOCUMENTS

| | | | |
|---|---|---|---|
| 1,113,609 | 10/1914 | Gamble | 177/4 |
| 1,261,508 | 4/1918 | Gamble | 346/7 |
| 1,986,308 | 1/1935 | Wallace | 177/4 |
| 2,586,137 | 2/1952 | Yoder et al. | 177/141 |
| 2,756,983 | 7/1956 | Furcini | 177/141 X |

(List continued on next page.)

FOREIGN PATENT DOCUMENTS

| | | |
|---|---|---|
| 493628 | 9/1977 | Australia. |
| 0060074 | 9/1982 | European Pat. Off.. |
| 2400447 | 11/1971 | France. |
| 2249787 | 5/1975 | France. |
| 2562659 | 10/1985 | France. |
| 8405278 | 10/1985 | France. |
| 57-15434 | 3/1982 | Japan. |
| 59/48187 | 3/1983 | Japan. |
| 58-84397 | 5/1983 | Japan. |
| 59/14540 | 1/1984 | Japan. |
| 59-176133 | 10/1984 | Japan. |
| 1049751 | 10/1983 | U.S.S.R.. |
| 1215275 | 12/1970 | United Kingdom. |
| 2025185 | 1/1980 | United Kingdom. |
| 2043921 | 10/1980 | United Kingdom. |
| 1593993 | 7/1981 | United Kingdom. |
| WO83/04451 | 12/1983 | WIPO. |

OTHER PUBLICATIONS

Brochure entitled "On–Board Truck Weighing System–Gateway To Production", distributed by Philippi–Hagenbuch, Inc., bearing a copyright notice of 1984.

(List continued on next page.)

Primary Examiner—Michael Zanelli
Attorney, Agent, or Firm—Leydig, Voit & Mayer, Ltd.

[57] ABSTRACT

An apparatus on-board a haulage vehicle interrogates a device having a machine-readable code, retrieves the code in conjunction with a loading event, senses the change in the load and generates data indicative thereof. The apparatus includes an electronic processor on-board the vehicle that collects the data and the machine-readable code. The data and code are correlated and compiled by the processor into a historical record of the loading events for later use. A memory is in communication with the electronic processor for containing the historical record. Preferably, the apparatus includes a mechanism for adding material to the load hauled by the vehicle, which brings the device having the machine-readable code into close proximity with a sensor. The sensor successfully retrieves the code only in conjunction with the adding of material to the load. In the illustrated embodiment, the material added to the load is from a container to which is secured the device having the machine-readable code.

3 Claims, 34 Drawing Sheets

U.S. PATENT DOCUMENTS

| | | | |
|---|---|---|---|
| 3,036,663 | 5/1962 | Burka | 177/141 |
| 3,154,160 | 10/1964 | Rockwell | 177/141 |
| 3,279,550 | 10/1966 | Kersten | 177/136 |
| 3,306,384 | 2/1967 | Ross | 177/141 |
| 3,321,035 | 5/1967 | Tarpley | 177/136 |
| 3,420,325 | 1/1969 | McAlister et al. | 177/141 |
| 3,531,766 | 9/1970 | Henzel | 177/136 |
| 3,545,558 | 12/1970 | Maugh | 177/136 |
| 3,559,820 | 2/1971 | Munson | 340/686 |
| 3,603,418 | 9/1971 | Schmidt et al. | 177/136 |
| 3,644,883 | 2/1972 | Borman et al. | 340/991 |
| 3,669,756 | 6/1972 | Bradley | 177/229 |
| 3,698,492 | 10/1972 | LeJeune | 177/208 |
| 3,743,041 | 7/1973 | Videon | 177/136 |
| 3,780,817 | 12/1973 | Videon | 177/136 |
| 3,800,895 | 4/1974 | Gale et al. | 177/136 |
| 3,813,171 | 5/1974 | Teach et al. | 356/152 |
| 3,854,540 | 12/1974 | Holmstrom, Jr. | 177/136 |
| 3,857,452 | 12/1974 | Hartman | 177/139 |
| 3,876,980 | 4/1975 | Haemming et al. | 340/991 |
| 3,878,908 | 4/1975 | Andersson et al. | 177/136 |
| 3,889,767 | 6/1975 | Scott et al. | 177/136 |
| 3,895,681 | 7/1975 | Griffin et al. | 177/141 |
| 3,899,924 | 8/1975 | Klein | 177/136 |
| 3,927,724 | 12/1975 | Baker | 177/136 |
| 3,940,630 | 2/1976 | Bergonz | 340/991 |
| 3,960,228 | 6/1976 | Nordstrom | 177/136 |
| 3,971,451 | 7/1976 | Norberg | 177/136 |
| 3,980,871 | 9/1976 | Lindstrom et al. | 364/567 |
| 4,009,375 | 2/1977 | White et al. | 340/988 |
| 4,009,591 | 7/1977 | Carr | 340/988 |
| 4,020,911 | 5/1977 | English et al. | 177/136 |
| 4,042,049 | 8/1977 | Reichow et al. | 177/137 |
| 4,049,961 | 9/1977 | Marcy | 250/202 |
| 4,067,061 | 1/1978 | Juhasz | 364/424 |
| 4,095,659 | 6/1978 | Blench et al. | 177/136 |
| 4,095,660 | 6/1978 | Johansson | 177/136 |
| 4,099,591 | 7/1978 | Carr | 180/98 |
| 4,103,752 | 8/1978 | Schmidt | 177/141 |
| 4,107,689 | 8/1978 | Jellinek | 343/112 |
| 4,108,262 | 8/1978 | Anderson | 177/136 |
| 4,119,900 | 10/1978 | Kemnitz | 318/587 |
| 4,123,933 | 11/1978 | Reid | 73/855 |
| 4,148,369 | 4/1979 | Mercer, Jr. | 177/136 |
| 4,178,015 | 12/1979 | Merriman et al. | 280/711 |
| 4,212,074 | 7/1980 | Kuno et al. | 364/466 |
| 4,217,588 | 8/1980 | Freeny, Jr. | 340/988 |
| 4,230,196 | 10/1980 | Snead | 177/141 |
| 4,249,623 | 2/1981 | McCauley | 177/136 |
| 4,258,421 | 3/1981 | Juhasz et al. | 364/424 |
| 4,263,973 | 4/1981 | Boulais et al. | 172/4.5 |
| 4,299,290 | 11/1981 | Nunes, Jr. | 172/4.5 |
| 4,309,758 | 1/1982 | Halsall et al. | 364/424 |
| 4,328,494 | 5/1982 | Goodall | 177/136 |
| 4,350,970 | 9/1982 | von Tomkewitsch | 340/988 |
| 4,361,198 | 11/1982 | Sjorgren | 177/141 |
| 4,384,628 | 5/1983 | Jackson | 177/137 |
| 4,393,951 | 7/1983 | Horst-Rudolf | 177/136 |
| 4,399,881 | 8/1983 | Theurer et al. | 177/137 |
| 4,411,325 | 10/1983 | Hamilton | 177/136 |
| 4,417,630 | 11/1983 | Weber et al. | 177/1 |
| 4,456,084 | 6/1984 | Miller | 177/141 |
| 4,468,968 | 9/1984 | Kee | 364/558 |
| 4,482,960 | 11/1984 | Pryor | 364/424 |
| 4,490,798 | 12/1984 | Franks et al. | 364/550 |
| 4,500,970 | 2/1985 | Daemmer | 364/513 |
| 4,505,344 | 3/1985 | Hobbs et al. | 177/136 |
| 4,511,974 | 4/1985 | Nakane et al. | 364/403 |
| 4,520,443 | 5/1985 | Yuki et al. | 364/424 |
| 4,542,461 | 9/1985 | Eldridge et al. | 364/424 |
| 4,563,739 | 1/1986 | Gerpheide et al. | 364/403 |
| 4,588,038 | 5/1986 | Takagi | 177/141 |
| 4,605,081 | 8/1986 | Helmly, Jr. et al. | 177/25.13 |
| 4,606,419 | 8/1986 | Perini | 177/209 |
| 4,627,013 | 12/1986 | Ichiyama et al. | 364/567 |
| 4,630,227 | 12/1986 | Hagenbuch | 364/567 |
| 4,635,739 | 1/1987 | Foley et al. | 177/141 |
| 4,645,018 | 2/1987 | Garbade et al. | 177/6 |
| 4,714,122 | 12/1987 | Appleton et al. | 177/139 |
| 4,722,656 | 2/1988 | Naab | 414/303 |
| 4,728,922 | 3/1988 | Christen et al. | 340/52 R |
| 4,771,837 | 9/1988 | Appleton et al. | 177/139 |
| 4,831,539 | 5/1989 | Hagenbuch | 364/449 |
| 4,835,719 | 5/1989 | Sorrells | 364/567 |
| 4,845,648 | 7/1989 | Hagenbuch | 364/567 |
| 4,852,674 | 8/1989 | Gudat | 177/141 |
| 4,854,406 | 8/1989 | Appleton et al. | 177/141 |
| 4,870,419 | 9/1989 | Baldwin et al. | 342/50 |
| 4,921,578 | 5/1990 | Shiraishi et al. | 177/136 |
| 4,949,263 | 8/1990 | Jurca | 364/424.07 |
| 5,004,392 | 4/1991 | Naab | 414/21 |
| 5,038,876 | 8/1991 | Smith | 177/139 |
| 5,046,007 | 9/1991 | McCrery et al. | 364/424.04 |
| 5,064,008 | 11/1991 | Smith | 177/1 |
| 5,065,828 | 11/1991 | Smith | 177/139 |
| 5,065,829 | 11/1991 | Smith | 177/139 |
| 5,304,744 | 4/1994 | Jensen | 177/136 |
| 5,326,939 | 7/1994 | Schafer | 177/139 |
| 5,327,347 | 7/1994 | Hagenbuch | 364/424.07 |
| 5,416,706 | 5/1995 | Hagenbuch | 364/424.07 |
| B1 4,839,835 | 1/1994 | Hagenbuch | 364/567 |

OTHER PUBLICATIONS

One page ad for a material handling device or storage system identified by the trademark name Load Bank, manufactured by Conveyor Logic Inc. No date.

Article on AGV (Automated Guided Vehicle) marketed by Caterpillar Co. along with General Electric Co. of Great Britain. Publication unidentified. No date.

Advertisement by Identification Device, Inc., Boulder, Co., on the System I.D.® Automated Vehicle Identification. Date unknown.

"Optodata® 5200, The Cable Eliminator" sales literature by Scientific Technology, Inc., including master price list, 1986.

Article "Bar Codes Hold 'Patent' on Document Tracking" in Automatic I.D. News, Sept., 1986.

Kaneno et al., "Construction Vehicle ID Transmitter for Carriage Data Collection and Management System," SAE Technical Paper Series, Int'l. Congress and Expo, Detroit, Michigan; Feb. 25—Mar. 1, 1985; pp. 29–41.

Catalog listing Telxon Portable Bar Code Scanners, Telxon Corporation, 1984.

Article entitled "Material Handling Makes Just–In–Time Work For AutoCon", by Clyde E. Witt, Material Handling Engineering, Nov., 1986.

Article from MIS Week entitled "JIT And The Receiving Room" by Bill Maraschie, May 19, 1986.

Advertisement from Automatic I.D. News on LXE's Radio Linked Data Communication LXE, a Division of Electro-magnetic Sciences, Inc., Nov., 1986.

Promotional brochure entitled "Dispatch At Work!" distributed at the Oct. 1982 American Mining Congress Quadrennial held in Las Vegas.

Promotional brochure entitled "Dispatch" distributed at the Oct. 1986 American Mining Congress Quadrennial held in Las Vegas.

"Computer Methods for the 80s In The Mineral Industry", edited by Alfred Weiss, Society of Mining Engineers/ A.I.M.E. 1979, pp. 735–742.

Brochure entitled "Quintette Coal Limited's Experience to Date within Its Computerized Truck Dispatch System", distributed at the April 1985 87th Annual General Meeting of CIM, held Apr. 21–25, 1985.

Pamphlet No. YM 18–103 NA entitled "Load Indicator for Ore Haulers" distributed by ASEA, Inc. of White Plains, New York. No Date.

Brochure entitled "Pactronics Load Analyzer", distributed by Pactronics Corporation of Cucamonga, California, bearing a copyright notice of 1978.

Brochure entitled "Hardware, Software, and System Considerations N Computer–Based Open Pit Mine Truck Dispatching", *ISA Transactions,* Vol. 22, No. 24, pp. 11–20, 1983.

Weed, Jr., "Motorola System Cobines Truck Dispatch With Remote Data Acquisition and Control At Reserve Mining Company", distributed at the Arizona Conference A.I.M.E. Annual Meeting held on Dec. 5, 1983.

Beaudoin, "Automatic Truck Dispatching–Mount Wright Operations", Open Pit Operations Conference, Canadian Institute of Mining and Metallurgy, Paper No. 2, 1977.

Mackie, "Communications + Computers = Innovative Mine Management" Society of Mining Engineers of A.I.M.E., No. 85–55, presented Feb. 1985.

White et al., "Computer Based Dispatching In Open Pit Mines", presented at the 12th Annual ISA Mining and Metallurgy Industries International Process Control Symposium, Vancouver, B.C., Canada, May 1984.

Gould, Inc. brochure, "Automatic Truck Dispatching and Identification System", dated Sep. 19, 1979.

Sassos, "Reserve's Mine Management System", *Engineering and Mining Journal,* Sep. 1984, pp. 42–49.

Motorola brochure, "Data Ranger/Mining Communications System", distributed by Motorola, Inc. at the 1982 American Mining Congress Quadrennial held in Las Vegas, Nevada.

Chironis, "Computer Monitors and Controls All Truck–Shovel Operation", *Coal Age,* Mar., 1985, pp. 50–55.

Arnold et al., "Computer–Based Truck Dispatching", Special Report: Surface Haulage Economics, Apr., 1983.

White, J.W. and J.P. Olson, "Computer Based Dispatching In Mines With Concurrent Operating Objectives", Society of Mining Engineers, 83–413. No date.

White, J.W., M.J. Arnold, and J.G. Clevenger, "Automated Open–Pit Truck Dispatching At Tyrone", *Engineering and Mining Journal,* Jun. 1982.

White, J.W., and L.T. Zoschke, "The Development Of A Computerized Truck Dispatching System", *Mining Magazine,* Dec. 1987.

Barnum, B.A., "Computerized Truck Dispatching At The Chino Mine—Installation And Operation Considerations", Society of Mining Engineers, Inc., Preprint No. 87–76, Feb. 1987.

Chironis, N.P., "Computer Monitors And Controls All Truck–Shovel Operations", *Coal Age,* Mar. 1985.

Arnold, M.J., and White, J.M., "Advance In Computer Dispatching", American Mining Congress, Apr. 1988.

Arnold, M.J., and White, J.W., "Computer–Based Truck Dispatching", Special Report: Surface Haulage Economics, *Mining Engineering,* Sep. 1983.

Webster, G., "Phelps Dodge Once Again Profits From Copper", *The Arizona Republic.* No Date.

Clevenger, J.G., "Dispatch Reduces Mining Equipment Requirements", *Mining Engineering,* Sep. 1983.

White, J.W., "Automated Haulage Control In North America", *International Mining,* Apr. 1988.

White, J.W., and Olson, J.P., "Recent Developments In Computer Based Dispatching", Society of mining Engineers of AIME, Oct. 1983.

White, J.W., Arnold, M.J., and Clevenger, J.G., "Automated Open–Pit Truck Dispatching At Tyrone", *Engineering And Mining Journal,* Jun. 1982.

White, J.W., and Olson, J.P., "Off–Highway Haulage In Surface Mines", A.A. Balkema/Rotterdam/Brookfield, 1989.

Lill, J.W., Gliddon, J.P., and Wade, G.C., "Palabora— Changing To Meet The Challenge Of The 80's", *Mining Engineering,* Aug. 1988.

Cotton et al., "Toronto Transit Commission Communications And Information System Evaluation Of Operation Tests," 30th Annual Conference Of The IEEE Vehicular Technology Society; Bohn Printing Co., Utica, Michigan; Sep. 15–17, 1980.

A Brochure entitled "Automatic Truck Dispatching and Identification System", Gould, Inc., Information Identification Division, Sep., 1980.

Article entitled "Automated Open Pit Truck Dispatching at Tyrone," Jun. 1982 issue of Engineering and Mining Journal.

Glotzl BaumeBtechnik's Publications on "Pressure Cell For Concrete Stress and Joint Pressure"; Jul., 1979.

Arnold et al., "Computer Dispatching Improves Open Pit Mining Efficiency" Presented at American Mining Congress Int'l. Mining Show, Las Vegas, NV; Oct. 5–9, 1986.

"Hardware, Software, and System Considerations In Computer–Based Open Pit Mine Truck Dispatching"; ISA Transaction, vol. 22, Nov. 4, presented at the ISA Conference May 5–7, 1982, Baker et al.

Article entitled "Air Cushions and Vehicle Tyres in Weighing Machines (How to Weigh an Elephant)", by Bradbury Controls, Ltd., Ross–On–Wye, Great Britain, Mar. 1984.

E–ZTRAC™ Truck Tracking System, ©1984—computer program written in COBOL which is a unique tracking system designed specifically for the Ready Mixed Concrete Industry.

Article by Speedcall Corporation entitled "Fleet Dispatch and Control Systems", Copyright 1984.

A Brochure for Motorola's "Automatic Vehicle Location System"; Copyright 1984.

Marcelo, Ben; "Selecting the Right Automatic Vehicle Location System"; Magnavox (no date).

Brochure entitled "The Answer to Increased Dispatch Efficiency," by the Alkon Corp., Columbus, Ohio; ©1985.

Harrington, L.H.; "Money–Saving Software," Traffic Management, Cahners Publishing Company, Apr. 1986.

"5th Wheel" Catalog Sheet by Structural Instrumentation, Inc. No date.

Advertisement in "Chillon's IAN Instrumentation & Control News, vol. 33, No. 12, Burr–Brown's Multibus"—Compatible Analog Input Board, Dec., 1985.

The Argo FMS 1330 "Report Card" Marketing Brochure Describing the Argo Fleet Management Systems. No date.

"The VMS TM–Setting New Standards for Vehicle Monitoring", publication by GLI Corp. of Woodinville, WA, published Dec. 1985.

Article on "Modems Take to the Airwaves" by M.David Stone, published in PC Magazine, Jan. 14, 1986, pp. 184–193.

A.H. Emery "Hytronic Totalizer" catalog sheet, Bulletin 2911, Dec. 5, 1985.

The "OEM–Bus Single Board Computer SYS–2Z" catalog sheets by the Robasic Corporation. No date.

"Construction Vehicle ID Transmitter for Carriage Data Collection & Management System" by Sumitomo Electric Ind. Int'l Cong. & Expo. Detroit, MI, Feb.—Mar. 1985.

Cost Savings Bulletin I describing "VMS TM As a Preventive Maintenance Tool" dated Jan. 13,1985.

Cost Savings Bulletin II describing "VMS TM As A Preventive Maintenance Tool" dated Sep. 6–8, 1985.

Cost Savings Bulletin III describing "VMS TM As A Preventive Maintenance Tool" dated Dec. 28–29, 1985.

Article on the AVM (Automatic Vehicle Monitoring) and AVL (Automatic Vehicle Location) Systems, pub. in Mobile Radio Technology; Sep. 1985, pp. 64–65.

Article in Design News entitled "Automatic Vehicle Locator 'On–The–Air'", Sep. 23, 1985, p. 29.

"Satellites Add More Accuracy To Locating Objects On Earth" article by D. Wessel, Staff Reporter of The Wall Street Journal. Date Unknown.

Advertisement by the Hawker Siddeley Dynamics Engineering Ltd. in The Mining Engineer for Mining Controls Capabilities, p. 332, date unknown.

Advertisement by Hawker Siddeley Dynamics Engineering Ltd. on the "Elements of An MVMM System". No date.

"Dynalink Mine Vehicle & Material Management System", Publication No. BSL 924, Issue No. 01, by Hawker Siddeley Dynamics Engineering Ltd., HSDE 1986.

"Fully Integrated Truck Information & Control Systems (TIACS)" by T.O. Jones & W. K. Tsuha, SAE Technical Paper Series, Truck & Bus Expo, Cleveland, OH, Nov. 7–10, 1983.

"Car 54, Where Are You? Just Check the Computer Map" Article in Business Week, Science & Technology Section, Aug. 12, 1985.

"Eye In Sky Will Keep Us From Getting Lost" article by John Hillkirk in USA Today, Mar. 5, 1986.

"Truck Management Systems Review" by V. Srajer, Canmet (Canada Centre for Mineral & Energy Technology) Calgary Coal Research Laboratory, Dec., 1985.

"Vehicle Monitoring System For Large Off–Highway Trucks", article of GLI Corp. in Mining Journal, Jan. 10, 1986.

"An Integrated Truck Management Information System (Truck MIS) Concept" Article by LeRoy G. Hagenbuch presented at CIM 2nd Dist. 5 Mtg. on Sep. 11, 1985.

"Analysis of Open–Pit Truck Haulage System by Use of a Computer Model" by J.H. Tu & V.J. Hucka of Univ. of Utah, in the CIM Bulletin, Jul., 1985, pp. 53–60.

Himebaugh, A.E.; "Computer–Based Truck Dispatching In the Tyrone Mine," Mining Congress Journal, Nov. 1980; pp. 16–21.

Riley et al., "Vehicle Tracking System for Salem, Oregon Police Dept." The Institute of Navigation, Proceedings of the National Technical Meeting, Jan. 21–23, 1986; pp. 89–94.

Brochure entitled "Laser Net TM—The Smart Sensor", Namco Controls, Mentor, Ohio; ©Apr., 1986.

Specification Sheet from Norand Data Systems RT1200 Radio Data Network, 1985.

Advertisement on Texlon's Portable Tele–Transaction Computers, (PCTs). No date.

Article entitle "Material Handling Makes Just–In–Time Work for Autocon", by Clyde E. Witt, Associate Editor, Material Handling Engineering, Nov., 1986.

Rockwell International Corporation's Fleet Management System entitled "TripMaster"; Jul., 1986.

Brochure for the "Merriman Windjammer" Air/Hyromechanical Actuation by Merriman Products, Inc., Jackson, Michigan. No date.

Contract report prepared by the Bureau of Mines, United States Department of the Interior, directed to "Off–Highway Haulage Truck Overload Detection". No date.

Brochure entitled "Merriman Windjammer Air/Hydromechanical Actuation", Merriman Products, Inc.

1. Merriman Products, Inc., Price list (Feb. 15, 1983).
2. Power Calculations—Wind–Jammer Assemblies, Merriman Products, Inc.
3. Manifold type fitting drawings W–31 to W–36 and T–39 to T–40,Merriman Products, Inc.

VMS Monitoring System by GLI Corp.

1. "Vehicle Monitoring System", features chart.
2. Cost Savings Bulletins entitled "VMS as a Diagnostic Troubleshooting Aid": No. DF: 2/1986.
3. Cost Savings Bulletins entitled "VMS as a Diagnostic Troubleshooting Aid":JC:12/1985.
4. Cost Savings Bulletins entitled "VMS As An Early Warning and Fault Detection Device": No. JD:1/1986.
5. Cost Savings Bulletins entitled "VMS As An Early Warning and Fault Detection Device": No. JC:2/1986.
6. Letter from D.J. DeLeo, Manager, Babitt Division of Reserve Mining Company dated Jun. 3, 1985 to John M. Curtis of GLI Corporation.
7. "Methods & Machines—Coarse Coal Slurry Transhipment System in Holland", Mining Journal, p. 24 (Jan. 10, 1986).
8. GLI Customer Reference List (Jan. 1986).
9. Vehicle Monitoring System Installation History as of Jan. 1986.
10. Recommended Parameter Monitoring List and Optional Parameter Monitoring List (Sep. 1985).
11. Vehicle Monitoring System Customer Sensor Selection Chart.
12. Vehicle Monitoring System Equipment Specification.
13. Brochure entitled "Coolant Level Sensor for Microprocessor–Based Vehicle Instrumentation Systems", item No. S113–7/1985.
14. Brochure entitled "Oil Level Sensor for Microprocessor–Based Vehicle Instrumentation Systems" item No. S114–7/1985.
15. Brochure entitled "Temperature Sensor for Microprocessor–Based Vehicle Instrumentation Systems"item No. S115–Jul. 1985.
16. Technical Bulletin No. 101 entitled "Snap Acceleration Power Test".
17. Vehicle Monitor System Operation Specification.
18. Standard Functions to Monitor chart.
19. Optional Functions to Monitor chart.
20. VMS—Periodic Performance Log.
21. VMS—Alarm Status Record.
22. MVMMS—Dynalink—Monitoring and Control Systems—Advance Information.

I Morrow Inc., "Vehicle Tracking System" brochure. No date.

Speedcall Corporation, "912A Automated Status Reporting Mobile Units" brochure. No date.

Speedcall Corporation, "916A Automated Status Reporting Control Console" brochure. No date.

Ready Mix article by Rick Tiller entitled, "Computers Closing the Gap Between Batching and Dispatching". No date.

Proceedings of 30th Annual Conference of the IEEE Vehicular Technology Society. International Conference on Transportation Electronics held Sep. 15–17, 1980 in Dearborn, Michigan. Item No. IEEE 80CH1601-4 SAE SP-90.

Advertisement of Telxon entitled, "Now you have no excuse for not reading. (Anywhere!)" No date.

Modular Mining Systems, Inc., "Field Communications System Interface Specification" issued Sep. 27, 1989, Revision No. MMS-89-FPSo1 (R4.3).

Brochure entitled, "Cat Truck Payload Measurement System", item No. AEDK1584. No date.

Article entitled, "Payload Measurement System on Off-Highway Trucks for Mine Applications" by A.W. Dickerson, A.J. Gudat, and R.G. Miller. No date.

Materials related to beacon detector by Glenayre Electronics,
1. MIDISS general introductory Brochure.
2. Block Sketch showing MIDISS truck mounted equipment items, interconnections, and required interfaces.
3. 6580 Mobile Microcomputer—brochure.
4. 6010 Proximity Beacon System—brochure.
5. 6528 Display Unit—brochure.
6. 9040 Mounting Rack—brochure.
7. 28000 Series DC–DC Converters—brochure.
8. Glenayre Drawing 031–0010–3 showing mounting Of 6420 Beacon Detector on a mine haulage truck.
9. Glenayre Drawing 03–0010–4 Bracket for Beacon Dector.
10. Glenayre Drawing 03–0010–ID and–3. Typical truck installation on WABCO 120 and 235 ton trucks. No date.

Motorola brochure entitled, "MCT–1200 Mobile Communications Terminal", item No. R3–8 4 38A. No date.

Article entitled, "Reduction in Mining Equipment Requirements Utilizing Dispatch", by J.G. Clevenger, Mine Superintendent, Phelps Dodge Corporation, Tyrone Branch, Tyrone, New Mexico 88065.

Modular Mining Systems brochure on Dispatch. No date.

Modular Mining Systems article entitled "About Modular Mining Systems". No date.

"Introduction to Automatic Truck Identification and Dispatching". Gould, Inc; Sep. 1980.

Advertisement from *E&MJ*, Sep. 1984 issue for Pyramid Parts.

Advertisement from *E&MJ*, Sep. 1984 issue for Dorr–Oliver.

Road Machinery Company brochure entitled "TPM–200 Truck Performance Monitor". No date.

*World Coal* article entitled, "Automatic Truck Dispatching Increasing Productivity", dated Mar./Apr. 1982.

Brochure entitled "Computer Directed Dispatch System" from Pincock, Allen & Holt, Inc. No date.

Paper entitled "Aspects of a Computerized Truck Dispatch System", from Pincock, Allen & Holt, Inc. No date.

GLI Corporation article entitled "Electronics in the Mining Industry". No date.

*Technology News* publication from the Bureau of Mines, United States Department of Interior. No date.

V. Srajer, "Truck Management Systems Review", Calgary Coal Research Laboratory, (Dec. 1985).

Dickerson, "Payload Measurement System on Off–Highway Trucks for Mine Applications". No date.

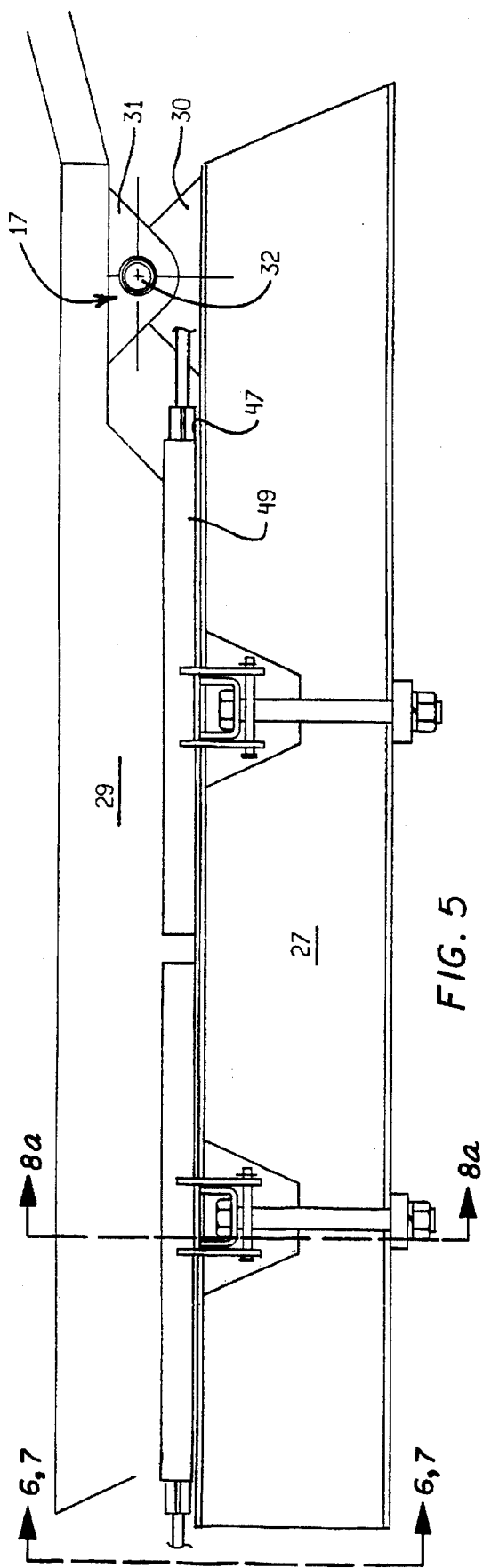

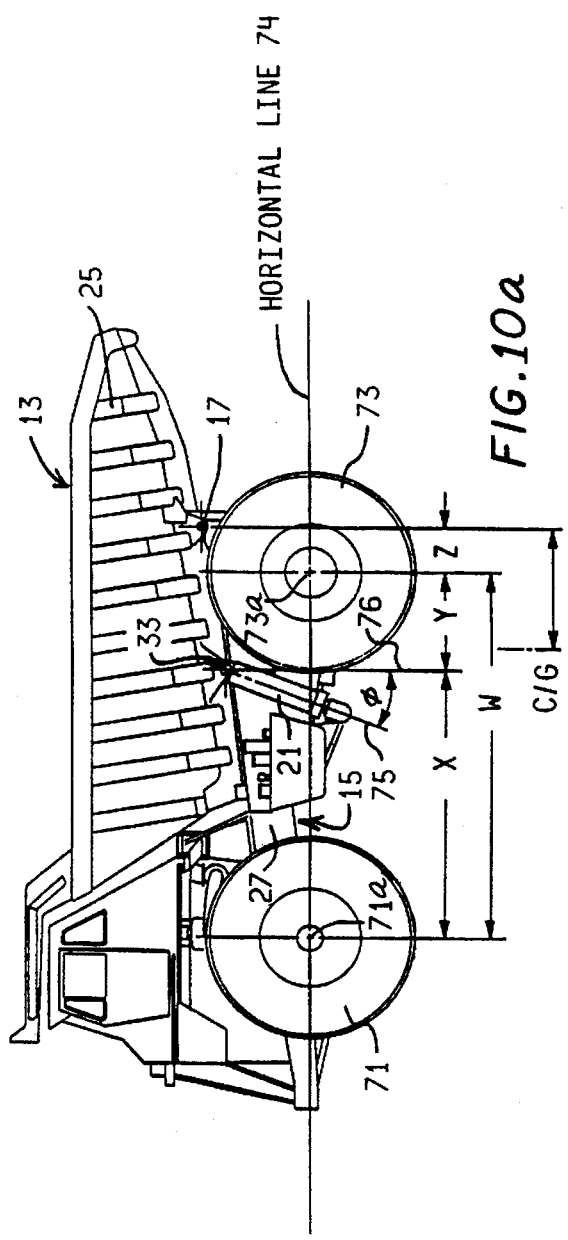
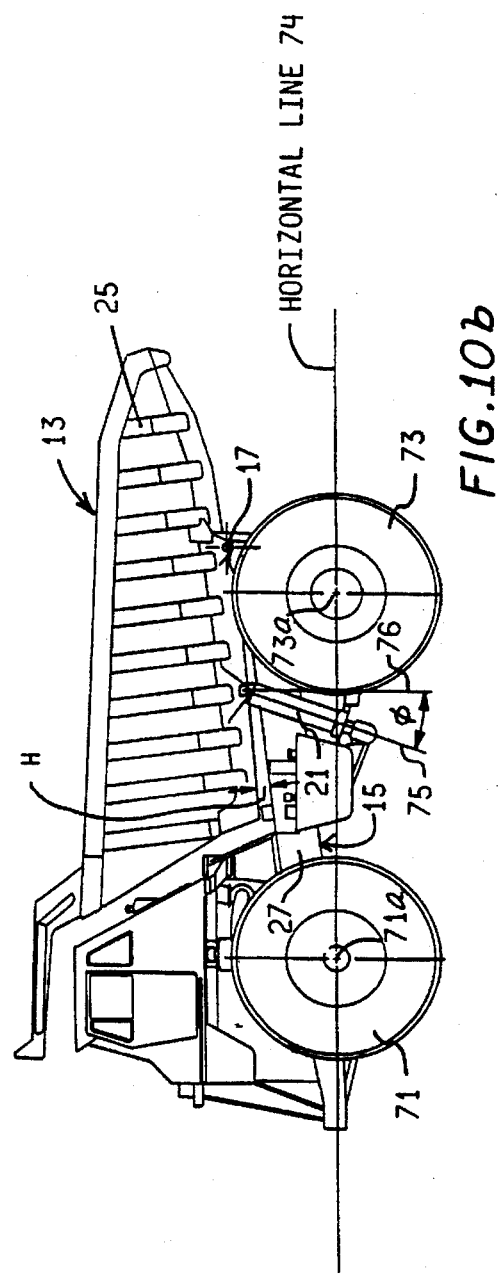

(ENTER FROM 277)

669 READ TIME

670 TIME OF NEW OPERATOR TAKING CONTROL = READ TIME

671 TIME UNDER OPERATOR CONTROL = TIME OF NEW OPERATOR TAKING CONTROL − TIME OF OLD OPERATOR TAKING CONTROL

672 TIME OF OLD OPERATOR TAKING CONTROL = TIME OF NEW OPERATOR TAKING CONTROL

673 AVG. WEIGHT OF BUCKET = TOTAL TONNAGE HAULED (STEP 1000) / TOTAL NO. OF BUCKETS (STEP 790)

674 AVG. WEIGHT OF LOAD = TOTAL TONNAGE HAULED (STEP 1000) / TOTAL NO. OF LOADS (STEP 1030)

675 AVG. NO. OF SPIKES PER LOAD = TOTAL NO. OF SPIKES (STEP 1040) / TOTAL NO. OF LOADS (STEP 1030)

676 T·MPH = RUNNING TOTAL (TON · MILE) (STEP 435) / TIME UNDER OPERATOR CONTROL (STEP 671)

677 AVG. HAUL CYCLE TIME = TIME UNDER OPERATOR CONTROL (STEP 671) / TOTAL NO. OF LOADS (STEP 1030)

678 BODY-UP DISTANCE PER BODY-UP LOAD = TOTAL BODY-UP DISTANCE (STEP 522) / TOTAL NO. OF BODY-UP LOADS (STEP 525)

680 AVG. NO. OF BUCKETS PER LOAD = TOTAL NO. OF BUCKETS (STEP 790) / TOTAL NO. OF LOADS (STEP 1030)

690 AVG. TIME BETWEEN BUCKETS = TOTAL ELAPSED LOADING TIME (STEP 850) / TOTAL NO. OF BUCKETS−1 (STEP 790)

700 AVG. MAX. ELAPSED TIME BETWEEN BUCKETS = TOTAL MAX. ELAPSED TIME BETWEEN BUCKETS (STEP 1020) / TOTAL NO. OF LOADS (STEP 1030)

710 PRINT
1. AVG. WEIGHT OF BUCKET
2. AVG. NO. OF BUCKETS PER LOAD
3. AVG. TIME BETWEEN BUCKETS
4. AVG. MAX ELAPSED TIME BETWEEN BUCKETS
5. AVG. NO. OF SPIKES PER LOAD
6. TOTAL TONNAGE HAULED
7. TOTAL NO. OF LOADS
8. AVG. WEIGHT OF LOAD
9. AVG. HAUL CYCLE TIME
10. TIME UNDER OPERATOR CONTROL
11. REAL TIME OF OPERATOR NO. CHANGE
    A) OLD OPERATOR NO.
    B) NEW OPERATOR NO.
12. BODY-UP DISTANCE PER BODY-UP LOAD
13. TOTAL DISTANCE DRIVEN (RETURN TO 280)

FIG. 14h

KEY TO FIGURES $T_1$ = 1st TYPE OF VEHICLE
$T_2$ = 2nd TYPE OF VEHICLE
$L_1$ = 1st LOADING AREA
$L_2$ = 2nd LOADING AREA
$D_1$ = 1st DUMP AREA
$D_2$ = 2nd DUMP AREA

APPARATUS FOR IDENTIFYING CONTAINERS FROM WHICH REFUSE IS COLLECTED AND COMPILING A HISTORICAL RECORD OF THE CONTAINERS

This is a continuation of application Ser. No. 08/403,069, filed on Mar. 13, 1995, which, in turn, is a continuation of Ser. No. 08/206,531, filed on Mar. 4, 1994, now U.S. Pat. No. 5,416,706, which, in turn, is a continuation of application Ser. No. 08/102,531 filed on Aug. 4, 1993, now U.S. Pat. No. 5,327,347, which, in turn, is a continuation of application Ser. No. 07/964,126 filed on Oct. 20, 1992 and now abandoned, which, in turn, is a continuation of application Ser. No. 07/351,179 filed on May 12, 1989 and now abandoned, which, in turn, is a continuation-in-part of application Ser. No. 06/874,273 filed on Jun. 13, 1986, now U.S. Pat. No. 4,831,539, and a continuation-in-part of application Ser. No. 06/717,042 filed on Apr. 1, 1985, now U.S. Pat. No. 4,839,835, both of which, in turn, are continuations-in-part of application Ser. No. 06/604,739 filed on Apr. 27, 1984, now U.S. Pat. No. 4,630,227.

TECHNICAL FIELD

The invention generally relates to the measuring of operating parameters of haulage vehicles and, more particularly, to the measuring and acquisition of data indicative of hauling conditions for haulage vehicles and collecting the data to create a historical data base for use in vehicle management.

BACKGROUND

Haulage vehicles are used in many diverse applications. For example, they are used to haul waste in urban areas and also to move earthen material in an environment such as an open-pit mine. The use of haulage vehicles in these types of environments typically require special construction considerations, making the vehicle the largest cost item in the operation. Replacement of the vehicles, which is necessary from time to time, involves large expenditures of capital. These and other factors have led vehicle fleet operators to search for ways to improve the effectiveness of the vehicles in order to lower costs and maintain a profitable operation in the face of declining markets and increasing, worldwide competition.

Often, haulage vehicles are subjected during their routine use to loads which differ greatly in weight because of different material density and/or the ability of some material to more tightly pack when loaded into the body of the vehicle. As a result, vehicle bodies which are generally filled to their full volume capacity may carry weight loads which exceed the weight capacity of the vehicle. Repeated occurrences of overloading result in the premature deterioration of the structural integrity of the vehicle, thus requiring repair or replacement of parts before anticipated. In order to avoid the damage caused by overloading, the vehicle body can be filled to a volume which assures the vehicle is not overloaded even for the most dense material. Although underloading may prevent the premature deterioration of the structural integrity of the vehicle, it sacrifices the vehicle's load-hauling efficiency. Therefore, a vehicle which is expensive to operate becomes even more expensive to operate when it is underloaded. Accordingly, there is a need to precisely measure the load carried by a haulage vehicle. This need has stimulated the development of on-board weighing devices that monitor and measure the vehicle's load.

Of course, in order to measure the on-board weight of a load carried by a vehicle, the vehicle must necessarily incorporate load sensors into its frame and/or body. In a dump-body vehicle, the body is movable on the frame of the vehicle between lowered and raised positions. To provide for this movement, the body is usually attached to the frame only by a pair of hinge assemblies and a pair of hydraulic cylinders.

In one approach to provide an on-board weighing device for a dump-body vehicle, load sensors are incorporated into the hinge assemblies and the hydraulic cylinders. Accordingly, in order to measure the load, the body must be lifted from its lowered position by the hydraulic cylinders so that the weight of the load is transferred to the frame through the cylinders and the hinge assemblies. Although the accuracy of the load measurements obtained from load sensors associated with the hydraulic cylinders and the hinge assemblies is satisfactory, the structural integrity of the vehicle may be degraded by modifications of the hinge assemblies and hydraulic cylinders required to incorporate the load sensors. Moreover, the impact of falling material onto the bed of the body is especially severe for the frame of the vehicle when the body is lifted slightly from its lowered position.

More important than the structural disadvantage of on-board weighing devices which incorporate load sensors in the hinge assemblies and hydraulic cylinders, is the disadvantage of requiring the body to be lifted off the frame in order to obtain a weight reading. Because this requirement consumes valuable time otherwise available for loading, hauling and unloading and because of the concentration of the load on the frame, the operator of the vehicle is discouraged from weighing the load; it is faster to approximate the load. Since the on-board weighing device interferes with an efficient and smooth hauling operation, there is a tendency to not use the weighing device. Therefore, the advantage of this on-board weighing device in dump-body vehicles has not been fully realized. Also, the requirement of lifting the body off the frame in order to obtain a weight measurement prevents continuous or periodic monitoring of the body's weight.

An approach to continuously monitoring and measuring the load carried by a haulage vehicle, is to use pressure gauges or similar type load sensors in the vehicle's suspension. Usually, in these types of weighing devices, the fluid pressure within a hydraulic suspension cylinder is sensed. Because of the relatively short stroke of the cylinder and the relatively large amount of frictional resistance to the cylinder's movement (the front cylinders normally also serve as the front axle spindles), the pressure reading is not a satisfactorily accurate indication of the vehicle's weight. In addition, the modification of the suspension to include load sensors opens the possibility of degrading the suspension system.

Because haulage vehicles often represent the bulk of the capital investment of a business utilizing such vehicles, their efficient management is of great importance. Even for small improvements in the efficiency of a vehicle and its fleet, significant savings can be realized. The lack of a convenient and accurate mechanism for weighing loads carried by a haulage vehicle has to some extent prevented such mechanisms from becoming important tools for effectively managing a vehicle. Management of individual haulage vehicles and vehicle fleets has historically been less than desired since management decisions have been based on inadequate information as to the day-to-day haulage performance of each vehicle.

SUMMARY OF THE INVENTION

It is the general object of the invention to provide an apparatus and method for accurately measuring loading and hauling parameters of a haulage vehicle and generate a data base for use in vehicle management. In this connection, it is an object of the invention to accumulate data related to loading and hauling parameters of a haulage vehicle and use the data to increase the efficiency of loading and hauling and also to provide a permanent record of vehicle use and the conditions under which it has operated.

It is an important object of the invention to provide an apparatus and method for measuring and indicating loading and hauling parameters of a haulage vehicle in order to provide an archive indicative of the type and degrees of use the vehicle has experienced.

It is another object of the invention to extend the usable life of a haulage vehicle by using loading and hauling parameters to prevent the unnecessary deterioration of the structural integrity of the vehicle resulting from hauling abuses such as weight overloading.

It is a further object of the invention to eliminate the inefficient hauling of loads by a haulage vehicle which results from the under-utilization of the full weight capacity of the vehicle and the uncoordinated routing of vehicles in a work area.

Other objects and advantages of the invention will be apparent from the following detailed description and the accompanying drawings.

Briefly, in accordance with the invention an on-board weighing device is provided for a haulage vehicle which continuously monitors the weight of the body of the vehicle on its frame. The body rests on the on-board weighing device such that the device forms an interface between the body and frame. A sensor processing unit mounted on the vehicle is responsive to signals from the on-board weighing device which are indicative of the weight of the body. From the load signals of the on-board weighing device, the sensor processing unit forms a data base from which the vehicle's hauling performance is evaluated. Alternatively, haulage signals from the on-board weighing device are received by the sensor processing unit and transmitted from the vehicle to a central station where the data base is formed. For a fleet of vehicles, the data bases of all the vehicles may be combined and used by the central station and its operator to synthesize management decisions. Moreover, the haulage data may be and preferably is enhanced by supplementing the signals from the on-board weighing device with signals from sensors that provide information related to haulage. For example, a tilt switch is preferably used in combination with the on-board weighing device when the haulage vehicle employs a dump body. Distance and time signals also provide useful and in some applications necessary information supplementing the weight data, depending on the use made of the data base comprising the accumulated data. Location data gathered from locally or remotely based signposts are also very useful, again depending on the application intended for the data base. Moreover, the downloaded data can be used in connection with a vehicle dispatch system whose dispatching decisions are based on historical haulage data gathered to form a data base.

BRIEF DESCRIPTION OF THE DRAWINGS

FIG. 5 is a side view of the preferred embodiment of the on-board weighing device according to the invention, taken substantially along the line 5—5 in FIG. 1b;

FIG. 6 is a schematic front view of the on-board weighing device according to a first embodiment of the invention, taken along the line 6—6 in FIG. 5;

FIG. 7 is a schematic front view of the preferred embodiment for the on-board weighing device according to the invention, taken along the line 7—7 in FIG. 5;

FIG. 9b is an exploded end view of a clamp portion of the clamping subassembly, taken along the line 9b—9b in FIG. 9a;

FIG. 10a is a side view of a heavy duty, off-road vehicle illustrating the relative dimensions of the vehicle used by the on-board weighing device of the invention to measure front and rear axial loads;

FIG. 10b is a side view of the heavy duty, off-road vehicle of FIG. 10a with the vehicle body slightly raised by the hoist cylinders in order for the on-board weighing device to complete a determination of front and rear axial loads;

FIGS. 14a–14m are flowchart diagrams for the software utilized in connection with the sensor processing unit of FIG. 12;

FIGS. 21 through 24 are flowchart diagrams for the software program of the central station preferably implemented in connection with the vehicle location system of FIG. 15a;

Figure 1A:
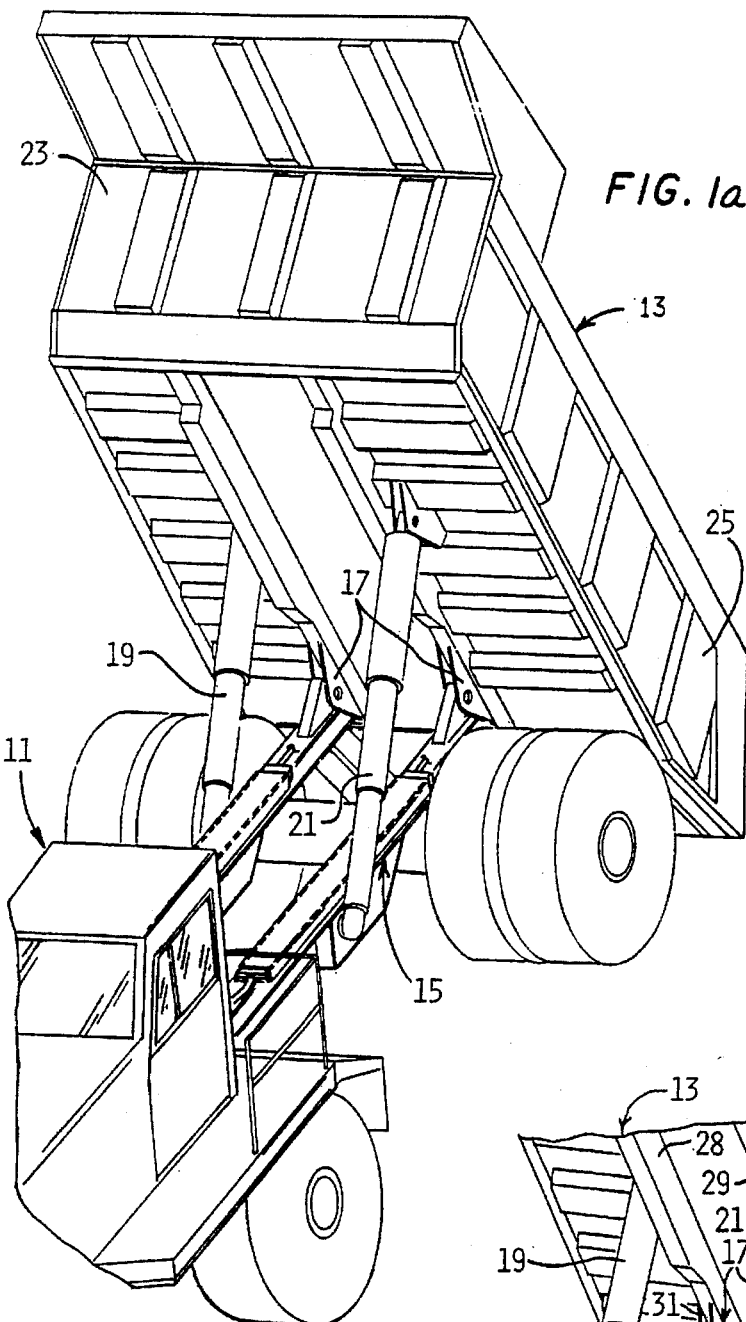
FIG. 1a is an elevated perspective view of a dump-body vehicle with the vehicle body in a raised or dump position so as to expose an on-board weighing device.

While the invention will be described in connection with a preferred embodiment and certain alternative embodiments, it will be understood that it is not intended to limit the invention to those particular embodiments. On the contrary, it is intended to cover all alternatives and equivalents as may be included within the spirit and scope of the invention as defined by the appended claims.

DETAILED DESCRIPTION OF THE PREFERRED EMBODIMENT

For purposes of aiding the readability of this detailed description, the following is a table of contents for this detailed description.

I. An Exemplary Vehicle, A Pivot Body
II. An Exemplary Vehicle, A Fixed Body
III. The Basic System
IV. Details of the On-Board Weighing System
  A. Hinge Assemblies
  B. Tubing
  C. Calibration of System
  D. Subassemblies of System
V. Measurement of Axle Weight Using System
VI. Measurement of Axle Load in a Scraper
VII. On-Board Electronics For System
  A. Basic Architecture
  B. Keypad Input for Operator I.D.
  C. Sensors
  D. Visual Indicators
VIII. Obtaining an Accurate Weight Reading
IX. Structure of Storage Areas
X. Main Operating Program
XI. Detection of Rough Road Condition and Loading of Vehicle
XII. Process of Obtaining Net Weight
XIII. Operator Summaries
XIV. Detection of a Load Imbalance
XV. Analysis of Loading Process
XVI. Loading Lights
XVII. Analysis of Axle Loads
XVIII. Totaling of Parameter Values at End of Haul Cycle
XIX. Real-Time Downloading of Data
  A. Downloading to Implement Automatic Dispatching
    (1) On-Board Processing
    (2) Processing at Central Station for Dispatching
    (3) Biased Dispatching
  B. Downloading to Implement Management of Vehicle Usage Using Data Files
    (1) Estimate Load Cycle Time
    (2) Monitor Loaders
    (3) Excess Hauling or Loading Capacity
    (4) Vehicle Maintenance Using Code Entries
XX. The System as Applied to a Refuse Hauling Vehicle I. An Exemplary Vehicle, A Pivot Body Turning to the drawings, and referring first to FIGS. 1a and 1b, an off-road vehicle 11 is exemplary of the types of vehicles suitable for hauling in an open-pit mine. The vehicle 11 includes a vehicle body 13 which is hinged to the vehicle frame 15 at hinge assemblies 17. By controlling the extension of telescoping hydraulic cylinders 19 and 21, the vehicle body 13 is pivoted between a fully inclined or dump position and a lowered or rest position. One end of each hydraulic cylinder 19 and 21 is fastened to a hinge assembly located on the bottom of the vehicle body 13. The opposing end of each cylinder 19 and 21 is fastened to an articulation on the vehicle frame 15. Structurally, the vehicle body 13 consists of steel panels 23, which form the shape of the body, and beams 25 which provide the structural framework of the body. Since other dump-body vehicles may also use the on-board weighing device of this invention, the vehicle in FIGS. 1a and 1b is intended as an exemplary vehicle frame and vehicle body utilized in connection with the invention.

Figure 1B:
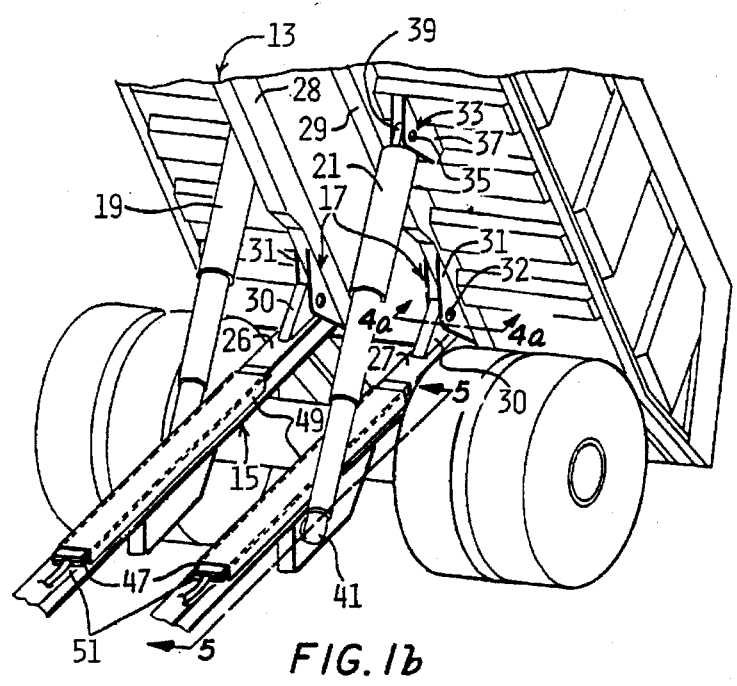
FIG. 1b is an enlarged elevated perspective view of the dump-body vehicle in FIG. 1a that more clearly shows the on-board weighing device.

Often, off-road vehicles, such as the one shown in FIGS. 1a and 1b, are very large. For instance, it is not uncommon for the tire diameter of the vehicle to be as great as the height of an average man. Accordingly, the tremendous size of these vehicles makes them expensive to operate and repair. Since these vehicles represent both a large capital investment and a large operating expense, preventing both overloading of the vehicle body and under-utilization of the vehicle's load capacity (i.e., underloading) are important considerations in insuring the vehicle is operated in the most profitable manner. In particular, if the vehicle is overloaded it will tend to have a shorter usable life because of the excessive wear caused by the overloading. On the other hand, if the vehicle is underloaded, the vehicle must be operated over a longer period of time, thereby consuming more fuel and wearing the vehicle's parts to a greater degree. Therefore, the ability to accurately measure the load carried by the vehicle is important to the efficient operation of large off-road vehicles. Also, since these off-road, heavy duty vehicles are extremely expensive to operate, loading and hauling parameters indicative of vehicle performance can be of great economic value by using the parameters to discover areas of the performance which may be improved. More generally, the efficient use of these vehicles can substantially effect operating expenses. Efficiency can be increased by optimizing load weights, minimizing transit times and carefully using collected data for scheduling needed maintenance.

As most clearly shown in FIG. 1b the vehicle frame 15 is composed of two parallel beams 26 and 27 connected by transverse beams (not shown) to form a support surface for the vehicle body 13 over the rear axle of-the vehicle. In order to provide a pivot axis for the vehicle body 13, each of the hinge assemblies 17 integrally connects one end of each of the parallel beams 26 and 27 to one of beams 28 and 29 on the underside of the vehicle body. In its lowered position, the beams 28 and 29 of the vehicle body 13 mate with the beams 26 and 27 of the vehicle frame 15. When the vehicle body 13 is in its lowered position, the entire weight of the vehicle body and its load is transferred to the vehicle frame 15 by way of the interface between the beams 26 and 27 of the frame and the beams 28 and 29 of the body.

Each of the hinge assemblies 17 includes first and second complementary hinge members 30 and 31 which are secured to the frame 15 and body 13, respectively, and interconnected by a pivot pin 32. The hinge assembly 17 is constructed to provide a "floating" assembly so that no weight is transferred to the frame 15 via the assembly when the body is in its lowered position. The hydraulic cylinders 19 and 21 and the vehicle body 13 are interconnected by hinge assemblies 33. (Only one of the hinge assemblies 33 can be seen in the view of FIGS. 1a and 1b). Hoist pins 35 interconnect the complementary hinge members 37 and 39 of the hinge assemblies 33. Although, as the cylinders extend, the hinge assemblies 33 accommodate the relative repositioning between the hydraulic cylinders 19 and 21 and the vehicle body 13, articulating assemblies 41 (only one is shown in FIGS. 1a and 1b), which connect the cylinders to the vehicle frame 15, allow a similar relative repositioning between the hydraulic cylinders and the vehicle frame 15.

Ordinarily, cushioning support materials such as rubber pads (not shown) are added along the length of the two-parallel beams 26 and 27 of the vehicle frame 15 so when the vehicle body 13 is in its lowered position the material provides a cushioned interface between the beams 28 and 29 of the vehicle body and the beams 26 and 27 of the vehicle frame. In order to evenly distribute the weight of the vehicle body 13 along the length of the frame 15 and thereby provide the best possible weight distribution for the frame, the cushioning support material is characterized by a thickness dimension which, as explained hereinafter, cooperates with the hinge assemblies 17 when the vehicle body is moved to its lowered position. The cooperation of the cushioning support material and the hinge assemblies 17 frees the assemblies from supporting any of the vehicle body's weight when the body is in its lowered position.

Figure 3:
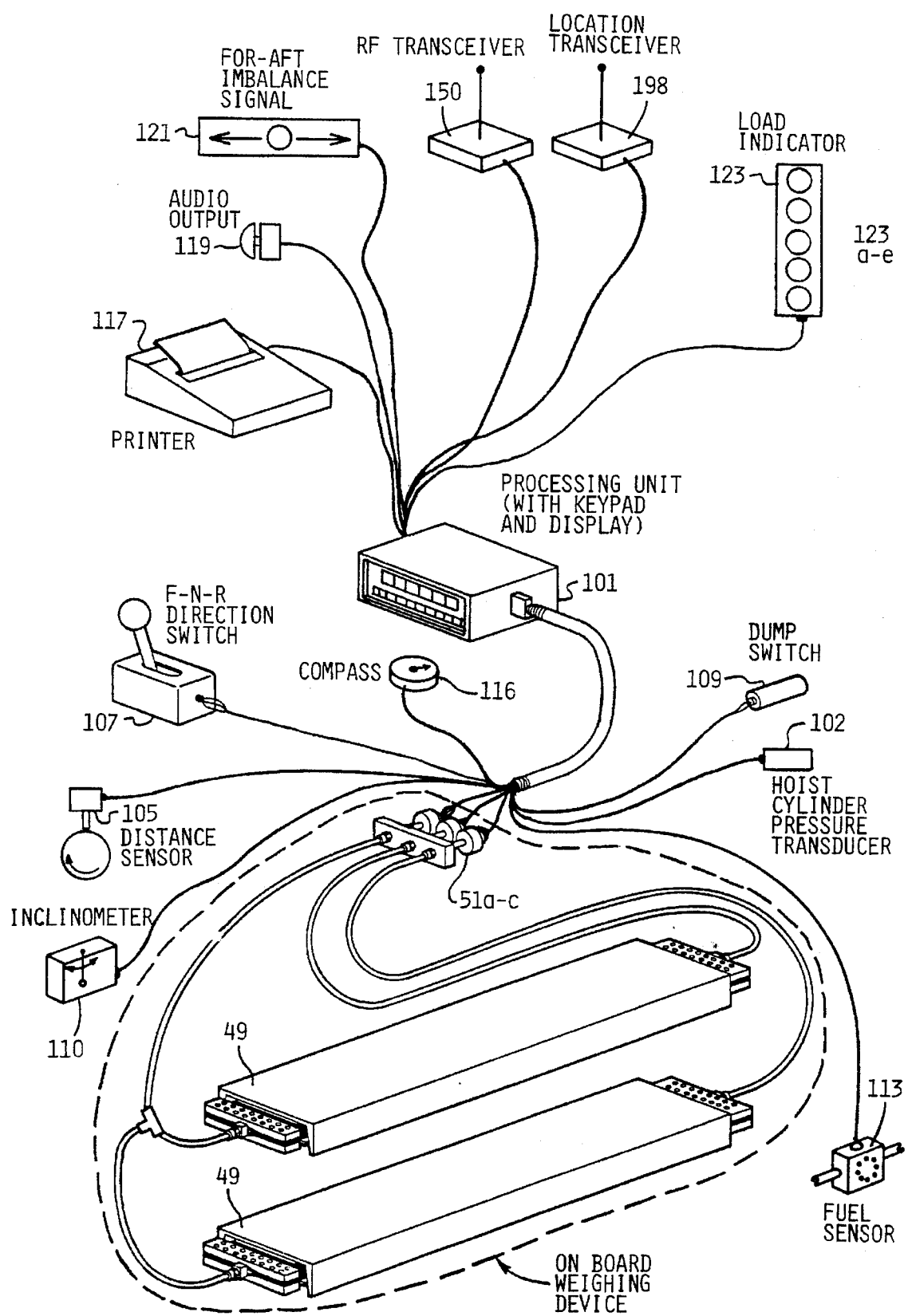
FIG. 3 is a system diagram of an on-board system according to the invention for monitoring, storing and analyzing vehicle parameters which includes the on-board weighing device as well as other sensor inputs.

In order to provide the critical hauling data required in connection with the invention, the cushioning support materials mounted by the vehicle manufacturer on the parallel beams 26 and 27 of the vehicle frame 15 are replaced by lengths of fluid-filled tubings that are laid along the lengths of the parallel beams to provide, when combined with pressure sensors, an on-board weighing device which accurately measures the weight of the vehicle body 13 while it is in its lowered position. Each of the tubings is capped by an inverted U-shaped metallic shield to protect the tubing at its interface with the vehicle body 13. The inverted U-shaped shields 49 which protect the tubings are free to move vertically on the parallel beams 26 and 27. Each of the fluid-filled tubings 47 is preferably divided into fore and aft sections which may be created either by clamping the center of one long tubing or providing two separate sections of tubing. At the ends of the fluid-filled tubings 47 is one of the pressure sensors 51a–c which measure the liquid pressure within the tubing. These pressure sensors 51a–c may be remotely mounted as indicated in FIG. 3. Preferably, the two aft-mounted tubings 47 are coupled by a T-joint in order to provide a single aft pressure reading.

The foregoing on-board weighing device is preferably a commercially available load sensor assembly used in connection with a vehicle weighing system identified as the OBDAS Vehicle Weighing System, manufactured and sold by Philippi-Hagenbuch, Inc., 7424 W. Plank Road, Peoria, Ill. 61604.

In addition to the tubing 47, the shields 49 and the sensors 51a–c, the on-board weighing apparatus includes a sensor processing unit 101, generally as illustrated in FIG. 3, that is responsive to signals from the sensors 51a–c. By providing the sensor processing unit 101, the raw pressure data from the on-board weighing device can be converted to useful hauling information for use in connection with efficient vehicle management. As a complement to the pressure data, the on-board weighing apparatus illustrated in FIG. 3 includes other input data sources which provide raw data to the sensor processing unit 101. As will be explained more fully hereinafter, in keeping with the invention the hauling information provided by the sensor processing unit 101 is accumulated on-board the vehicle or downloaded to a central station. The accumulated data may be simply used by management as historical information from which management decisions are made. Alternatively, the data can be used in real time for monitoring, locating and/or dispatching vehicles to particular locations in order to maintain operation of the vehicle fleet at peak efficiency.

II. An Exemplary Vehicle, A Fixed Body

Figure 2:
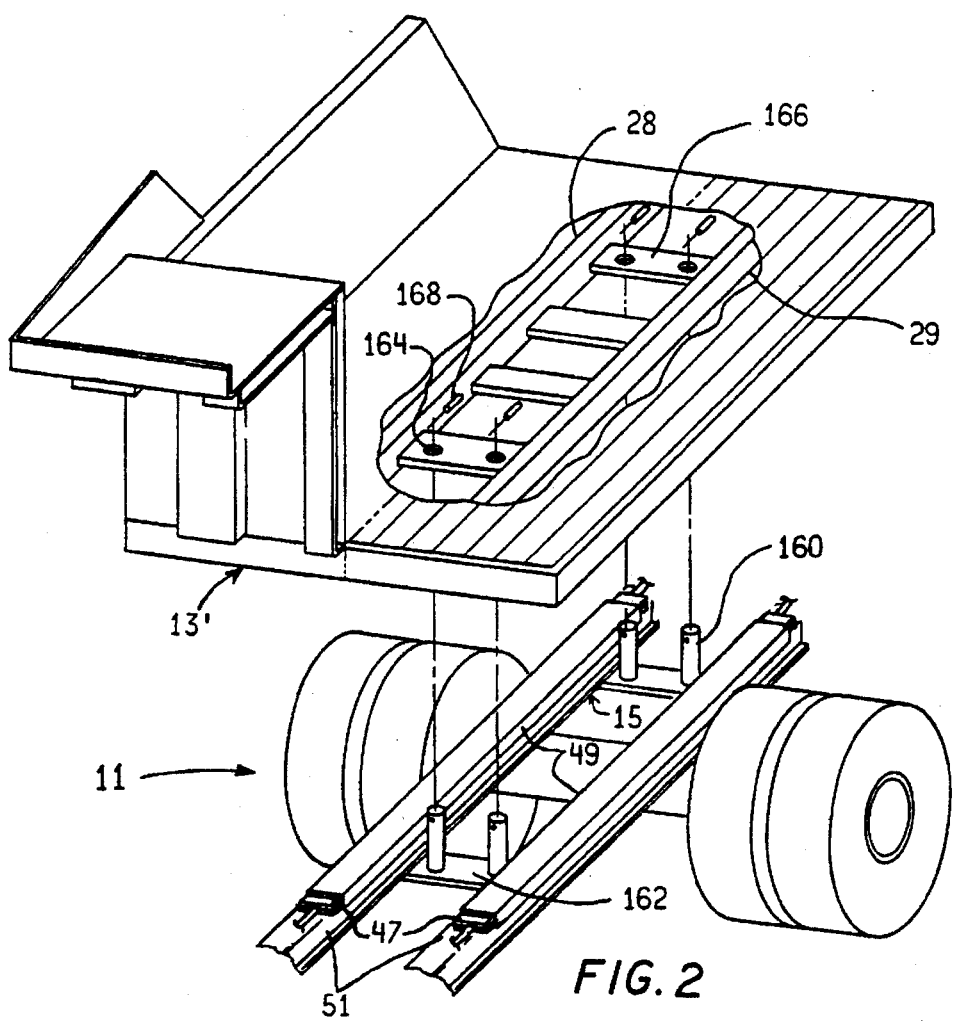
FIG. 2 is an exploded perspective view of a vehicle having a stationary body and supported on a frame incorporating the on-board weighing device according to the invention.

Referring to FIG. 2, a fixed body 13' fitted to the frame 15 of the vehicle 11 may also utilize the on-board weighing system of the invention. The particular means for coupling the frame 15 to the body 13' in FIG. 2 allows the full weight of the body to rest upon the tubings 47. The coupling means, pins 160 supported by cross members 162 of the frame 15 and cooperating bores 164 in cross members 166, prevent fore-and-aft or side-to-side movement of the body relative to the frame while, at the same time, allowing free vertical movement of the body 13'. In order to prevent the body 13' from accidentally freeing itself from the frame by bouncing high off the frame, a pin or similar retainer means 168 is secured at the top of the pins 160 in order to limit the vertical movement of the body. As indicated by FIG. 2, the stationary vehicle body 13' may in style be a dump-body, (the leftmost portion of the body 13'), a flatbed body (the rightmost portion of the body 13'), or it may be other known body types which suitably function as stationary bodies.

III. The Basic System

Referring to FIG. 3, in accordance with one important aspect of the invention, an apparatus for processing data derived from the weight of the load carried by the body of the vehicle 11 includes a sensor processing unit for receiving data from the presence transducers 51 and, in response thereto, detecting a change in the weight of the body and formulating data indicative of vehicle condition in response to changes in pressure data from the pressure transducers. Pressure data and indications of changes in the data are used by the sensor processing unit to establish a historical data base from which various hauling parameters may be monitored either by the sensor processing unit itself or by a remotely located central station (not shown) linked to the on-board processing unit by way of a transceiver.

In keeping with the invention, additional sensors are added to the vehicle 11 in order to provide data which reflects vehicle operating conditions and which complements the basic weight data. For example, a device for determining the location of the vehicle 11 in a work area is mounted on-board the vehicle and provides an input signal to the processing unit for correlation with incoming weight data and integration into the historical data base. As a complement to the weight and location data, the on-board system illustrated in FIG. 3 includes other input data sources which also provide raw data to a sensor processing unit. As will be explained more fully hereinafter, useful operator information is supplied via outputs from the sensor processing unit 101 in response to the pressure data from the on-board weighing device and its complementary transducers.

Referring to FIG. 3, the complementary input data sources for use with the on-board weighing device include, but are not limited to, a location transceiver 198 (either infrared or RF), a hoist cylinder pressure transducer 102, a distance sensor 105, a forward-neutral-reverse (F-N-R) direction switch 107, a dump switch 109, an inclinometer 110, a fuel sensor 113 and a compass 116. A keypad integral with the housing of the sensor processing unit 101 is used by the operator to request data and to enter information such as an operator number which identifies to the system the operator or vehicle status.

Various on-board outputs controlled by the processing unit 101 provide the vehicle operator with indications of vehicle operating conditions in response to the data base formed from the information provided by the on-board weighing device and its various complementary sensors. Specifically, a printer 117 provides a hard copy output for analysis by the vehicle operator or management personnel. An audio output 119 alerts the operator to situations requiring immediate attention such as side-to-side load imbalance. A fore/aft imbalance signal 121 gives a visual warning signal to the operator of the piece of loading equipment if the vehicle is loaded to carry too much weight in either the fore or aft area of the vehicle body. In order to provide the operator with non-permanent data information, such as current weight, a digital display is mounted to the housing of the sensor processing unit 101. Load indicator lights 123 are preferably mounted on the side of the vehicle in order to give the operator of the loading equipment an idea of the remaining capacity in the vehicle body as determined by a comparison of present weight with a stored maximum weight.

Finally, an RF transceiver 150 is provided in order to download accumulated data to a central station. As explained hereinafter, the system may elect for creation of the historical data base at the central station rather than on-board the vehicle. In connection with the downloading of data to the central station, vehicle management based on an analysis of the historical data base can be expanded to a coordinated effort between a plurality of vehicles. In other words, the downloaded data base from each vehicle is combined with data bases from other vehicles to form a fleet data base from which decisions involving the operation of an individual vehicle can be more easily made with regard to their impact on the overall fleet operation.

Downloading data from the vehicle 11 also provides the opportunity for management decisions to respond to new data in a manner which approaches a real-time response. In this regard, the system of the invention may be implemented to incorporate the automatic dispatching of vehicles to work areas based on decisions made by a centrally located computer using information from the historical data base.

The cooperation and interaction of the foregoing inputs and outputs in FIG. 3 will be set forth in detail hereinafter. It should be noted, however, that the particular management functions disclosed herein in connection with a management system using the historical data base are merely illustrative. The particular uses of the gathered data is dependent upon the management objective which is being implemented and the environment in which the vehicle is operating (e.g., hauling in an open pit mine or in an urban area).

IV. Details of the On-Board Weighing Device

(A) Binge Assemblies

Figure 4A:
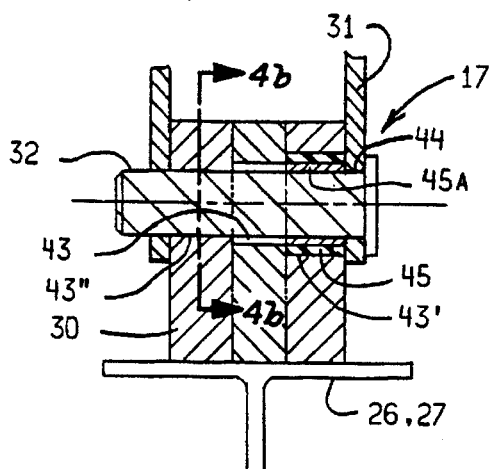
FIG. 4a is a cross-sectional view of one of the vehicle body hinge assemblies joining the vehicle body and frame, taken along the line 4a—4a in FIG. 1b and showing three alternative pivot pin assemblies offered by various vehicle manufacturers.

Turning now to specific subassemblies of the on-board weighing device and also several alternative embodiments of the device, FIG. 4a illustrates three alternative embodiments in one cross-sectional view in order to show common hinge assembly configurations offered by various vehicle manufacturers. Referring specifically to the center embodiment in FIG. 4a, in order to free the hinge assemblies 17 from the weight of the truck's load when the vehicle body is moved to its lowered position, oversized bores 43 of the hinge members 30 (the bores receive the body pivot pins 32) allow the hinge members 31 to lift the pivot pins 32 into a position which disengages the hinge member 30 from the hinge members 31. By providing the cushioning support material with a thickness dimension greater than the distance from the lowermost portion of the beams 28, 29 to the beams 26 and 27 when the beams are parallel, the engagement of the vehicle body with the cushioning support material causes the pivot pins 32 securely held by the bores 44 in the hinge members 31, to be lifted off the lower surfaces of the bores. Also, as is well known in the art, when the vehicle body 13 is moved to its lowered position and the telescoping cylinders 19 and 21 are fully collapsed, the hydraulic cylinders are released to a float position.

Accordingly, when the vehicle body 13 is moved to its lowered position, the entire weight of the vehicle body is transferred from the hinge assemblies 17 and hydraulic cylinders 19 and 21 to the body-frame interface provided by the cushioning support material between the beams 26, 27 and the beams 28, 29, wherein the latter are in parallel with the former. It will be appreciated that this cushioning support material is provided by the vehicle manufacturer in order to 1) cushion the mating surfaces between the beams 28, 29 of the vehicle body 13 and the beams 26, 27 of the vehicle frame 15, 2) provide a surface which lifts the truck's weight off the hinge assemblies 17 when the body is moved to its lowered position, thereby evenly distributing the truck's load along the length of the frame 15 and 3) allow for variations in parallelness between beams 26, 27 and beams 28, 29. As illustrated by the righthand embodiment of the hinge assembly in FIG. 4a, the oversized bores 43' of the hinge members 30 may be lined with a rubber-like material 45 and a sheathing 45a in order to dampen any excessive movement of the pivot pins 32 in the oversized bore and protect the wall of the bore from damage.

Because the thickness of the assembly comprising the fluid-filled tubings 47 and the metallic shields 49 is equal to the thickness of the cushioning material that they replace, the pivot pins 32 are lifted off the lowermost portion of the bores 43 when the vehicle body is moved to its lowered position. Accordingly, when the vehicle body 13 is lowered onto the parallel beams 26 and 27 of the vehicle frame, the entire weight of the vehicle body 13 and its load is transferred to the vehicle frame 15 by way of the interface provided by the fluid-filled tubings 47. As a result of the fluid-filled tubings 47 supporting the entire weight of the vehicle body 13 in its lowered position, an increase in liquid pressure sensed by the pressure transducers 51 which accurately represents the total weight of the vehicle body will occur. Not only do the fluid-filled tubings 47 provide a mechanism for measuring the total weight of the load carried by the vehicle body, they also provide the cushioned support between the vehicle body 13 and the vehicle frame 15 previously provided by the vehicle manufacturer's cushioning support material.

Figure 4B:
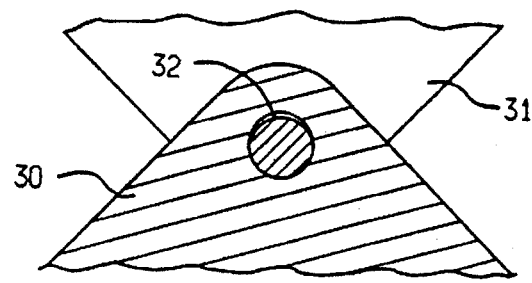
FIG. 4b is a sectional view of the vehicle hinge assembly taken along the line 4b—4b in FIG. 4a and showing a suggested modification to one of the pivot pin assemblies of FIG. 4a in order to make the hinge assembly "free-floating"

It will be appreciated by those familiar with off-road trucks that some manufacturers provide a cushioning support material between the vehicle body 13 and vehicle frame 15, but they do not provide a means to free the hinge assemblies 17 from supporting a portion of the weight of the vehicle body with the vehicle body in a lowered position. Such a hinge assembly is shown by the leftmost embodiment in FIG. 4a wherein the pivot pin 32 fits snugly within the bore 43". In accordance with the invention, these types of vehicles may be modified to allow all the weight of the body to be supported along the body-frame interface by machining small crescent profiles off the tops of the pivot pins 32 such that the profile of the pins is egg shaped. As illustrated by the modified pin 32 in FIG. 4b, this modification allows the hinge members 30 and 31 to disengage when the vehicle body is lowered onto the tubings 47, thereby enabling the pressure transducers 51 to measure the pressure from the full weight of the vehicle body.

(B) Tubing

Generally, the tubings 47 should be composed of material that is resistant to penetration by oil (oil is the most preferred liquid for filling the tubings). More importantly, the tubings 47 must not be susceptible to permanent deformation from the weight of the vehicle body 13. In particular, the tubings 47 should not include any type of braided wire that might permanently deform under external pressure. An example of a tubing suitable for use in connection with the invention is the Durathaue hose manufactured by the Snap-Tite Hose, Inc., Company of Pennsylvania. For any particular choice of hose, it must be wear and abrasion resistant. A modified fire hose may be used; an example of a preferred modified fire hose is a three-ply urethane fire hose (i.e., concentric layers of urethane, fiber and urethane) with an added inner identical 3 ply hose.

(C) Calibration of Weighing Device

Turning now to the calibration and programmed operation of the on-board weighing device and the sensor processing unit 101, initialization of the system will be explained with reference to the preferred embodiment of the invention. In connection with the alternative embodiments of the on-board weighing device, the modifications required to calibrate the sensor processing unit 101 and the modifications required to the program memory will be obvious to those skilled in the art from the following detailed description of the calibration of the on-board weighing device and programmed operation of the sensor processing unit for the preferred embodiment of the invention.

The calibration of the on-board weighing device may be illustrated by considering the case of a vehicle body 13 having a ten-ton empty weight and a 50-ton load capacity. In the preferred embodiment of the on-board weighing device, if the tubings 47 have a total combined effective surface area of 500 sq. in., the average pressure developed by the empty vehicle body 13 is 40 psi. A fully loaded vehicle body 13 (i.e., 50 tons) develops a pressure of 240 psi. By utilizing the pressure transducers 51a–c in connection with the tubings 47, an analog voltage output may be obtained which accurately measures pressures between 0 and 300 psi. The analog voltage output of the transducers 51a–c varies between two and six volts. For the vehicle body 13 having an empty weight of ten tons and a full load weight of 50 tons, the analog voltage from the transducers 51a–c is 2.53 volts for the weight of the empty vehicle body and 5.20 volts for the full load weight. Therefore, the voltage outputs of the transducers have a voltage range of 2.67 from no load to full load volts.

At the analog-to-digital converter 103d FIG. 12 (hereinafter referred to as an A/D converter) the output voltage from each of the pressure transducers 51a–c is converted from an analog voltage to a digital signal. The output from the A/D converter 103d is a binary-coded decimal number which—since it is proportional to the analog voltage from the pressure transducers 51a through 51c—is also proportional to the pressure on the tubings 47. Since the voltage output range of the pressure transducers 51a–c is between two and six volts, the A/D converter 103d converts two volts to a binary-coded decimal number close to zero (when the vehicle body is lifted off the sensors thereby creating a zero load condition) and correspondingly converts six volts to a binary-coded decimal number of approximately 255.

For the exemplary vehicle 11 having a ten-ton empty weight for the vehicle body 13, the foregoing calibration procedure provides, at the binary-coded decimal output of the A/D converter 103d, a decimal number of 34 when the vehicle body is in its lowered position. In comparison to the decimal number of 34 which represents an empty load, for a full load of 50 tons the output of the A/D converter 103d is a binary-coded decimal number of 204. Therefore, a decimal-range of 170 represents all vehicle body loads from empty to full. Therefore, with a pressure range of 200 psi (corresponding to a weight range from no load to full load) a range of 170 in the binary-coded decimal number from the A/D converter 103d gives a resolution of approximately 1.18 psi per decimal number.

Figure 12:
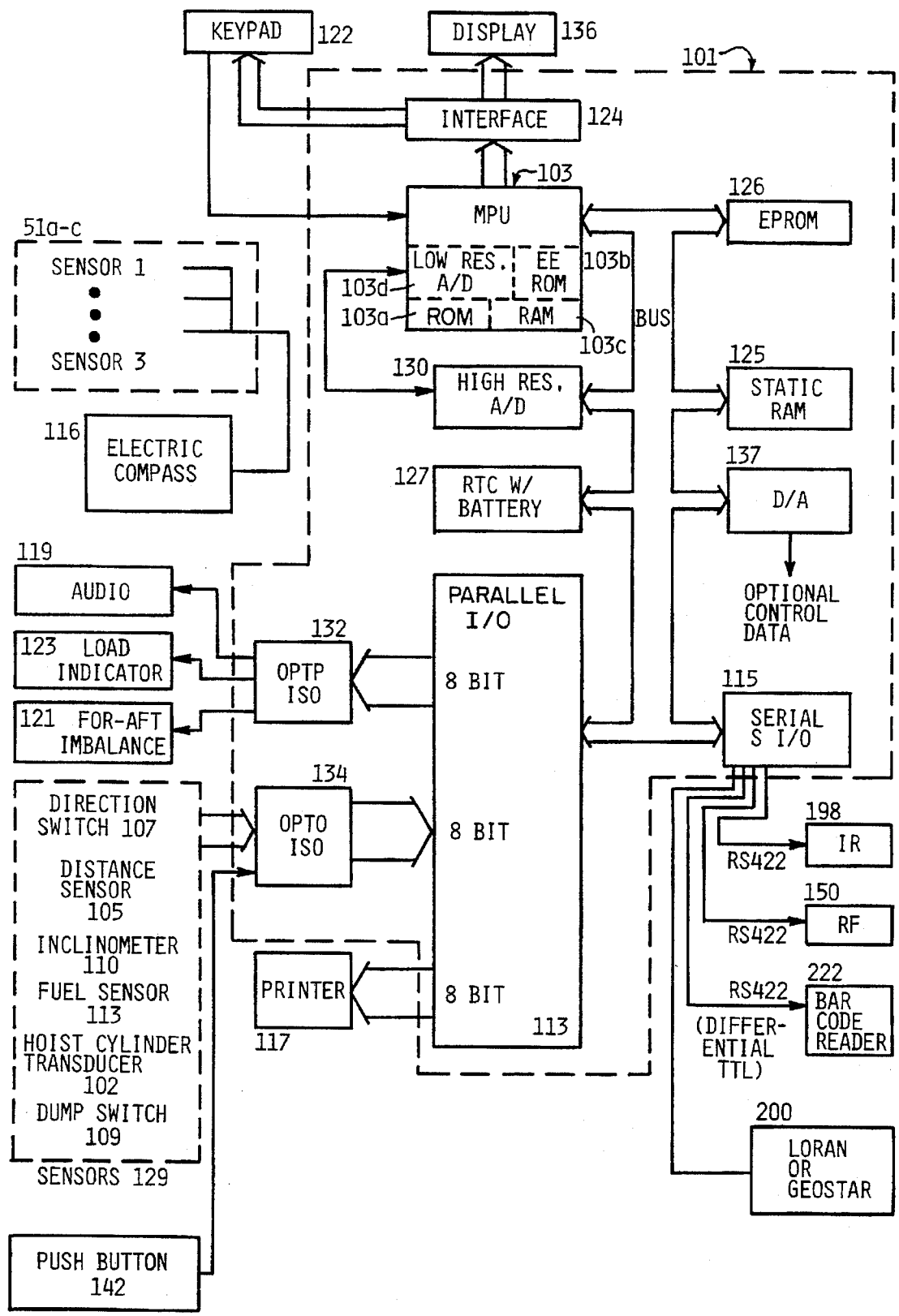
FIG. 12 is a schematic diagram of a sensor processing unit included in the on-board apparatus of FIG. 3.

In order to calibrate the on-board weighing device for measurement in an appropriate unit of weight (i.e., tons, pounds or kilograms), a conversion factor, which corrects for the contact area between the plate 60 (FIG. 7) and the desired units of weight, is manually set into the keyboard 122 in FIG. 12 and converted to a binary-coded decimal number by conventional circuitry associated with the keyboard. This binary-coded decimal number is delivered to the MPU 103 by way of the interface 124. At the MPU 103, the conversion value is multiplied with a binary-coded decimal number representing the previously calculated net pressure for the vehicle body. The resulting binary-coded decimal product represents the numerical value of the net weight of the vehicle body in tons, pounds or kilograms, depending on the conversion factor chosen. For example, the net pressure calculated from the pressure transducers 51a–c for a full load condition corresponds to a binary-coded decimal number of 170. The MPU 103 multiplies the binary-coded value of 170 by the binary-coded decimal number from the keyboard 122.

In order to set up the fluid-filled tubings 47 which support the vehicle body 13 in its lowered position over the vehicle frame 15, a liquid (e.g., oil) of relatively low viscosity is pumped into the tubings while the empty vehicle body is resting on the tubings, i.e., in its lowered position. Relatively low viscosity is chosen in order to ensure proper flow during winter temperatures. It should be noted that placement of the tubings 47 along the length of each beam 26 and 27 is important for accurate weight measurement. Specifically, the two tubings 47 on each beam are laid end-to-end such that the center of gravity of a load is always located between the two centers of the tubings.

At this point there is still a slight amount of contact between the pivot pins 32 and the lower portions of the bores 43 in the hinge members 30. Therefore, there is still a slight amount of body weight supported on the frame 15 through the hinge assemblies 17. In order to lift the pivot pins 32 off the hinge members 30, additional liquid is pumped into the tubings 47 until the pivot pins 32 are visually lifted off the lowermost portions of the bores 43. Although there is some downward vertical movement of the inverted U-shaped metallic shields 49 as the vehicle body 13 is loaded, the movement is not sufficient to cause the pivot pins 32 to re-engage the bores 43 of the hinge members 30. In order to minimize any change in contact area between the tubings 47 and the beams 26 and 27 and the shields 49, each tubing is filled to have a natural oblong cross-section as generally indicated in FIGS. 6 and 7.

At each pressure transducer 51a–c associated with the fluid-filled tubings 47, the liquid pressure is converted to an electrical potential which is delivered to electrical circuitry, discussed hereinafter, to calculate a weight measurement.

Referring to FIG. 5, each of the fluid-filled tubings 47 is preferably cut at its central area in order to provide two separate fluid-filled chambers. As previously indicated, such an arrangement allows each beam to have two tubings 47 whose centers are outside the center of gravity of a load. By cutting the tubings 47, each pressure transducer 51a–c supplies the electronic circuitry with an independent pressure reading. By dividing each tubing 47 into two chambers, the corresponding three pressure readings (the forward tubings are tied together) can be manipulated to provide an indication of the weight distribution of the load, e.g., too much weight fore, aft or side to side as will be discussed in greater detail hereinafter.

Each tube can be a unitary piece such as schematically shown in FIG. 6. Referring to FIG. 7, in order to provide an easily ascertainable amount of effective contact area between the fluid-filled tubings 47 and the shields 49, a contact plate 60 is preferably secured to the bottom of the channel formed by the shields in the preferred embodiment of the invention. The tubings 47 are filled with fluid so as to provide a contact surface along the entire cross-sectional width and length of the plate 60. There is a need to maintain an oblong cross-section of the tubing 47 in order to maintain contact between the plate 60 and tubing. Also, the tubings 47 are free from contacting the side walls of the shields 49. By the tubings 47 only contacting the bottom surface of plate 60, the weight can be accurately determined, i.e., pressure × area=weight.

(D) Subassemblies of System

Figure 8B:
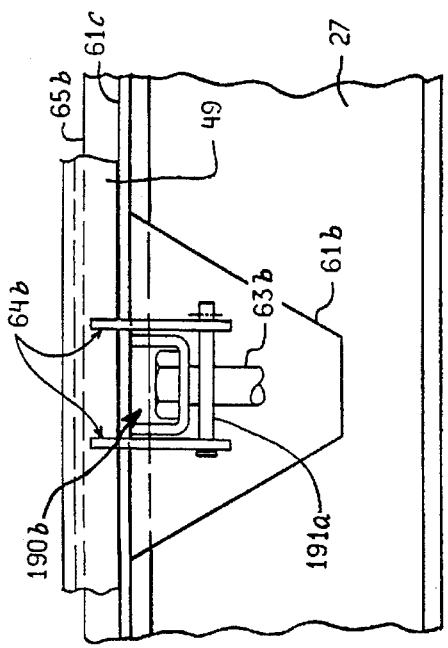
FIG. 8b is an enlarged partial side view of the on-board weighing device taken along the line 8b—8b in FIG. 8a showing details of the means for securing the device to the vehicle frame.
Figure 8A:
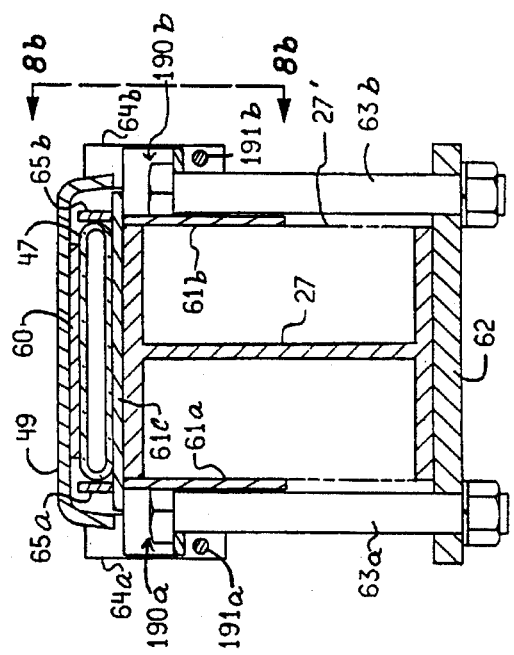
FIG. 8a is a cross-sectional view of the preferred embodiment for the on-board weighing device according to the invention, taken along the line 8a—8a in FIG. 5.

Turning to FIG. 8a, a more detailed cross-section of the apparatus comprising the on-board weighing device is shown. A subassembly, comprised of welded portions 61a, 61b and 61c illustrated in FIG. 8a, is provided for securing the on-board weighing device to each of the beams 26 and 27. The subassembly fits over each of the beams (beam 27 is shown in FIG. 8a). In order to secure the subassembly on the beam 27, a flat plate 62 is butted against the lower surface of the beam 27 and fastened to the portions 61a and 61b of the subassembly by way of nuts and bolts 63a and 63b, respectively. Referring to FIG. 8b in conjunction with FIG. 8a, outrigger pairs 64a and 64b are secured to the shield 49. Fitted between the pairs of outriggers 64a and 64b are bolt assemblies 190a and 190b, respectively, which are secured to side portions 61a and 61b, respectively. Because of rods 191a and 191b extending between the outrigger pairs 64a and 64b, respectively, the shield 49 is restrained from accidently coming free from its position over the tubings 47. Upward movement of the shield 49 and the integrally attached outrigger pairs 64a and 64b will cause the rods 191a and 191b to engage the bolt assemblies 190a and 190b, respectively. At the same time, the shield is able to move downwardly in response to the weight of the vehicle body.

The subassembly 61a–c is fitted over the top of the beam 27 such that the planar horizontal surface portion 61c provides the supporting surface for the tubing 47. The horizontal surface is welded to the two wing portions 61a and 61b in order to allow the first portion 61c to have a saddle-type fit over the top of beam 27. The shield 49 and plate 60 are fitted over the tubing 47 in the same manner as discussed in connection with FIG. 7. In order to provide horizontal stability for the tubing 47 and the shield 49, vertical guides 65a and 65b are integrally attached to opposing ends of the planar horizontal surface of portion 61c. The guides 65a and 65b cooperate to inhibit any side-to-side movement of the tubing 47. The dashed line indicated as 27' is included to indicate the beam 27 may be a square beam instead of the I-beam illustrated.

Figure 9B:
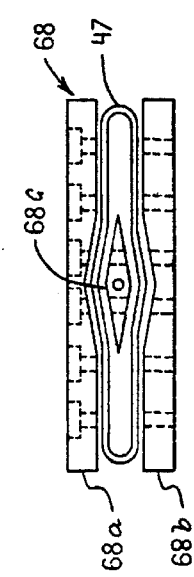
Figure 9A:
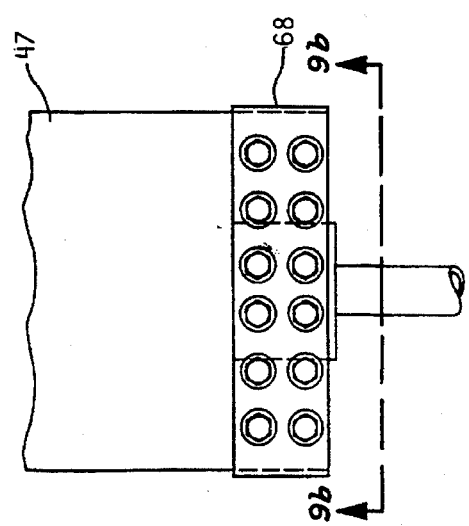
FIG. 9a is a plan view of a clamping subassembly of the on-board weighing device.

Referring to FIGS. 9a and 9b, an end clamp 68 at the end of each tubing 47 assures that the interface of the tubing 47 and each of the sensors 51a–c remains intact throughout the life of the on-board weighing device. End clamp 68 has top and bottom portions 68a and b, respectively, and also a center portion 68c as shown in the exploded view in FIG. 9b. The end clamp portion 68c includes a centrally-tapped hole for receiving a threaded extension of one of the sensors 51a–c which join to secure and seal the end of the tubing 47. Because of the pressure exerted on the tubings 47 when they support the weight of the vehicle body 13, there is a substantial force acting at the ends of the tubings. Each end of the tubings 47 must be terminated in a manner which assures the tubing will not rupture. As indicated by FIG. 9a, bolts secure the respective upper and lower sections of the end clamp 68.

V. Measurement of Axle Weight Using System

Referring to FIG. 10a, the off-road, heavy duty vehicle 11 includes a pressure sensor added to the hydraulic line connected to the hydraulic cylinders 19 and 21; by providing a pressure measurement from the hydraulic line of the hydraulic cylinder 21, in addition to the pressure measurement provided by the on-board weighing device, a determination can be made of the weight distribution of the load over the front and rear axles 71a and 73a, respectively, by summing moments about the hinge assemblies 17. By summing the moments about the hinge assembly 17, the location of the center of gravity of the load carried by the vehicle body 13 can be determined. By determining the location of the center of gravity of the load carried by the vehicle body 13, the relative distribution of the total weight of the load over the front and rear axles can be determined.

In order to determine the axle loads, the vehicle 11 may be schematically represented as a horizontal line 74 in FIGS. 10a and 10b which passes through both front and rear axles. In practice, the vertical height of the load's center of gravity is not important; therefore, the moment equation about the hinge assemblies 17 (the vertical height of the hinge assemblies is also ignored) gives the one dimension of the location of the center of gravity of the load which is important in determining the axle loads, i.e., its location relative to the front and rear axles.

In order to determine the location of the center of gravity of the load along the length of the vehicle 11 as shown in FIGS. 10a and 10b, the vehicle body must be lifted slightly from its lowered position as shown by the distance h in FIG. 10b in order that the hydraulic cylinders 19 and 21 provide a pressure reading indicative of the force required to pivot the vehicle body 13 about the hinge assemblies 17. By providing the horizontal line 74 with a calibration in predetermined units such as inches or feet, the horizontal placement of the center of gravity relative to the front and rear axles can be determined.

Since the hydraulic cylinders 19 and 21 are positioned at an angle $\Phi$ with respect to a vertical axis perpendicular to the horizontal line 74 in FIGS. 10a and 10b, the pressure reading from the pressure transducer associated with hydraulic cylinders 19 and 21 must be multiplied by cylinder area (to provide a force measurement) and by the cosine of the angle $\Phi$ in order to determine the vertical force at the cylinder hinge assembly 33. Although the angle $\Phi$ changes with the extension of the hydraulic cylinders 19 and 21, a predetermined value for the angle $\Phi$ can be stored in the memory of the processor associated with the on-board weighing device as discussed hereinafter since the vehicle body 13 need be raised only a slight amount (shown as the distance h in FIG. 10b) such that the angle $\Phi$ can be treated as a constant for purposes of determining the relative axle loads.

Once the vertical force at the cylinder hinge assembly 33 is determined, the equation for the moments about the body hinge assembly 17 and along the horizontal axis has only one unknown, i.e., the horizontal distance of the center of gravity from the body hinge assembly 17. The following equation expresses the relationship of the moments about the body hinge assembly 17:

$$(\text{Total Weight}) \cdot (C/G) - (\text{Cylinder Weight}) \cdot (\cos \Phi) \cdot (y+z) = 0 \quad (1)$$

wherein "Total Weight" is the most recent pressure reading from the on-board weighing device representing the load carried on the vehicle frame 15 multiplied by a predetermined constant to provide a force measurement, and C/G is the location of the center of gravity of the load projected onto the horizontal line 74; "Cylinder Weight" is the pressure from the pressure transducer in the hydraulic line to hydraulic cylinders 19 and 21 multiplied by the area of the cylinders; the angle $\Phi$ is the angle formed by the longitudinal axis 75 of the cylinder 21 and a vertical axis 76 in FIGS. 10a and 10b; and (y+z) is the distance on the horizontal line 74 between the body hinge assembly 17 and the cylinder hinge assembly 33. Solving for the location of the center of gravity, the equation is as follows:

$$C/G = \left[ \frac{\text{Cylinder Weight}}{\text{Total Weight}} \right] \cdot (\cos \Phi) \cdot (y+z) \quad (2)$$

With the horizontal position of the center of gravity located, the load on each axle can be determined by solving for the axle weights using the sum of the moment arms about the axle and along the horizontal line 74. For the front axle, the sum of the moments about the rear axle provides an equation for solving for the load on the front axle. The equation for the moment arms about the rear axle is as follows:

$$(\text{Weight on Front Axle}) \cdot (w) - (\text{Total Weight}) \cdot (C/G - z) = 0 \quad (3)$$

Solving for the weight on the front axle, the equation becomes, $$\text{Weight on Front Axle} = (\text{Total Weight}) \cdot \left( \frac{C/G - z}{w} \right) \quad (4)$$

To find the load on the rear axle, the sum of moments are taken about the front axle as set forth in the following equation:

$$(\text{Weight on Rear Axle}) \cdot (w) - (\text{Total Weight}) \cdot (w + z - C/G) = 0 \quad (5)$$

$$\text{Weight on Rear Axle} = (\text{Total Weight}) \cdot \left( 1 + \frac{z - C/G}{w} \right) \quad (6)$$

The weight of the frame of the vehicle 11 bearing on the front and rear axles (i.e., the tare weight) can be added to the calculated weights in order to provide total weights bearing on the front and rear axles. In measuring this tare weight, the vehicle body 13 may be removed from the vehicle 11 or the weight of the body attributable to the front and rear axles may be subtracted from the weight recorded by a platform scale. The resulting weight measurement may be stored in the memory of the electrical circuitry associated with the on-board weighing device as discussed hereinafter.

Since the horizontal distances represented by the values for w, x, y and z are known and since the pressure in hydraulic cylinders 19 and 21 is known when the vehicle body 13 is lifted slightly off the frame 15, the center of gravity for the load (weighed by the on-board weighing device) can be determined from equation two. Once the center of gravity for the load is determined, the distribution of the load between the front and rear axles, 71a and 73a respectively, can be easily determined from equations four and six.

VI. Measurement of Axle Load in a Scraper

Figure 11A:
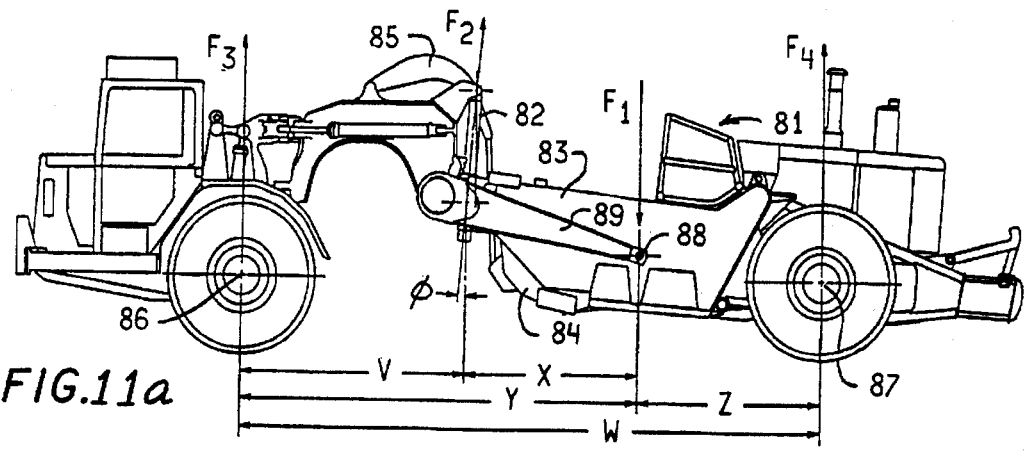
FIGS. 11a and 11b are side views of a scraper vehicle in its raised and lowered positions, respectively, illustrating the relative dimensions used to determine front and rear axial loads.
Figure 11B:
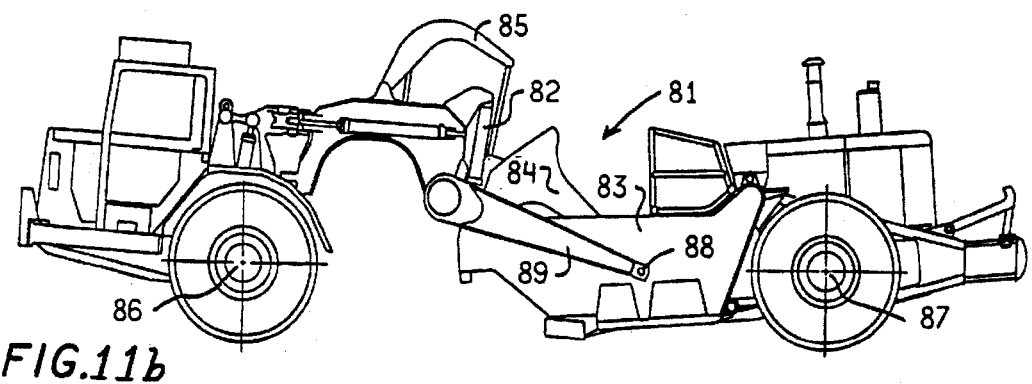

Determination of axle loads can be made in off-road vehicles of other types using a similar approach as disclosed in connection with the off-road vehicle of FIGS. 10a–10b. For example, a scraper vehicle 81, shown in its raised and lowered positions in FIGS. 11a and 11b, respectively, utilizes a pressure sensor in connection with its hoist cylinder 82 to determine the front and rear axle loads of the scraper. A scraper vehicle loads ground material into its body by lowering an open end of the body into contact with the ground. As the scraper moves forward, the ground material is swept into the body of the scraper by way of the lowered opening. In other words, the bottom edge of the body scrapes the ground surface, hence the name "scraper."

Figure 11C:
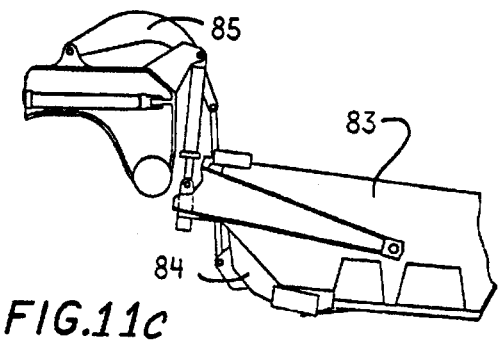
FIGS. 11c and 11d are partially side views of the scraper vehicle in FIGS. 11a and 11b, respectively, illustrating the relative positions of the vehicle's hoist cylinder and associated mechanisms.
Figure 11D:
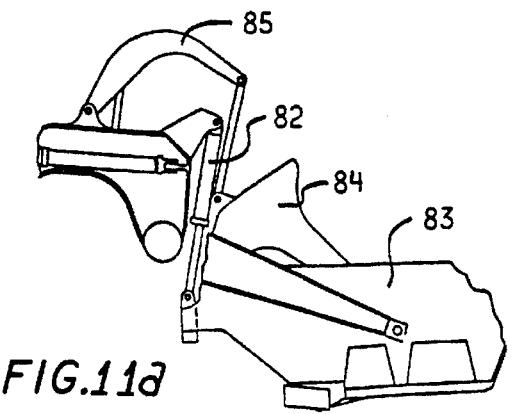

The mechanism which lifts and lowers the body 83 of the scraper 81 are most clearly shown in FIGS. 11c–11d. In its lifted or raised position, the hoist cylinders 82 (only one is shown) holds the body 83 off the ground. In order to prevent material from falling out of the body 83, a gate assembly 84 is provided to close the opening in the body 83 when it is in its lifted or raised position. Control of the gate assembly is provided by a linkage 85 in a well-known manner.

Referring back to FIG. 11a, longitudinal dimensions v, w, x, y and z of the scraper 81 are used to calculate axle load for the front and rear axles 86 and 87, respectively. In the same manner as used in connection with the axle load determination for an off-road vehicle, the moments about the front and rear axles serve as the tools to determine the axle loads.

Converting the pressure in the hoist cylinder 82, while the body 83 is in a raised position, to a force allows the axle loads to be determined. Since the hoist cylinder 82 is at a slight angle Φ from vertical, the force $F_2$ must be multiplied by cos Φ to find the vertical force for calculating the moment arm about the front axle. The equation is as follows:

$$O = F_3 y - (\cos\Phi \cdot F_2 x) \qquad (7)$$

$$F_3 = \frac{F_2 x \cdot \cos\Phi}{y}$$

where $F_3$ is the weight on the front axle 86 and $F_2$ is the force at the hoist cylinder 82 lifting the body.

Once the weight of the load is determined, the axle loads are easily calculated as follows:

$$O = F_4 z - (\cos\Phi \quad F_2 x) \qquad (8)$$

$$F_4 = \frac{F_2 x \quad \cos\Phi}{z}$$

where $F_4$ is the weight on the rear axle 87.

The foregoing calculation may be implemented by the circuitry and flowchart discussed in connection with FIGS. 12, 13 and 14a–m. Although the flowchart discloses steps for calculating the axle loads for a dump body vehicle using data gathered by the on-board weighing device and data from hoist cylinders, it will appreciated from the foregoing scraper discussion that similar software steps may be used in connection with the circuitry of FIGS. 12 and 13 to calculate scraper axle loads.

VII. On-Board Electronics for OBDAS (A) Basic Architecture

Referring now to FIG. 12, the electrical circuitry which provides on-board manipulation of the data received from the on-board sensors such as the on-board weighing device is provided by the sensor processing unit 101. Preferably, the sensor processing unit 101 is microprocessor based. As will be apparent to those skilled in the art, the sensor processing unit 101 includes a micro processing unit 103 (hereinafter MPU 103), associated internal memory in the form of a ROM 103a, EEROM 103b, a read/write memory RAM 103c, and an analog-to-digital converter 103d. A particular example of a MPU suitable for the sensor processing unit 101 is the MC68HC11 microprocessor manufactured by Motorola Corporation of Schaumburg, Ill.

In conventional fashion, emanating from the MPU 103 is a microcomputer bus 111. The microcomputer bus 111 includes data lines, memory lines and control lines. The bus 111 is connected to input/output ports 113 and 115, that are parallel and serial ports, respectively. The microcomputer bus 111 communicates to a load light array 128 and several of the on-board sensors (generally indicated in block 129) by way of parallel input/output port 113 via optical isolators 132 and 134. The printer 117 communicates directly to the input/output port 113. The load light array 128 in FIG. 12 is intended to represent the load lights that may be placed on board a vehicle. Block 129 is intended to represent the sensors that may provide data to the sensor processing unit 101.

In order to provide the sensor processing unit 101 with a means for accepting manual inputs, the microcomputer bus 111 is connected to a keypad 122 by way of an interface 124. For example, the keypad 122 provides the sensor processing unit 101 with a conversion factor for converting the stored pressure readings to weight values in tons, pounds or kilograms. The display 136 preferably mounted to the housing of the sensor processing unit 101 receives signals from the MPU 103 via the interface 124.

A static RAM memory 125 is connected to the MPU 103 via the bus 111 in order to provide for storage of data collected between successive occurrences of data downloading. Also in communication with the MPU 103 via the bus 111 is an EPROM 126 that contains the program instructions executed by the MPU and a real time clock and battery 127.

The sensors 51a–c of the on-board weighing device provide the circuitry of FIG. 12 with analog electrical signals which are linearly proportional to the pressure exerted by the tubing fluid. Since the pressure of the tubing fluid is linearly proportional to the weight of the vehicle body 13 and since the sensors 51a–c reflect the tubing fluid pressure in a linear fashion, the analog signals from the sensors are proportional to the weight of the vehicle body. The analog signals from the sensors 51a–c are typically received by a low resolution analog-to-digital (A/D) converter 103d; but, a high resolution A/D converter 130 may be substituted if additional accuracy is desired. Since the electric compass 116 is typically an analog device, it is also received by the A/D converter 103d. A digital-to-analog (D/A) converter 137 is provided as an output device on the bus 111 for implementing control of analog devices that may be added to the vehicle (e.g., a throttle control mechanism).

Figure 15A:
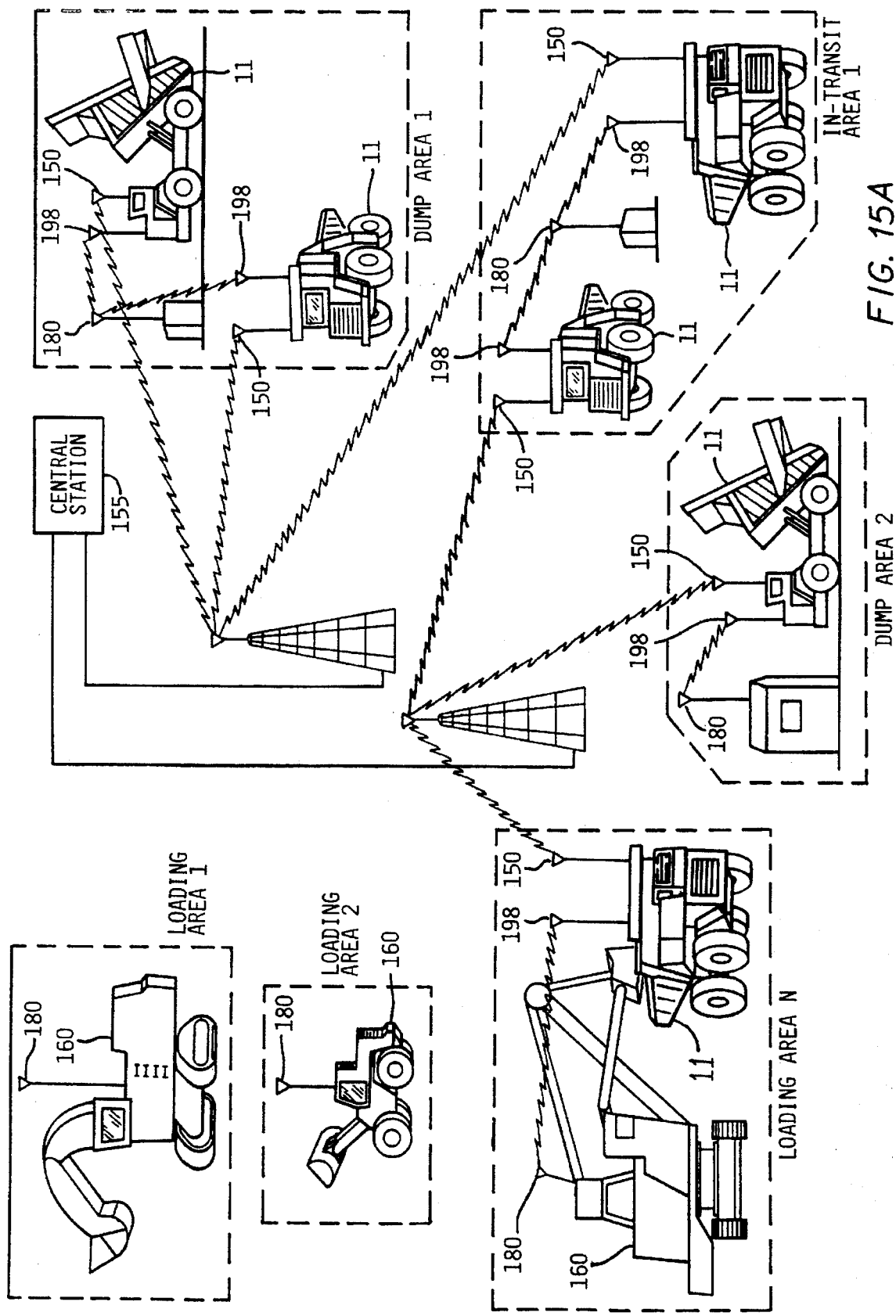
FIG. 15a is a system-level diagram illustrating a system according to a first embodiment of the invention, wherein stationary signposts cooperate with the on-board apparatus of FIG. 12 to supply location and hauling data to a central station for monitoring vehicle performance and for controlling movement of the vehicle fleet within a work area.
Figure 15B:
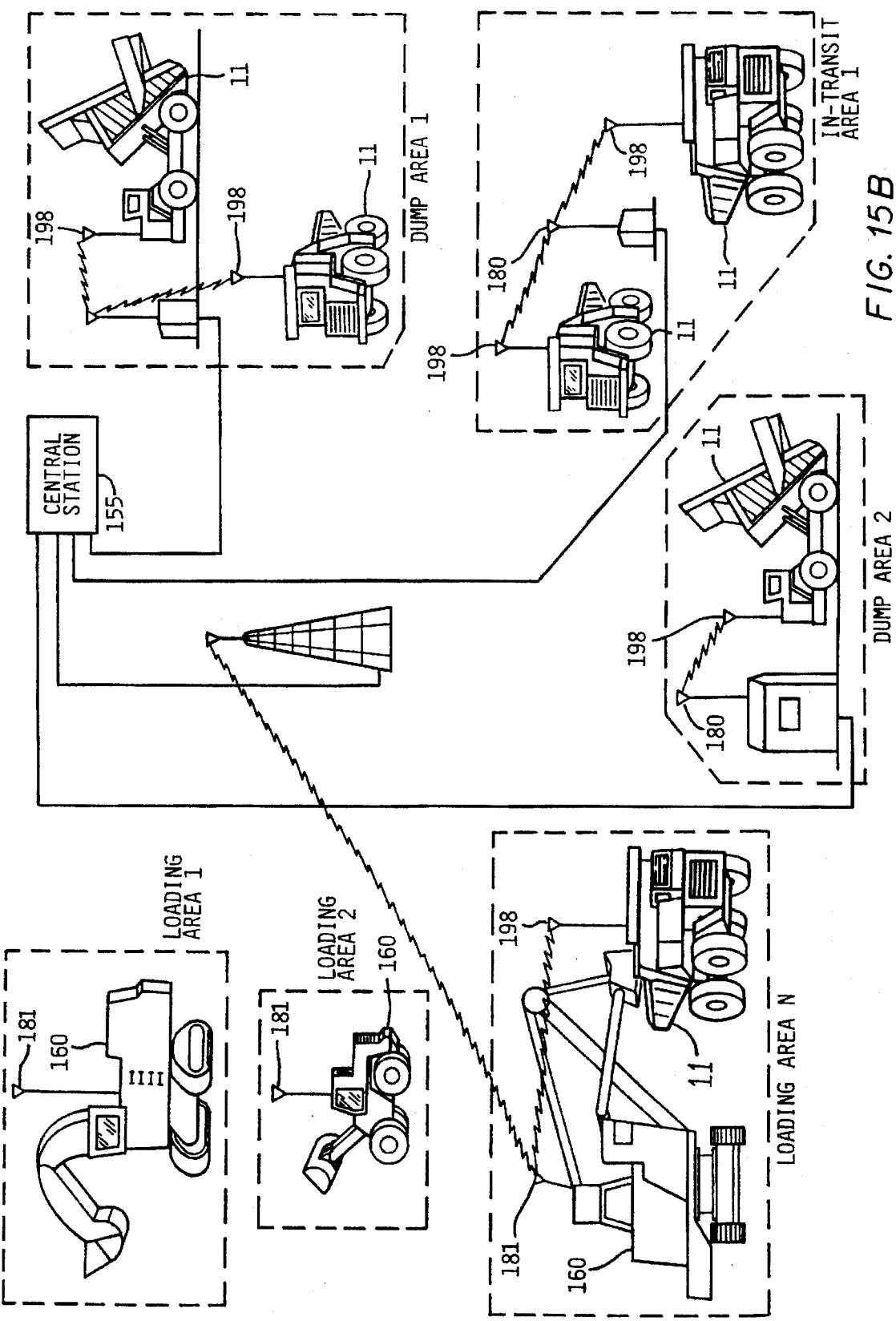
FIG. 15b is a system-level diagram illustrating a system according to an alternative embodiment of the invention.

In order for the sensor processing unit 101 to communicate with the central station 155 in FIGS. 15a and 15b, the RF transceiver 150 is coupled to the sensor processing unit 101 via an RS 422 data link to the serial input/output port 115. In a manner similar to that of the RF transceiver 150, the infrared (IR) transceiver 198 is coupled to the sensor processing unit 101 via an RS 422 connection. The IR transceiver 198 may be used to send data from the sensor processing unit 101 to another IR transceiver site via the input/output port 115. The IR and RF transceivers 198 and 150, respectively, are separately keyed by the sensor processing unit 101 via the port 115, and they are mounted to the vehicle 11 in appropriate and convenient locations in order to enable the sensor processing unit 101 to establish high quality RF and IR links.

In order to measure the axle loads of the vehicle 11, an interrupt instruction tells the sensor processing unit 101 to execute the software routine for calculating the axle loads from pressure readings of the on-board weighing device and the pressure transducer 102. As illustrated in FIG. 12, the interrupt signal is activated by the vehicle operator by way of a push button 142. As mentioned in connection with FIGS. 10a–10b, the interrupt is activated only after the operator has slightly raised the vehicle body 13 by extending the hydraulic cylinders 19 and 21.

(B) Keypad Input for Operator I.D.

As previously mentioned, hauling parameters derived from the on-board weighing device and processed by the sensor processing unit 101 can be identified with particular I.D. numbers, thereby providing an indication of vehicle and operator performance. It will be appreciated by those skilled in the art that keypad 122 can also serve as an I.D. input for mechanics, oilers and other maintenance personnel in order to record the maintenance work on the vehicle (in a fifth array of RAM 125) and the identity of the individual who performed the maintenance. In order for the sensor processing unit 101 to detect changes in operator numbers when the vehicle is not running (for instance, a change from a mechanic's I.D. to an oiler's I.D.), power is applied to the sensor processing unit via a separate switched circuit from the electrical battery of the vehicle 12 as can be appreciated by those skilled in the art. In the stand-by mode, the sensor processing unit can be manually powered up so new I.D.

numbers can be entered and to see if activity has occurred at its sensor inputs. If, for example, a new I.D. number has been entered into the keypad 122, the unit stores the new number and prints and/or displays a summary of data while the vehicle 11 was under control of the previous number. (The foregoing display of summary data will be explained in greater detail in connection with FIG. 14h). As an alternative to entering the I.D. number by way of the keyboard 122, an encoded card may be used by the operator in connection with a card reader.

As will be explained in greater detail in connection with the flowchart of FIGS. 14a through 14m, the sensor processing unit 101 and its associated electronics are normally energized in response to engine start-up. An engine start-up energizes the MPU 103 which in turn initializes the program memory, thereby beginning the program routine of the flowchart in FIGS. 14a–14m.

(C) Sensors

The on-board weighing device provides the circuitry of FIG. 12 with an analog electrical signal which is linearly proportional to the pressure exerted by the tubing fluid on the device's transducers 51a–c (tubing in the preferred embodiment of the invention or load cells, strain gauges or like pressure sensing transducers in alternative embodiments of the invention). Since the pressure of the tubing fluid is linearly proportional to the weight of the vehicle body 13 and since the transducers 51a–c are linear devices, the analog signals from the transducers are proportional to the weight of the vehicle body.

Sensors 102, 105, 107, 109, 110 and 113 cooperate with the on-board weighing device in order to provide information necessary for the sensor processing unit 101 to provide output information to the vehicle operator [such as the loads on the front and rear axles]. The direction switch 107 is used in connection with a record keeping function performed by the software of the sensor processing unit 101 such that, in response to a gearshift by the vehicle operator, certain information stored in RAM 125, and derived from the on-board weighing device, may be manipulated (as explained more fully in connection with the flowcharts of FIGS. 14a–14m). In a similar manner, the dump switch 109 is utilized by the sensor processing unit 101 to manipulate stored data from the on-board weighing device when the switch indicates that the vehicle body 13 has been pivoted to its dump position. Preferably, the dump switch 109 is a mercury switch mounted to the vehicle body 13 in order that it may respond to the change in the body's position as a load is dumped. Unlike mechanical switches, to the best of applicant's knowledge, a mercury switch when utilized as a dump switch offers the highly advantageous characteristic of being isolated from the ambient conditions. Therefore, the harsh conditions often encountered by off-road vehicles will not cause a rapid deterioration of switch performance. As an alternative to a dump switch, the sudden sensing of loss of load by the weighing device can be used as a software detection of dumping. Similarly, a sudden increase in load can be the basis for a software detection of loading.

The distance sensor 105 is used by the sensor processing unit 101 to provide the distance measurement in connection with the calculation of tons-miles per hour units used to indicate the degree of tire loading. Finally, the pressure transducers 102 are located in the hydraulic line of the hydraulic cylinders 19 and 21 and provides a pressure measurement for use in connection with calculating the axle distribution of the total load. The interaction between the sensor processing unit 101, the on-board weighing device and each of these sensors is discussed in greater detail hereinafter in connection with the flowcharts of FIGS. 14a–14m which disclose the program routine for the sensor processing unit.

(D) Visual Indicators

In order to provide a visual indication of the unused weight capacity of the vehicle body, the sensor processing unit 101 is connected to a load indicator 123 by way of the optical isolator 132. The load indicator 123 includes a plurality of lights 123a–e stacked one above the other (See FIG. 3). By activating a particular light on the indicator 123, the sensor processing unit 101 is able to signal the operator of the loader the proportion of a bucket load which may safely be added to the vehicle without exceeding the weight capacity of the vehicle. From a predetermined maximum weight capacity for the vehicle stored in the sensor processing unit 101, the sensor processing unit determines the remaining load capacity of the vehicle body 13 from the current load as measured by the on-board weighing device.

If the vehicle is loaded by a continuous flow of material, instead of the incremental increase provided by the bucket of a front end loader, the indicator 123 may provide a real-time indication of the percentage of remaining load capacity. For example, if a conveyor belt or hopper (not shown) are used to load the vehicle 11, the sensor processing unit can compare current load data with a maximum load and activate an appropriate light 123a–e, depending on the fraction of remaining capacity. In this example, it is contemplated the indicator light 123a corresponds to a remaining capacity of 20%, indicator light 123b corresponds to a remaining capacity of 15%, etc. The sequencing of the lights 123a–e as the vehicle approaches full load will aid in the anticipation of when the continuous flow should be cut off in order to avoid overflow, yet assure a maximum load. The particular programming steps for providing a real time indication of remaining capacity is not set forth in the steps of the flowcharts in FIG. 14a–14m, but the modifications required to the program for continuous flow loading will be evident to a programmer from the flowchart description of steps responsive to incremental loading.

In connection with the indication of the remaining weight capacity of the vehicle, the sensor processing unit 101 determines the average incremental increase in the weight of the vehicle body 13 with each bucket from a loader, thereby indicating the average weight of a bucket load used to load the vehicle body. If the average weight for a bucket is less than the remaining weight capacity of the vehicle body 13, then the green light 123a of the indicator 123 will be activated by the sensor processing unit 101. If the average weight of a bucket is greater than the remaining load capacity of the vehicle body 13, the sensor processing unit 101 determines what fraction of the average weight of a bucket the remaining weight capacity most closely approximates.

Specifically, a three-quarter light 123b is activated if the remaining weight capacity of the vehicle body 13 has a value between three-quarters of an average weight for a bucket and the total average weight for a bucket. In order to light the one-half light 123c, the remaining weight capacity of the vehicle body 13 must be between one-half and three-quarters of the average weight of a bucket. Similarly, in order to light the one-quarter light 123d the remaining weight capacity must be between one-quarter and one-half of the average weight of a bucket. Finally, for the red light 123e to be activated and thereby indicate the vehicle body 13 is full, the remaining weight capacity of the vehicle body 13 (as determined by the pressure reading from the on-board weighing device) must be less than one-quarter of the average weight of a bucket. The manipulation of the indicator 123 by the sensor processing unit 101 in response to pressure readings from the on-board weighing device will be explained in greater detail in connection with the program routine of the sensor processing unit illustrated by the flowcharts in FIGS. 14a–14m.

VIII. Obtaining an Accurate Weight Reading

In order to obtain an accurate measurement of the pressure on the four lengths of the tubings 47, the sensor processing unit 101 reads the voltage 16 times in succession from each pressure transducers 51a–c. In order to obtain one pressure value for each transducer 51a–c, the 16 readings are averaged. Each pressure transducer 51a–c is read and averaged before the next transducer is read and averaged. When all of the pressure transducers 51a–c have been read and their 16 separate readings averaged, the three average readings are themselves averaged to obtain one pressure measurement for the vehicle body 13. Since the net weight of the vehicle body 13 is the weight of interest, the tare pressure (stored in memory) is subtracted from the reading of the pressure transducers 51a–c to obtain a net pressure reading. The net pressure reading corresponds to the weight of the load carried by the vehicle 11 in its vehicle body 13. This reading is stored and manipulated in accordance with the program memory for the MPU 103 contained in the EPROM 126.

In order to convert the foregoing pressure readings to a weight reading, the effective area of contact between the tubing 47 and the plate 60 (see FIG. 7) must be considered. The pressure data from the transducers 51a–c represents weight per unit area. Multiplying the effective contact area by the pressure data results in data indicative of weight. To find the weight, the average pressure may be multiplied by the total effective area for all the plates 60 of the on-board weighing device. From empirical study, applicant has discovered that the surface area of the plate 60 is not the precise area used to multiply with the pressures. A slightly modified, enlarged surface area is required in the calculation of weight. The degree of enlargement is determined empirically. Of course, the product of the pressure and surface area of contact may also require conversion to provide the appropriate weight units, e.g., pounds, kilograms, etc.

For the foregoing calculation of weight, the effective area of contact between the tubing 47 and the plate 60 is considered to be the same for each sensor 51a–c. If the specific system design results in unequal areas, each pressure and area must be treated separately. Therefore, if the four lengths of tubings 47 in FIGS. 1–4 include two foreward sections which are longer than the two aft sections, the two forward sections must be treated separately from the aft sections in order to provide a meaningful single weight calculation.

IX. Structure of Storage Areas

Figure 13:
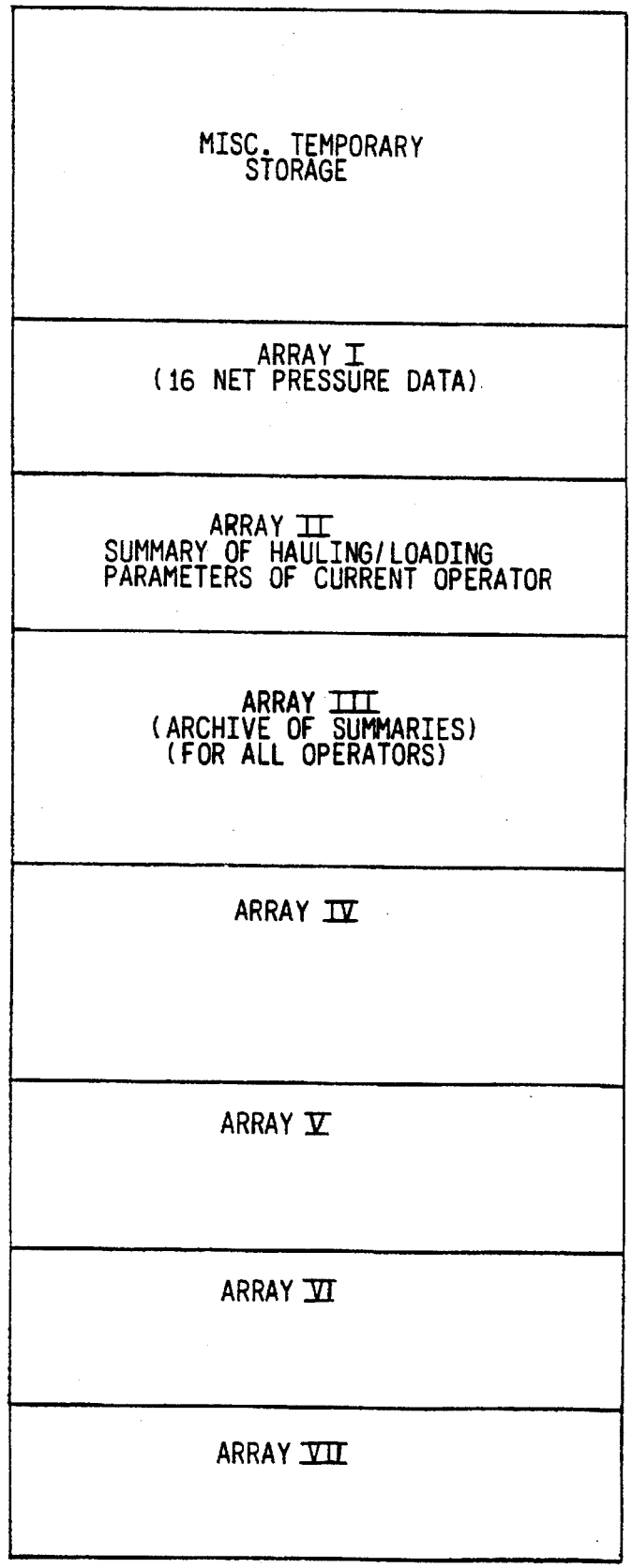
FIG. 13 is a schematic diagram of the temporary memory space used in connection with the sensor processing unit of FIG. 12.

Turning first to the on-board data base, in order to accumulate the relevant data provided by the on-board weighing device and the electronic circuitry of FIG. 12, the RAM 125 is organized to not only include the miscellaneous temporary storage (e.g., status flags) required for normal software operation, but the RAM also includes arrays of data cells for storing time and pressure data to provide a chronological record of vehicle and operator performance and to provide a data base to extract further data indicative of performance. Referring to FIG. 13, the RAM 125 is schematically illustrated as including at least a miscellaneous storage area and seven arrays.

ARRAY I provides storage locations for a plurality of consecutive net pressure values calculated from the pressure transducers 51a–c of the on-board weighing device. Also in RAM 125, storage locations are provided for cataloging summaries of hauling parameters wherein the summaries are indexed by operator number in order that the performance of each operator of the vehicle 11 can be quantified. For example, ARRAYS II and III are provided in RAM 125 wherein the ARRAY II collects summaries of hauling parameters for a time duration measured from the time a particular operator number is entered into the system until the number is changed. Entry of a particular operator number may identify a certain cell in the second array for receiving summaries of hauling parameters, thereby identifying the summaries with the operator. By providing a non-volatile memory for the RAM 125, an ARRAY III serves as an archive for the summaries in ARRAY II, thereby providing a record of operator performance for a period of time including multiple uses by the operator, e.g., a month, quarter or year.

A fourth array, ARRAY IV, provides a storage area for recording maintenance work on the vehicle. Entry of a user I.D. number indicative of maintenance personnel rather than drivers are stored in ARRAY IV together with relevant data such as time under control of the maintenance number. Two additional arrays, ARRAYs V and VI store date useful in evaluating the performance of an off-road, heavy duty vehicle and its loader. As will be discussed in greater detail hereinafter, ARRAYs V and VI store data relating to the weight of each bucket added by the loader and the real time of each bucket addition. The purpose and manipulation of these stored values in ARRAYs I–VI will be discussed in connection with the flowchart of FIGS. 14a–14m.

Finally, ARRAY VII is an area for storage data to be downloaded from the on-board system to a remote central location for creating a historical file. As will be apparent from the discussion in connection with the flowcharts of FIGS. 14a–14m and 20–24, relevant data can be either or both displayed on-board and downloaded to a central station. If downloading is a selected option, the data is temporarily stored in ARRAY VII for transmission in response to receiving an appropriate control signal from the central computer.

In the simplest of downloading systems, a weight indicator may be located off the vehicle and at a stationary site. For example, where the loading equipment is stationary during loading, a coupling between the on-board weighing device and the weight indicator may allow the operator of a loader to remotely monitor the weight of the vehicle load without the need for relatively expensive transceivers. In order to allow the loaded vehicle to move away from the loading site, the coupling between the on-board weighing device and the weight indicator includes a quick disconnect device (not shown) of conventional design. In operation, the vehicle is moved into position for loading and the male and female members of the quick disconnect device are joined so as to allow pressure data from the on-board weighing device to be directly transferred to the weight indicator. Since the loading equipment is stationary, the weight indicator is preferably mounted directly to the loader so that the loader operator can monitor the increasing weight of the load. When a full load is indicated, the quick disconnect device decouples the weight indicator and the on-board weighing device so that the vehicle may move away from the loading site and allow a new vehicle to be positioned for loading. The new vehicle is coupled to the weight indicator as before and the foregoing steps are repeated.

An obvious variation to the foregoing system would be the upgrading of the system to an electrical system wherein a transmitter provides the means to communicate the pressure data to an electronic weight indicator located at the loader. A simplified version of the sensor processing unit 101 is all that is necessary in order to prepare the pressure data for transmission. The stationary weight indicator may be merely a receiver of the data which converts the transmitted pressure data to a weight display for the operator of the loader.

X. Main Operating Program

Referring now to the flowchart of FIGS. 14a–14m, the main program of the sensor processing unit 101 executes all aspects of data accumulation on-board the vehicle. Various subroutines are called from the main program for executing particular aspects of the invention. These subroutines are illustrated by the flowcharts in FIGS. 14f–14m. Although these flowcharts are intended to be complete for an operating system, it will be understood that obvious modifications may be made to the program if a user wishes to use less than all aspects of the invention or, in the extreme, simply wishes to transmit data to a remote site. In this regard, some or all of the data processing can be done at a remote site if desired. As will be appreciated by those skilled in programming, the allocation of tasks between the on-board processor and a remote stationary processor can be tailored to the particular needs of the user. For purposes of illustration, however, applicant has chosen to allocate all of the data manipulation tasks to the on-board processor so that downloading to a cooperating second processor is not required.

For the purpose of reducing the complexity of the flowchart in FIGS. 14a–14m, the multiple steps required to calculate a single pressure value for the pressure transducers 51a–c as described above are treated in the steps of the flowchart as a single step. It will be understood, therefore, that each step requiring the sensor processing unit 101 to read the pressure of the vehicle body requires the voltage signal from each of the transducers 51a–c to be read in accordance with the following protocol: 1) reading each transducer 16 times in succession, 2) averaging the 16 readings, and 3) total the averaged readings from all the transducers in order to obtain a single averaged reading.

Upon starting the vehicle, the sensor processing unit 101 receives power and starts the processing steps of the flowcharts. It begins by initializing required values at step 210. From step 210, the sensor processing unit 101 moves to step 230 where it reads the time and date from a time clock of the MPU. Next, as indicated by step 240, the date, vehicle identification number, time and operator identification number are printed by printer 117 or transferred to ARRAY VII for later transmission via transceiver 150. (The vehicle I.D. number has been previously placed in permanent memory.) The operator identification number is obtained from the keyboard 122 as indicated by step 250. At step 260, a count is preset to a maximum count in order to control later sequencing of the software as explained more fully hereinafter.

As will become more apparent in connection with the remaining explanation of the flowchart steps, virtually all data identified for an output may be transferred to ARRAY VII in order to download the data to a remote location. Data link downloading will be discussed in greater detail in connection with the real-time control of vehicles as illustrated in FIGS. 15–24.

After the vehicle has been turned on and the sensor processing unit 101 initialized in steps 210 through 260, the program moves to the main program loop at step 269 where the distance recorded by the distance sensor 138 is added to a previously calculated total distance in order to update the total distance traveled by the vehicle From step 269, the program calls a Read Pressure Subroutine (FIG. 14g) at step 270 wherein the unit reads the pressure from the pressure transducers 51a–c and calculates an average pressure in the manner previously described. In addition, the subroutine also calculates a fore, aft and side-to-side pressure for use in connection with other subroutines as explained hereinafter.

In step 275, the program compares the stored operator number with the current operator number entered into the keyboard 122. If the number is different, the new operator number is stored and the program calls the Operator Summary Subroutine at step 277 for analyzing hauling parameters measured during operation of the vehicle 11 while under the control of the previous operator. The Operator Summary Subroutine is discussed in greater detail in connection with FIG. 14h. After the Operator Summary Subroutine has been executed or if a change in operator number did not occur in step 275, the program moves to step 280.

In step 280, the predetermined value for the tare pressure is subtracted from the average pressure calculated in step 270 in order to obtain a net pressure value. Since the tare pressure represents the weight of the empty vehicle body, the net pressure represents the weight of the load carried in the vehicle body 13. From step 280, the sensor processing unit 101 moves to step 185 (FIG. 14b) where it is determined if the net pressure value is less than zero. If the net pressure is found to be less than zero in step 285, the program branches to step 286. In step 286, the program zeros the net pressure and bucket pressure (bucket pressure will be explained hereinafter in connection with the Load Analysis Subroutine, FIG. 14j). At step 289, the net pressure is stored in the first location of ARRAY I, i.e., ARRAY I(1). The most recent 16 net pressure values are stored in ARRAY I. These 16 values are averaged in step 300 (FIG. 14b) in order to obtain a time averaged net pressure.

In step 304, the program checks to determine if the operator has activated the push button 142 (FIG. 12) to indicate that the axle loads should be calculated. If the push button is pressed, the program branches the main program and executes the Axle Load Analysis Subroutine in step 305. As will be explained in greater detail in connection with FIG. 14L, the Axle Load Analysis Subroutine utilizes the net pressure reading for the vehicle body and the net pressure from the pressure transducer 102 (FIG. 12) to determine the loads on the front and rear axles.

Figure 14A:
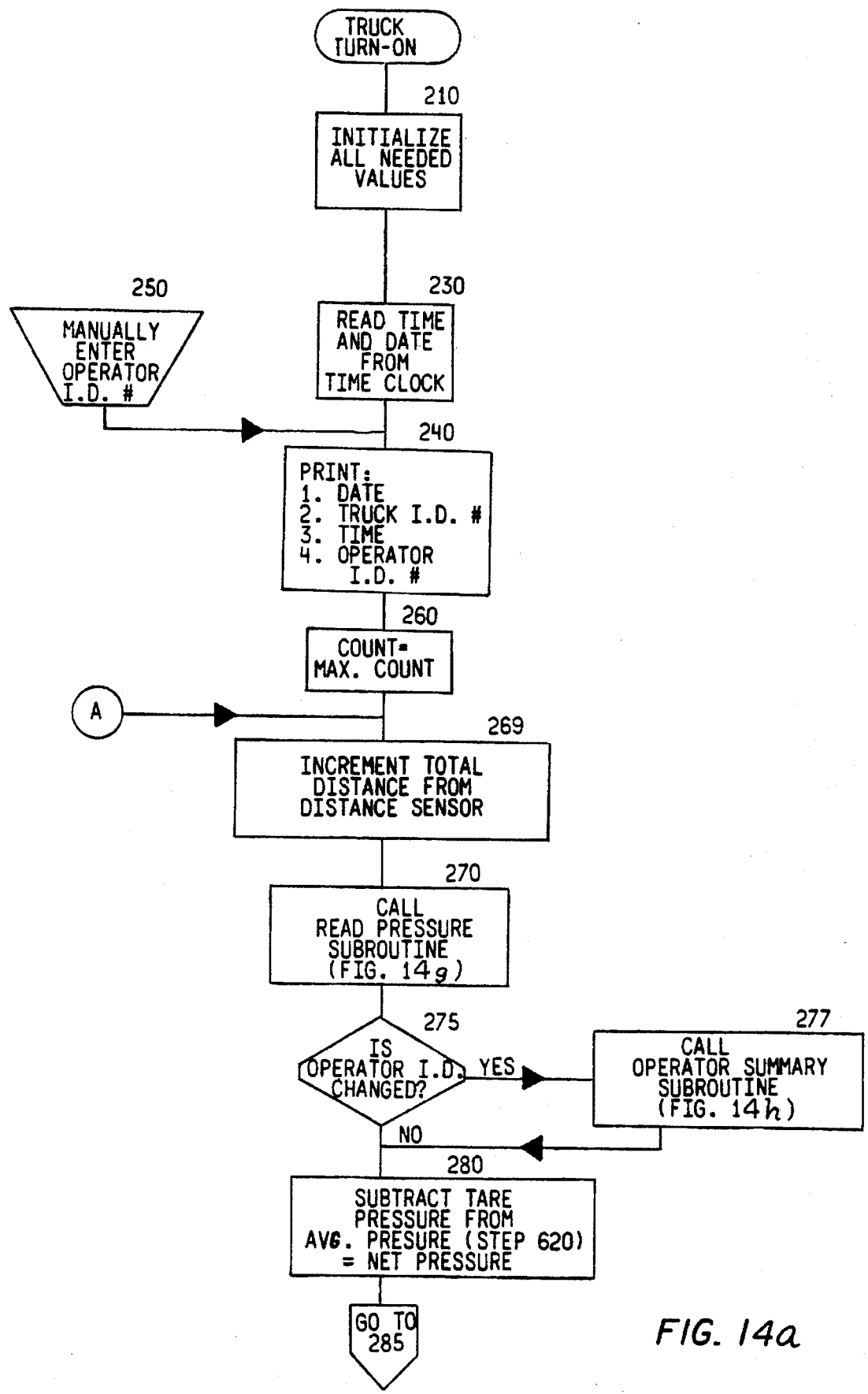
Figure 14B:
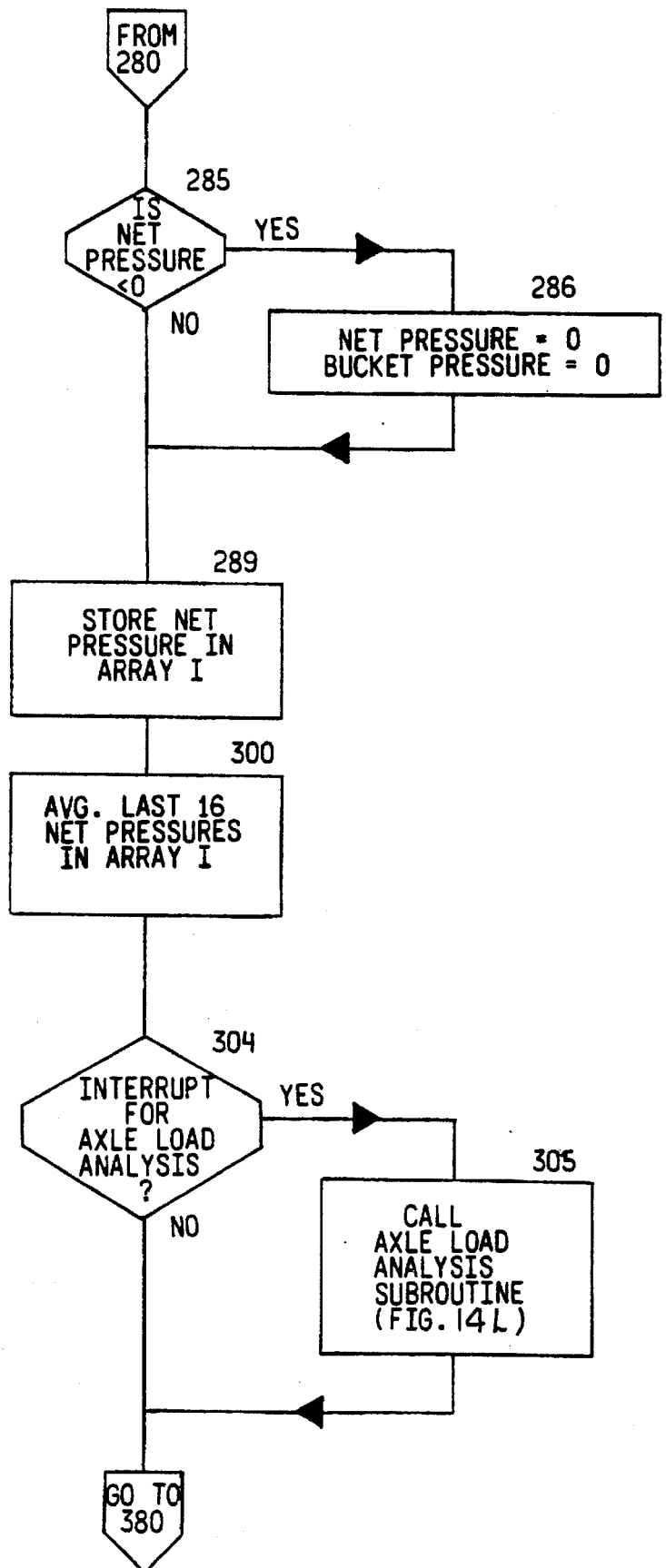
Figure 14C:
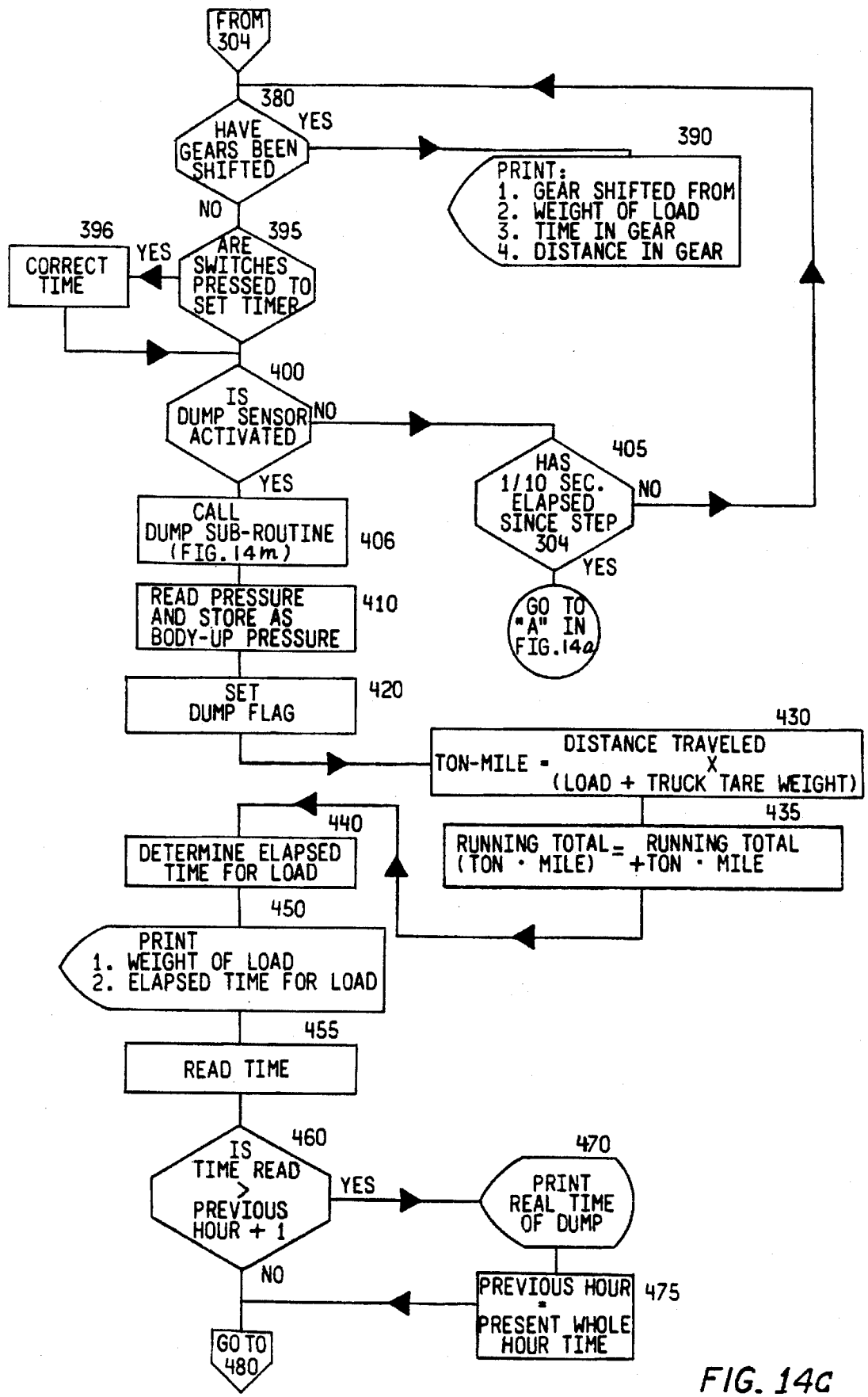

Referring to FIG. 14c at step 380, the sensor processing unit 101 determines whether a gear shift has been sensed by the gear sensor 107. If it has, the program branches to step 390. In step 390, the sensor processing unit 101 commands the printer 117 to print (or to store in ARRAY VII) 1) the gear from which the vehicle has shifted, 2) the most recently calculated average net weight, 3) the time spent in the previous gear and 4) the distance traveled in the previous gear (derived from the distance sensor 105 in FIG. 12). Although not shown in FIG. 14c, a flag may be set in step 390 indicating a gear shift for use in connection with downloading data to a central station discussed in connection with FIGS. 15 through 24. If the truck's gears have not been shifted in step 380 or after completion of the printing function by the printer 117 in step 390, the sensor processing unit 101 determines at step 395 whether a time clock (not shown) is to be corrected.

If the time is to be corrected, the program branches to step 396 where the time correction is executed. From steps 395 or 396, the program moves to step 400 and determines whether the dump switch 109 has been activated. If the dump sensor has not been activated at step 400, the program branches to step 405 to decide if 0.1 seconds have elapsed since leaving step 304 and entering step 405. Since step 405 returns the program to step 380 if 0.1 seconds has not elapsed, the delay gives the sensor processing unit 101 an adequate time window for sensing the activation of the dump sensor 109 at step 400 before proceeding further in its program. If 0.1 seconds has elapsed in step 405, the program branches back to step 269 (FIG. 14a).

If the dump switch 109 is determined to be activated in step 400, the program moves to step 406 wherein a Dump Subroutine is called which summarizes pertinent data of the haul cycle. In addition to identifying, calculating and printing different parameters for a single hauling cycle in the Dump Subroutine, it will be appreciated that the data gathered by the sensor processing unit 101 from the on-board weighing device and the associated sensors may be stored in ARRAY II for a number of hauling cycles in order to provide daily totals or averages of an operator such as, for example, the total tonnage hauled per day, the number of loads hauled per day, the average load hauled on a particular day and the average elapsed time for a haul cycle. The Dump Subroutine is more fully explained in connection with FIG. 14m. From step 406, the program calculates the net pressure in step 410. As indicated in step 410, the resulting single pressure value is stored in the RAM 125 at a location designated for storage of a body-up pressure reading (i.e., a pressure reading corresponding to the vehicle body raised off the on-board weighing device).

In order to provide an indication for other parts of the program that a dump has occurred, a dump flag is set in step 420. This signal, together with a gear change signal and a load signal (discussed in connection with FIGS. 14j–14k), provide sufficient information to a central station for it to control the distribution of trucks 11 to minimize cycle time. This aspect of the invention will be discussed in greater detail in connection with FIGS. 15–24.

In steps 430 and 435, a calculation is performed to update the recorded amount of tire use. In step 430, the distance traveled since the last calculation (the last calculation was taken when the vehicle began loading as will be explained in connection with the Load Analysis Subroutine of FIGS. 14j–14k) is multiplied with the total vehicle weight, i.e., the measured body weight plus the tare weight of the vehicle. In step 435, the "ton-mile" data from step 430 is summed with prior "ton-mile" data. The total ton-mile data provides an indication whether the tires of the vehicle 11 are wearing in accordance with their ton-mile rating. This data can be very important since reliable data regarding tire wear is otherwise unavailable and since replacement of worn tires is expensive. A calculation for ton-mile is executed by the sensor processing unit every "segment" of a haul cycle for which there is a change in body weight; that is, at the end of a haul after the vehicle has traveled from loader to dump site and at the beginning of a haul after the vehicle has traveled from the dump site to a loader. The time for the current segment of the load cycle is stored in step 440. The elapsed time indicates how long it took for this load to be delivered to its destination, i.e., from last dump to present dump.

By printing in step 450 (or storing in ARRAY VII for later transmission) the current average net weight (calculated in the subroutine of FIG. 14f) in response to activation of the dump switch 109, the sensor processing unit 101 provides a hard copy of the truck's load immediately before the load is dumped by the pivoting of the body about hinge assemblies 17. The elapsed time for this load cycle is also printed. The current time is read in step 455. Finally, if it is determined at step 460 that the current time is greater than the last full hour of the time last read in step 460 plus one, the MPU 103 can optionally command the printer 117 to record the time of the dump in step 470. In order to initialize step 460 for its next execution, step 475 sets the present whole hour equal to the previous hour.

Figure 14D:
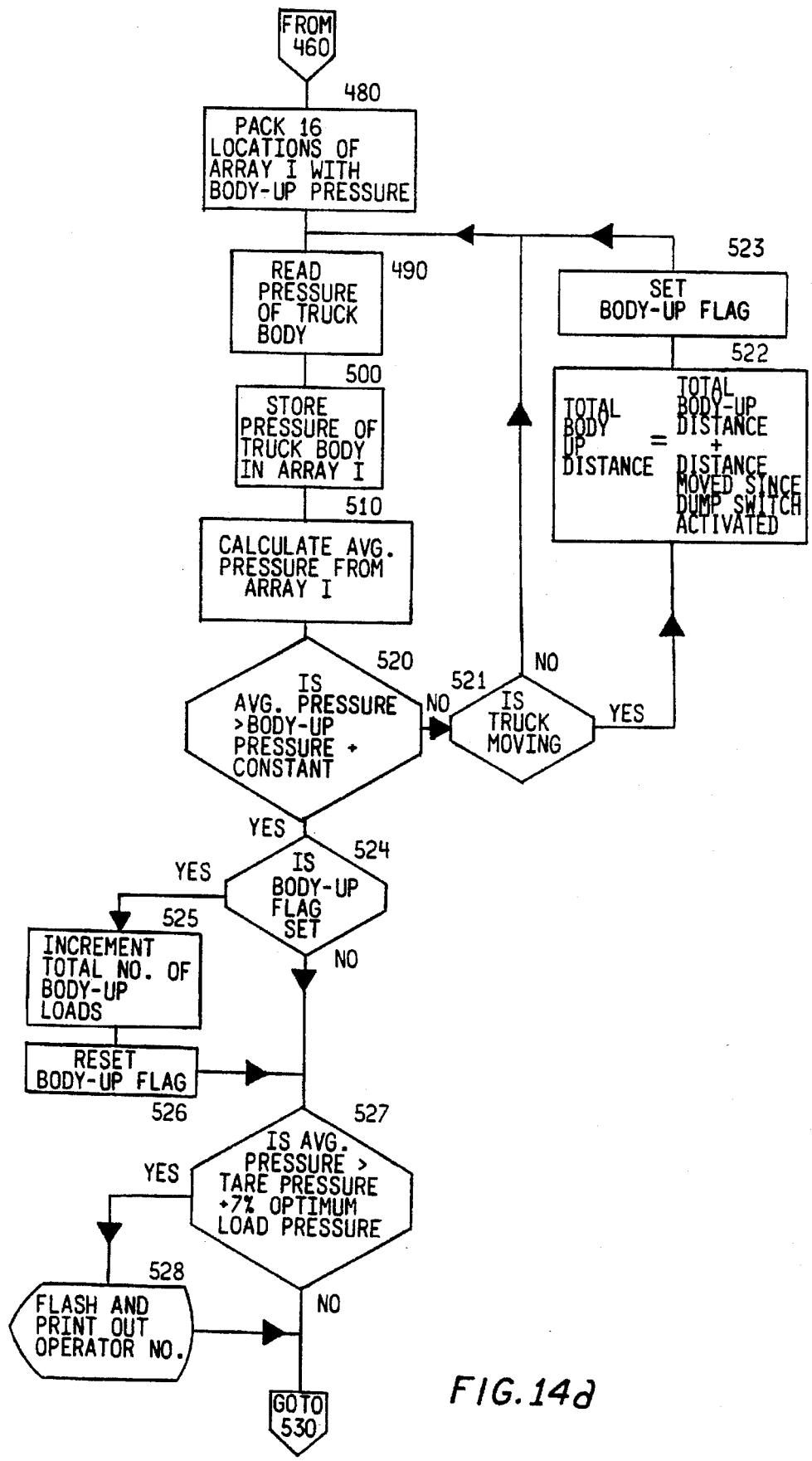

Referring to FIG. 14d, in order to re-initialize the sensor processing unit 101 after a load has been dumped, the net pressure array, i.e., ARRAY I, is filled at all of its 16 locations with the body-up pressure calculated during step 410. After this "packing" of ARRAY I in step 480, the sensor processing unit 101 reads the pressure at the pressure sensors 51a–c in step 490 in accordance with the same procedure as previously described. At step 500, that pressure value is stored in one of the storage cells in ARRAY I, thereby replacing one of the body-up pressures "packed" into the array. From the 16 values in ARRAY I, an average pressure is calculated at step 510.

At step 520, the sensor processing unit 101 determines if the average pressure calculated in step 510 is greater than the body-up pressure plus a constant. The constant is added as a buffer in order to ensure the vehicle body 13 is lowered onto the tubings 47 before the program progresses to the next step. Since initially at step 520 the ARRAY I is packed with the body-up pressure (except for the one reading obtained and stored during steps 490 and 500, respectively), the average pressure calculated from ARRAY I is approximately equal to the body-up pressure. Therefore, if the average pressure is less than the body-up pressure plus a constant in step 520, the sensor processing unit 101 returns to step 490 via step 521 where another pressure reading is made and the resulting pressure is stored into ARRAY I at step 500. With each storage of a new value in ARRAY I, the oldest value is dropped. The average pressure is again calculated at step 510 from the values in ARRAY I and the resulting value is compared to the body-up pressure plus a constant to determine if the vehicle body has been lowered onto the tubings 47. Steps 490–520 are repeated until the average pressure calculated from ARRAY I reaches a value (because of the lowering of the vehicle body 13) that is greater than the body-up pressure plus a constant. When this occurs the sensor processing unit 101 will branch from step 520 to step 524 in the flowchart.

Since a negative decision in step 520 indicates the vehicle body is not fully resting on the on-board weighing device, step 521 checks to determine if the vehicle is moving before returning the program to step 490. Moving the vehicle with the body raised may cause serious damage to the hinge assemblies 17 and/or the hydraulic cylinders 19 and 21. If it is determined in step 521 from the distance sensor 105 that the vehicle is moving, the flowchart branches to steps 522 and 523 wherein the distance traveled is recorded and updated and where a status flag is set for use in connection with step 524.

If the test in step 520 indicates the vehicle body is completely lowered, the program leaves the loop of steps 490–523 and branches to a test in step 524 in which the status flag of step 523 is investigated. If it has been set, the vehicle has been moved before the body was fully lowered. Therefore, step 524 branches to step 525 and 526 in response to a set condition of the status flag. In step 525, a running total is kept of the number of dumps for which the vehicle was moved before the body was fully lowered. Step 526 resets the status flag.

In order to check for a haul-back condition—i.e., not all of the load was dumped—step 527 investigates the pressure from the on-board weighing device to determine if the pressure is greater than tare pressure plus a predetermined margin. In the exemplary embodiment, the margin is seven percent of the optimum load. A determination in step 527 that the average pressure is too great and a haul back condition exists will result in the printing of the operator's number by the printer 117 in step 528 and/or a flashing of the operator's number on display 136 (or storing this data in ARRAY VII for downloading). From steps 527 or 528, the program moves to step 530 in FIG. 14c where the MPU 103 reads the current time for use in connection with a later step.

Figure 14E:
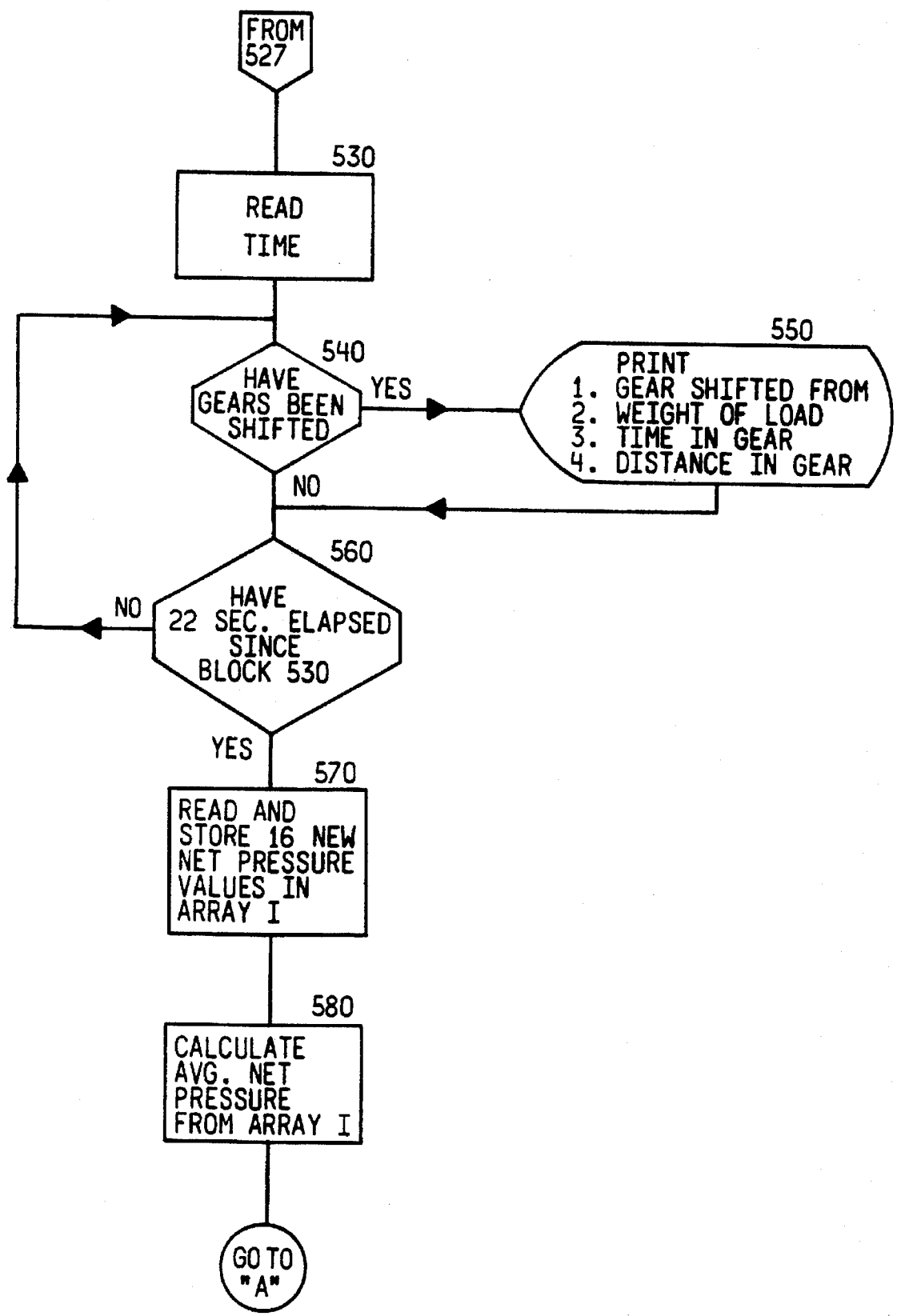

Referring now to FIG. 14e, at step 540, the direction switch 107 is again checked to see if a gear shift has occurred. If it has, the program branches to step 550 where the following information is printed by the printer 117 (or transferred to ARRAY VII)—gear shifted from, most recently calculated average net weight, elapsed time in the previous gear and distance traveled in previous gear. As with step 390 in FIG. 14c, the gear change in step 540 may be stored as a status flag in order for it to be included with the downloading of data to a central station as discussed hereinafter. At step 560 the sensor processing unit 101 determines if 25 seconds have elapsed since the time read in step 530. If it has not, the program returns to step 540 and the unit 101 again checks to see if there has been a shifting of gears. The delay of 25 seconds implemented at step 560 insures that the vehicle body 13 has sufficient time to fully settle on the vehicle frame 15 before the sensor processing unit 101 continues through its calculations.

After 25 seconds have elapsed, the sensor processing unit 101 moves forward to step 570 where a new net pressure reading is calculated and loaded into each of the 16 locations of ARRAY I. From the 16 net pressure readings in ARRAY I, a single average net pressure reading is calculated at step 580. From step 580, the sensor processing unit 101 branches back to the beginning of the main loop of the program at step 269, flagged as "A" in the flowchart.

XI. Detection of Rough Road Condition and Loading of Vehicle

Figure 14F:
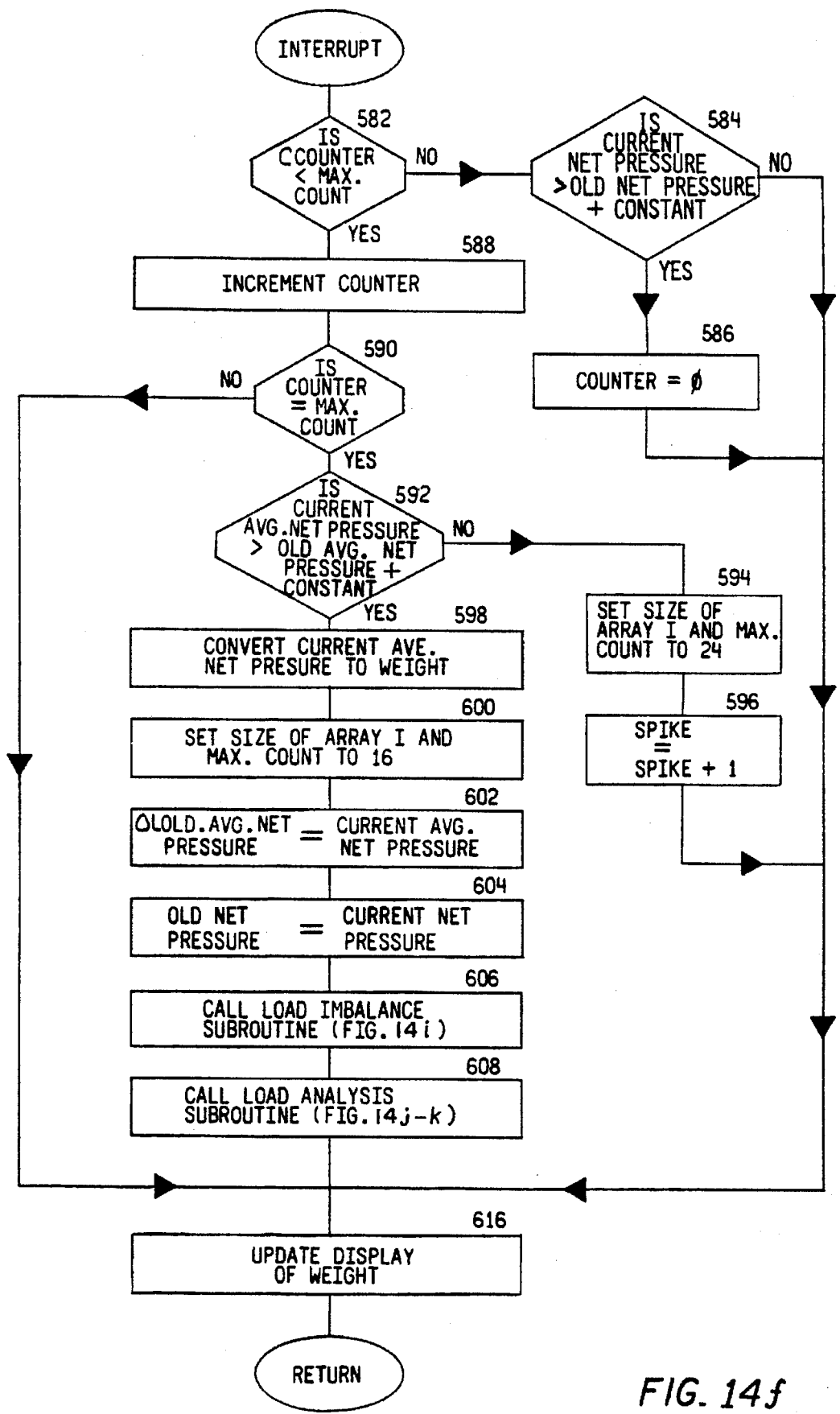
Figure 14G:
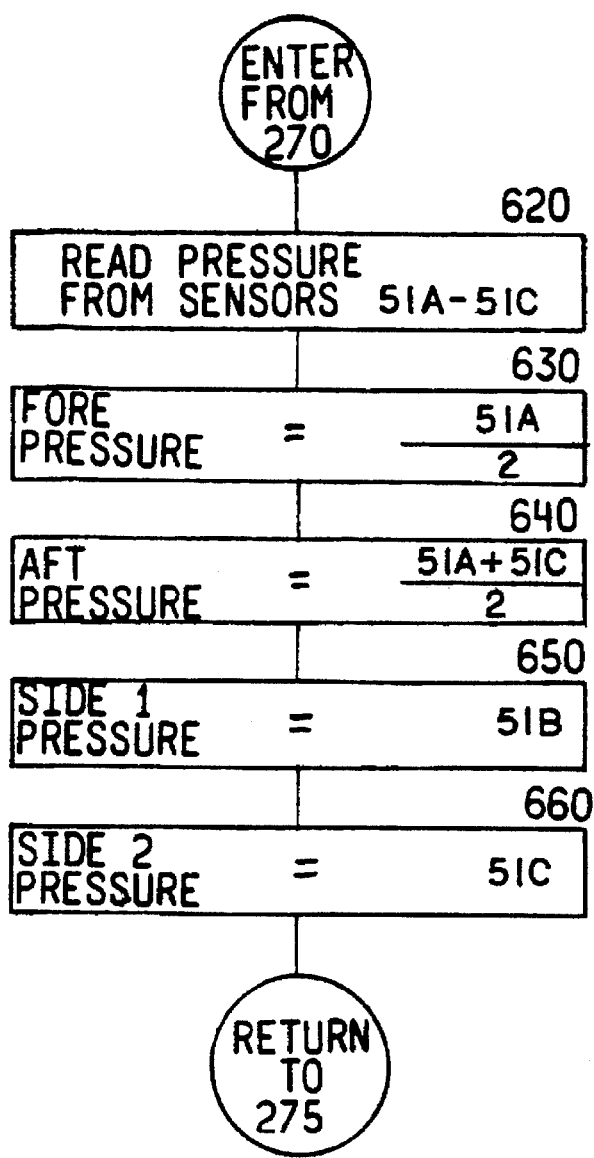

A periodically generated (for example, two seconds) timer interrupt causes the sensor processing unit 101 to execute the steps of the subroutine in FIG. 14f. This subroutine determines whether an increase in current pressure is attributable to a spike (from rough road conditions) or the addition of a bucket. If it is determined the former is the cause of the pressure increase, the subroutine records the increase as a spike in order to monitor road condition; alternatively, if it is determined a bucket has been added, a series of steps are executed to update the load status of the sensor processing unit 101.

Referring to the particular steps in FIG. 14f, an internal counter of MPU 103 is checked in step 582 to determine if the predetermined maximum count set in step 260 of FIG. 14a has been reached. The predetermined maximum count equals the number of cells in ARRAY I in order that successive average pressure values calculated in the subroutine represent completely different sets of pressure data. If the value of the counter exceeds the number of cells in ARRAY I, the program branches from step 582 to step 584 wherein the current net pressure is examined to determine if it is greater than the old net pressure reading plus a constant. The constant is a number which is intended to identify pressure increases from the last average which are great enough to be identified if they later prove to be pressure spikes resulting from rough road conditions. If the current net pressure is greater than the old net pressure plus a constant, the program resets the counter at step 586. Otherwise, the program branches to step 616 whose function will be discussed later. By setting the counter to zero, the next interrupt will result in step 582 branching to 588, instead of step 584 as before.

In step 588, the counter is increment and then examined, in step 590, to determine if the counter has reached the maximum count (equal to the number of array cells in ARRAY I). If the count is less than the maximum count, the readings in ARRAY I are not necessarily all new readings with respect to the last average reading. Therefore, the program bypasses the calculation of a new average net pressure and associated program steps by branching to step 616.

If the current count equals the maximum count, then the program moves to step 592 wherein the current average net pressure from ARRAY I is compared to the old average net pressure plus a constant to account for hardware errors (the old average net pressure is the average net pressure which served as the current net average pressure the last time step 592 was answered yes). If the current net average does not exceed the old net average, then the increase in pressure which caused the counter to reset in steps 584 and 586 must have been a spike and not a sustained increase in weight indicative of an added bucket. Therefore, the program branches to step 594 wherein the size of ARRAY I is increased to 24 and the corresponding maximum count is increased to 24. By increasing the size of ARRAY I, more readings will comprise each average thereby mitigating the effect of pressure spikes. In order to monitor the roughness of the road, the pressure spikes are recorded in step 596. From step 596, the program branches to step 616. In step 616, the weight displayed by the LED display 136 (FIG. 12) is refreshed. Alternatively, or in addition to this, new weight data can be transferred to ARRAY VII for downloading to a remote site via a data link.

If the current average net pressure is greater than the old average net pressure plus an error factor, than a sustained increase in the load is indicated, i.e., a bucket has been added. Therefore, the load is updated in steps 598–608. In step 598, the current average net pressure is converted to weight in preparation for display. Because the vehicle is being loaded (as indicated by an added bucket), the vehicle can be assumed not to be moving; therefore, spikes are unlikely to occur. Based on the foregoing assumption the size of ARRAY I is reduced to 16 in step 600 in order to provide more frequent averages (the maximum count is also set at 16). In order to provide an old net average pressure and an old net pressure for the next interrupt in which the count equals the maximum count, the present average net pressure and present instantaneous net pressure are designated old pressures in steps 602 and 604.

Since the vehicle 11 is in the process of loading, a Load Imbalance Subroutine is called in step 606 and a Load Analysis Subroutine is called in step 608. These subroutines will be discussed in detail in connection with FIG. 14i–14k, respectively. From steps 590, 608, 584, 586 or 596, the program updates the average weight shown on the display 136. Of course, if steps 598–608 have been bypassed, the updated average weight is the same as the old average weight. After the routine of FIG. 14f has executed its steps, the sensor processing unit 101 returns to the main program of FIGS. 14a–14e.

XII. Process of Obtaining a Weight Reading

Turning to the subroutines illustrated by the flowcharts in FIGS. 14g–14m, each subroutine is called from the main program represented by the flowchart in FIGS. 14a–14f. For the Read Pressure Subroutine of FIG. 14g, the subroutine is called from step 270 in the main program. In the first step of the subroutine, a single average pressure reading is obtained in step 620 for the on-board weighing device in the manner previously described. From step 620, the subroutine calculates fore and aft pressures in steps 630 and 640, respectively. In order to calculate the aft pressure, the average pressure readings from the rearwardly positioned transducers 51b and 51c are averaged. In order to provide a forward pressure, the pressure values from the forwardly positioned transducer 51a is read. These fore and aft pressure readings are used in connection with the Imbalance Subroutine called in step 606 and set out in FIG. 14i.

In steps 650 and 660 of the Read Pressure Subroutine, the side-to-side pressure of the vehicle body on the on-board weighing device is determined. Specifically, in step 650, the pressure reading from transducers on a first side of the vehicle 11 is measured to provide a pressure for the first side. Correspondingly, for the opposite side, the pressure reading from sensors 51c is measured. As with the fore and aft pressure readings, the side-to-side pressure readings are used in connection with the Imbalance Subroutine of FIG. 14i. After the pressure transducers 51a–c have been read and the appropriate pressure measurements calculated, the subroutine returns to the main program at step 275.

XIII. Operator Summaries

Referring to the Operator Summary Subroutine in FIG. 14h, data indicative of operator performance may be gathered and stored during vehicle operation under the control of a particular operator number and thereafter summarized and displayed or printed when the operator number is changed. Although the steps of FIG. 14h are described in connection with organizing data in connection with an operator number, it will be appreciated that the number, input via keypad 122, need not only be indicative of an operator change, but it may also be indicative of changes in vehicle status occurring while under the control of a single operator, e.g., hauling, break time and other identifiable time segments in a daily routine. For example, summaries in accordance with FIG. 14h may be kept for the duration of the control by an operator, but entry of an additional number via keypad 122 may be recognized by the sensor processing unit 101 as identifying a loader for which summaries are also to be kept. When the vehicle is directed to a different loader, the operator merely enters the new loader number into the sensor processing unit 101 via the keypad 122 and, in response to the number change, the unit outputs the performance summaries while the vehicle was loading from the previous loader. Alternatively, a transponder-type arrangement such as a RF transponder may be used to automatically identify a loader. From the foregoing, other natural extensions of this concept exemplified in FIG. 14h will be obvious to those familiar with vehicle management.

The flowchart for the Operator Summary Subroutine sets forth exemplary types of data that can be stored and summarized by the on-board weighing device during its normal operation. For example, since the on-board weighing device calculates the total load for each hauling cycle, the load weight may be stored and accumulated for all the hauling cycles for a particular vehicle and operator number. By accumulating pressure readings from the on-board weighing device which reflect the total tonnage hauled by the operator, useful information indicative of operator performance can be obtained.

In order to mark the end of the time interval for which the vehicle was under the control of the previous operator number, the present time is read in step 669. In step 670, the current time or real time read in step 669 is designated as the "new operator time." To find the elapsed time of control under the previous operator, the old operator time is subtracted from the new operator time in step 671. In order to prepare for the next operator change, step 672 sets the new operator time identified in step 670 equal to the old operator time. In step 673, the total tonnage hauled is divided by the total number of buckets (which is also counted and accummulated) in order to give an indication as to the average weight for each bucket. The weight of the average load is found in step 674 by dividing the total tonnage hauled by the total number of loads. In addition, in step 675, the total number of spikes recorded during the hauling cycles is divided by the total number of loads to provide an average number of spikes for each load which is indicative of the degree of road roughness. To provide an indication of tire use, the subroutine calculates a value for tons-miles per hour in step 676 by dividing the total "ton-mile" from step 435 by the total time under operator control. In order to display the average time for a haul cycle, step 677 divides the total time under operator control by the total number of loads hauled by the operator. To find the average distance traveled per load cycle with the body of the vehicle raised, step 678 divides the total body-up distance (from step 522) by the number of body-up loads (step 525). The foregoing data is stored in ARRAY III of RAM 125.

In step 680, the average number of buckets per load is calculated from information accumulated during the hauling cycle—i.e., the total number of buckets from step 790 and the total number of loads hauled by the operator. In step 690, the average time between buckets is calculated. Since the addition of each bucket is sensed by the routine of FIG. 14f, the time between successive buckets is easily determined (in step 690). By summing the times and storing the sum in ARRAY II, the average time between buckets for an operator can be calculated and printed. This average will give an indication of possible problems during the loading cycle. In step 700, the longest time interval between buckets for each hauling cycle (from step 1020) is summed and divided by the total number of hauling cycles to give a value indicative of the average maximum elapsed time interval between buckets for the operator. Finally, in step 710 the average values calculated in steps 673–700 are printed by printer 117 in order to give the operator and his employer a hard copy of the foregoing hauling parameters. Of course, as with the previous data outputs, this data may be transferred to ARRAY VII to await downloading to a central station via a radio data link established by the on-board transceiver 150. From step 710, the subroutine returns to the main program at step 280.

XIV. Detection of a Load Imbalance

Figure 14I:
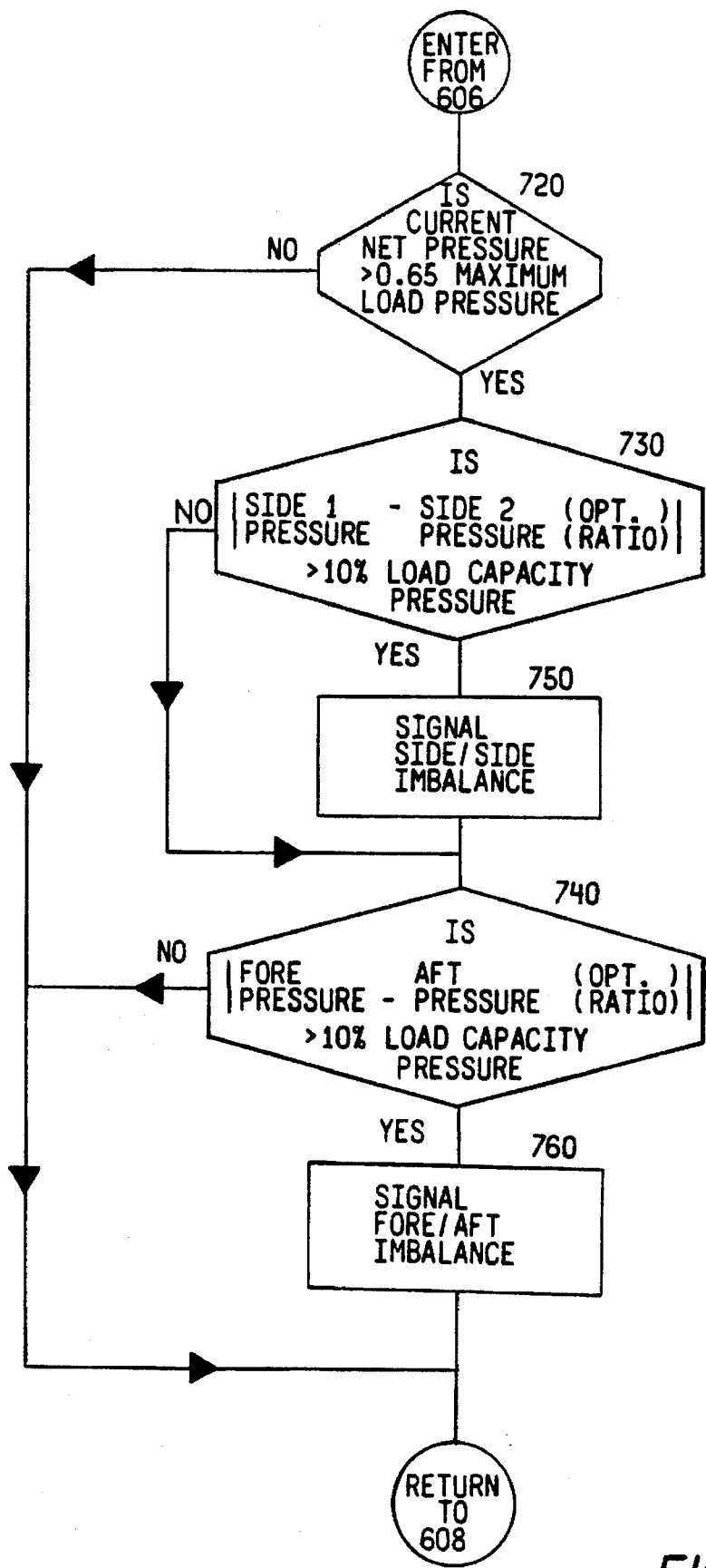

Referring now to FIG. 14i, the Imbalance Subroutine called from step 606 in the routine of FIG. 14f tests to determine if the weight distribution of the load carried by the vehicle body 13 is significantly imbalanced. In step 720, the Imbalance Subroutine checks to determine if the most recent net pressure reading is greater than 65 percent of a predetermined maximum load pressure. If the vehicle body 13 has not yet been loaded to this percentage of its capacity, then the program will exit the subroutine and return to the main program at step 608 in FIG. 14f. When the vehicle body has been loaded to a weight which is greater than 65 percent of the maximum load the Imbalance Subroutine will test for side-to-side imbalance and fore-and-aft imbalance in steps 730 and 740, respectively.

In step 730, the side-to-side balance is tested by determining if the optimum balance ratio (i.e., 1.0) multiplied by the pressure of the second side and subtracted from the pressure of the first side has an absolute value greater than, for example, ten percent of the truck's load capacity. If the test in step 730 indicates an imbalance of the load, the subroutine activates the display 136 (FIG. 12), audio output 119 (FIGS. 3 and 12) and/or printer 117 (FIGS. 3 and 12) at step 750 in order to warn the operator of the vehicle. This data may also be downloaded via ARRAY VII. From step 750, the program checks for fore-and-aft imbalance at step 740. Alternatively, if a side-to-side imbalance is not indicated by the test in step 730, the subroutine branches directly to step 740 where an algorithm similar to the algorithm in step 730 is utilized to test for a fore-and-aft imbalance. (The optimum ratio for fore-to-aft balance may be, for example, −3 to +3.) If a fore-and-aft imbalance is indicated in step 740 the program moves to step 760 wherein the display 136 imbalance signal 121 (FIGS. 3 and 12) and/or printer 117 (or other indication such as vehicle mounted light to alert loader operator) is activated to alert the vehicle operator that the vehicle body is loaded in an imbalanced condition which may cause damage to the vehicle (this data may also be downloaded via ARRAY VII). From the Imbalance Subroutine, the program moves to the Load Analysis Subroutine.

XV. Analysis of Loading Process

Figure 14J:
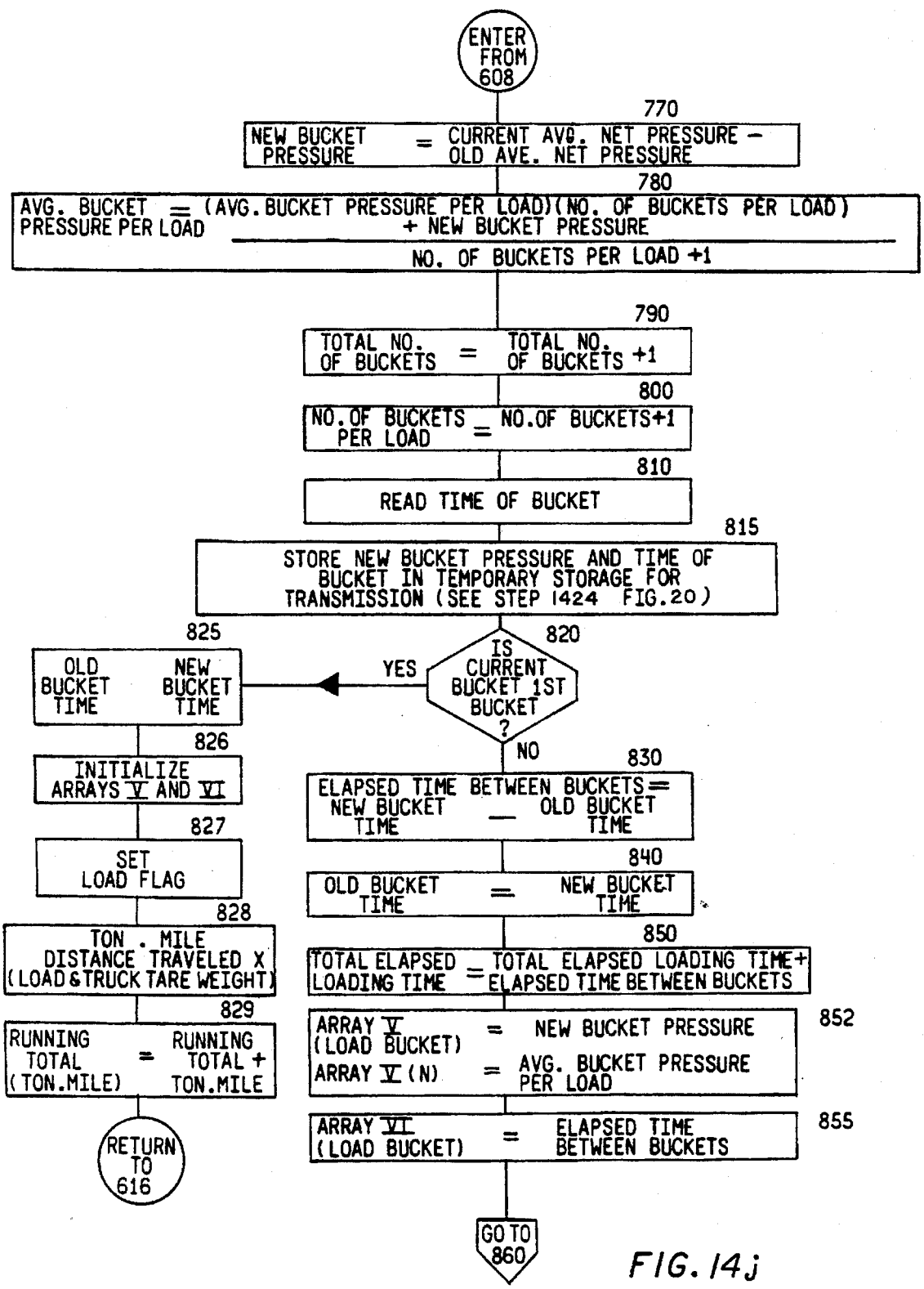

Referring now to FIG. 14j, the Load Analysis Subroutine provides data related to the loading of the vehicle body by a shovel or a loader using a bucket to load the body. By analyzing and summarizing data related to the buckets which are incrementally loaded into the vehicle body, useful information regarding the efficiency of the loading cycle can be obtained. The Load Analysis Subroutine is called from the routine of FIG. 14f if it is determined at step 592 that the current average of the net pressure readings in ARRAY I is greater than the old average net pressure plus a predetermined constant. As explained in connection with FIG. 14f, when the current average-of the net pressure readings in ARRAY I is greater than the old average of the net pressures plus a constant, it can safely be assumed a bucket has been added into the body of the vehicle; therefore, the Load Analysis Subroutine will be executed starting at step 770 wherein a new bucket pressure is calculated by subtracting the old average net pressure from the current average net pressure.

In step 780, an average value for the bucket pressure for this load is calculated by multiplying the previous average bucket pressure per load by the number of previous buckets per load and adding the product to the new bucket pressure calculated in step 770. The foregoing sum is then divided by the number of buckets per load which is the number of previous load buckets plus one. In steps 790 and 800, the subroutine updates the number of total buckets and the number of buckets for the current loading cycle, respectively. In steps 810–815, the time of the bucket is recorded for use in connection with steps in the Load Analysis Subroutine to be discussed hereinafter.

In step 820 of the Load Analysis Subroutine, a test is conducted to determine if the current bucket is the first bucket of a hauling cycle. If the current bucket is the first bucket of a hauling cycle, the program branches to steps 825–829 before returning to the main program loop at step 616 in FIG. 14f. For use in connection with later calculations related to bucket loading time and total buckets, step 825 renames the "new bucket time" as the "old bucket time" and initializes ARRAYS V and VI of RAM 125. For use in connection with communicating with a central station for controlling the flow of the vehicle fleet, a load flag is set in step 827. This flag may be used in connection with transmitting data from the on-board weighing device to a central station. Finally, in steps 828 and 829, a fresh ton·mile rating is taken which corresponds to the ton·mile rating for the haul segment from the dump site to the loading site.

If the current bucket is not the first bucket of a hauling cycle, the program branches from step 820 to steps 830–860. In step 830, a calculation is made of the elapsed time between the addition of the current bucket and the time at which the previous bucket was added at step 830. In step 840, the bucket times are updated in order to prepare the data for the next bucket. In step 850, the elapsed time between the current bucket and the previous bucket is added to a running total of time intervals between buckets to provide a total elapsed loading time. This total elapsed loading time is used in connection with step 690 of the Operator Summary Subroutine in order to provide data indicative of vehicle and operator performance.

In order to store the net pressure of each bucket, step 852 loads ARRAY V with the pressures for all the buckets of a current load cycle. The last cell, N, in ARRAY V is used as a storage location for the value of the average bucket weight for a load. In connection with the storage of these pressures, step 855 stores the elapsed time between the addition of buckets in a load cycle in ARRAY VI. The data in ARRAYs V and VI may be used in connection with providing a detailed performance report of each loading cycle.

In steps 860–885, the longest elapsed time between buckets is found. In step 860, the program tests to determine if the current bucket is the second bucket. If the current bucket is the second bucket, then the program automatically designates the current elapsed time between buckets as the maximum elapsed time between the buckets in step 870. Alternatively, if the current bucket is not the first or second bucket as determined in steps 820 and 860, the program will branch to step 880 wherein the current elapsed time between buckets is tested to determine if it is greater than the maximum elapsed time between buckets previously recorded. If the current elapsed time between buckets is not greater than the previously recorded maximum elapsed time between buckets, the program branches to step 890 (FIG. 14k); otherwise, the program designates the elapsed time between buckets as the new maximum elapsed time between buckets at step 885. The maximum elapsed time is used in connection with step 700 of the Operator Summary Subroutine.

XVI. Loading Lights

Figure 14K:
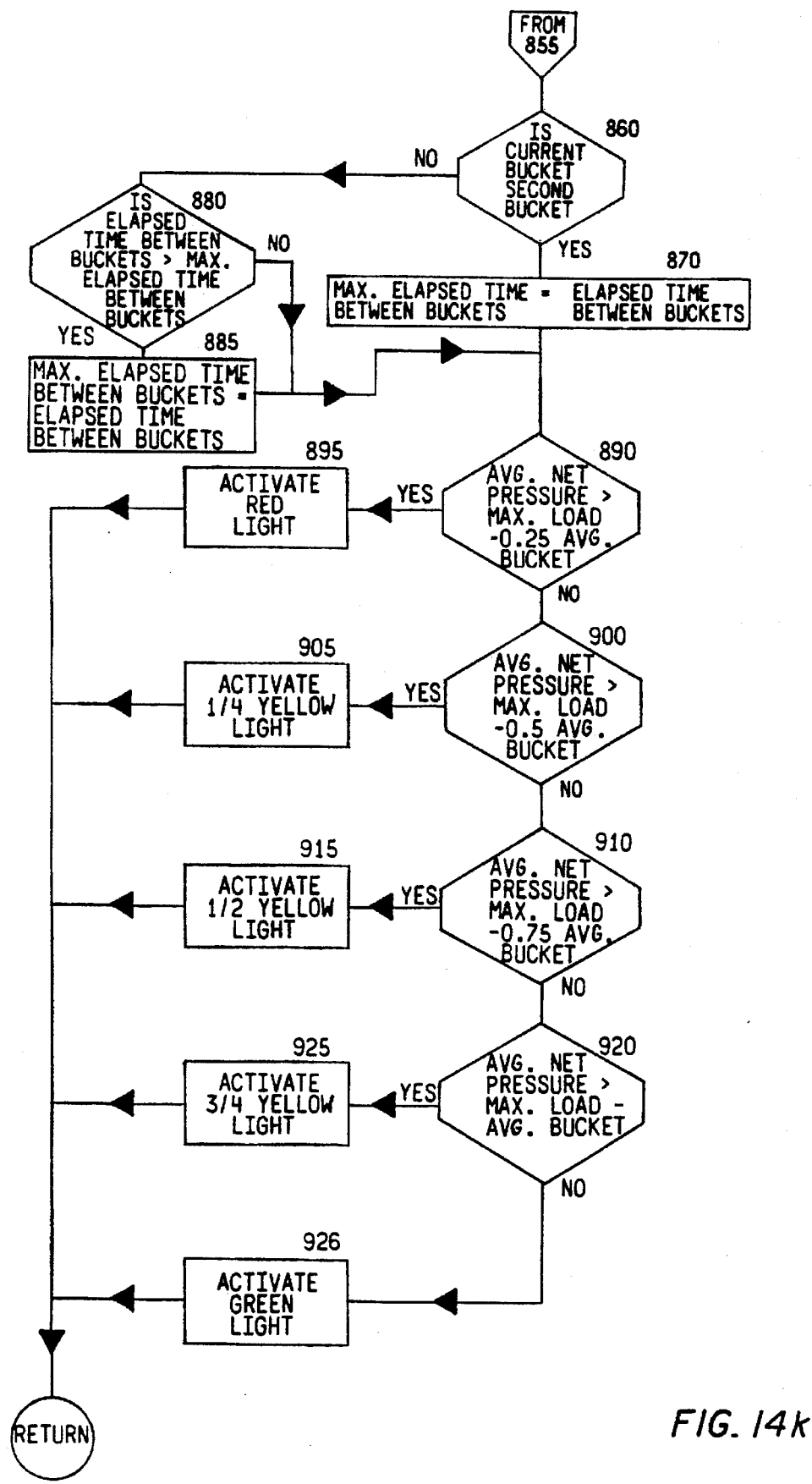

Referring now to FIG. 14k, the current average net pressure is tested to indicate whether the load of the vehicle body is sufficiently close to the maximum load capacity of the vehicle such that further addition of material by a full bucket would overload the vehicle body. In order to prevent the vehicle from being overloaded, steps 890–920 test to determine if the remaining capacity of the vehicle body 13 is less than the weight of an average bucket being loaded for this load as calculated in step 780 of the subroutine.

Specifically, in step 890 the average net pressure is compared with the predetermined maximum of the vehicle body minus one-quarter of the average bucket..If the average net pressure is greater than the maximum load minus one-quarter of the average bucket, the vehicle body will be overloaded by the addition of as little material as fills one-quarter of the bucket. Therefore, the subroutine branches to step 895 wherein the red light 123e of the load indicator panel is activated. The red light 123e serves to warn the loader operator that the vehicle body 13 is loaded to capacity and to stop loading the vehicle body.

If the average net pressure is not greater than the maximum load minus one-quarter of the value of an average bucket the subroutine moves to step 900 wherein the current average net pressure is compared with the predetermined maximum load minus one-half the value of an average bucket. If it is determined that the current average net pressure is greater than the maximum load minus one-half the average bucket, the subroutine branches to step 905 wherein the one-quarter yellow light 123d of the load indicator 123 in FIG. 3 is activated. For the loader operator, the one-quarter yellow light 123d indicates that load may be added to the vehicle body 13 but only in an amount less than one-quarter of the volumetric capacity of the bucket of the loader.

If the test in 900 determines that the average net pressure is not greater than the maximum load minus one-half the average bucket, then the subroutine tests at step 910 to determine whether the current average net pressure is greater than the maximum load minus three-quarters the value of the average bucket. If a positive determination is made in step 910, the subroutine branches to step 915 wherein the one-half yellow light 123c is activated on the load indicator 123. In a similar manner as the one-quarter yellow light 123d, the one-half yellow light 123c indicates to the operator of the loader that the next bucket of material must be no greater than one-half the volume of the bucket in order to avoid overloading the vehicle body 13.

If the test in step 910 is negative, the subroutine tests to determine if the current average net pressure is greater than the predetermined maximum load minus a full average bucket. If the test in step 920 is positive, the subroutine activates the three-quarter bucket load yellow light 123b of the load indicator 123 in step 925. If the test step 920 is negative, the green light 123a of the load indicator 123 is activated in order to indicate to the operator of the loader that a full bucket load of material may be added to the vehicle body 13 without overloading the body. From steps 890–926, one of the lights 123a–e on the load indicator 123 will always be activated during the loading of the vehicle body 13.

Digressing briefly to FIG. 3, the lights 123a–e of the load indicator 123 are positioned in a stacked arrangement such that there relative positions give an indication of the degree of remaining vehicle capacity. Specifically, the green light 123a occupies the lowermost position in the stack of lights 123a–e, thereby indicating that the vehicle body has capacity for a full bucket load. The red light 123e at the top of the stack, indicates the vehicle body is full and no further bucket loads should be added. The three yellow lights 123b–d are positioned intermediate the green and red lights in order to indicate weight bucket capacities intermediate the full bucket capacity symbolized by the green light 123a and no remaining capacity symbolized by the red light 123e.

XVII. Analysis of Axle Loads

Figure 14L:
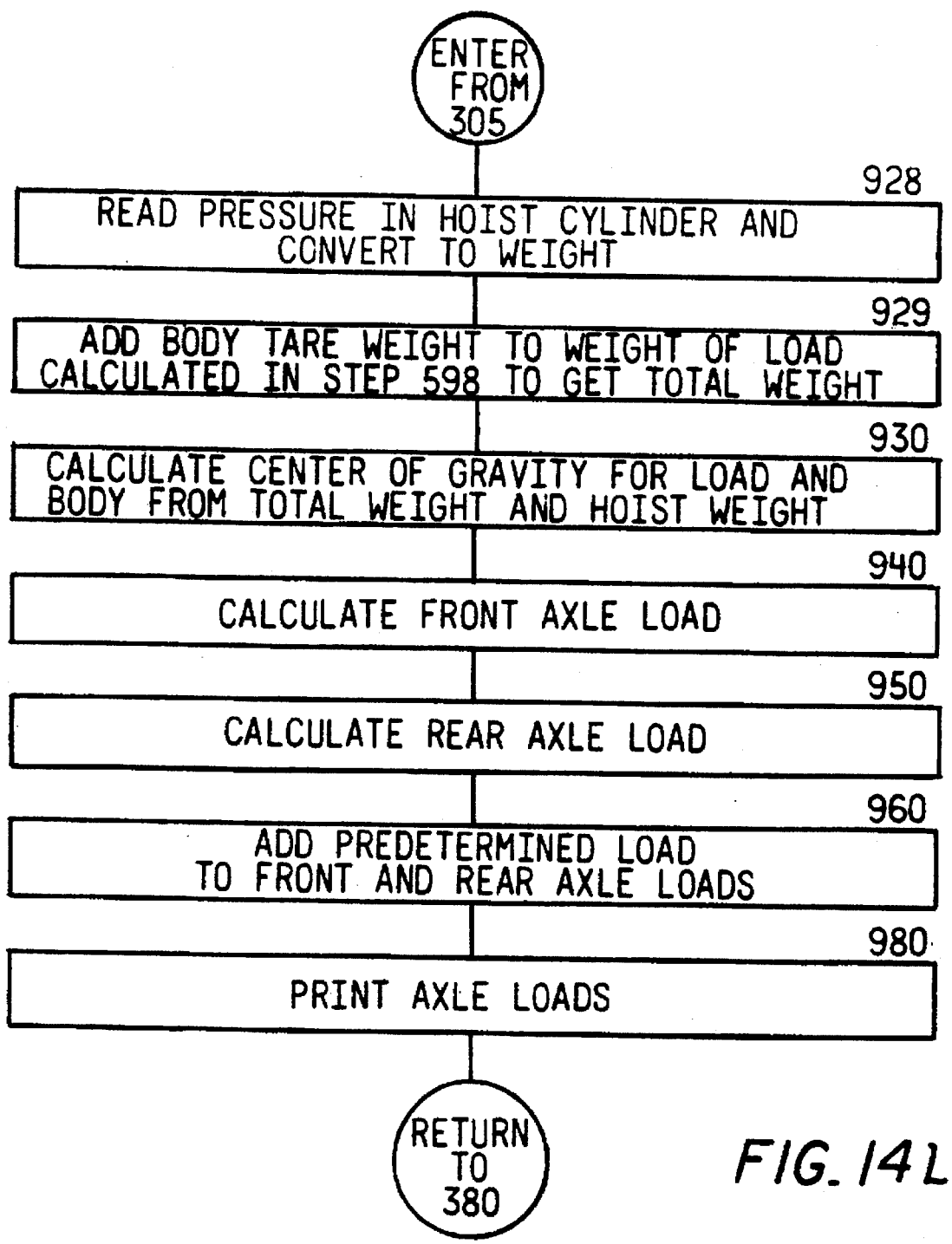

Referring now to FIG. 14L, the Axle Load Analysis Subroutine is called from the main program at step 305 when a determination is made in step 304 that the operator has called for an analysis of the axle load. As explained in connection with the illustration of FIGS. 10a and 10b, the pressure in the hoist cylinders 19 and 21 is required to calculate the distribution of the load between front and rear axles. Accordingly, in step 928 the pressure from transducer 102 (FIGS. 3 and 12) is read by the MPU 103 and converted to a weight measurement. In order to get a total body weight, the weight of the load derived from the current average pressure is added to the tare weight of the vehicle body in step 929. In step 930 the center of gravity for the load is calculated from the total weight and the weight measurement from the sensor 102 in the hoist cylinder system. The particular algorithm used in step 930 in order to calculate the location of the center of gravity for the load is set forth as equation (2) in connection with FIGS. 10a and 10b. With the center of gravity for the load known, the distribution of the load over the front and rear axles is determined in steps 940 and 950, respectively, using equations 4 and 6.

In step 960 the tare weights for the front and rear axle are added to the axle loads for the front and rear axles calculated in steps 940 and 950. Therefore, the weight for the front and rear axles obtained from step 960 reflects a total weight on the front and rear axles. Finally, in step 980, the subroutine commands the printer 117 to print the weights bearing on the front and rear axles (or store in ARRAY VII).

XVIII. Totaling of Parameter Values at End of Haul Cycle

Figure 14M:
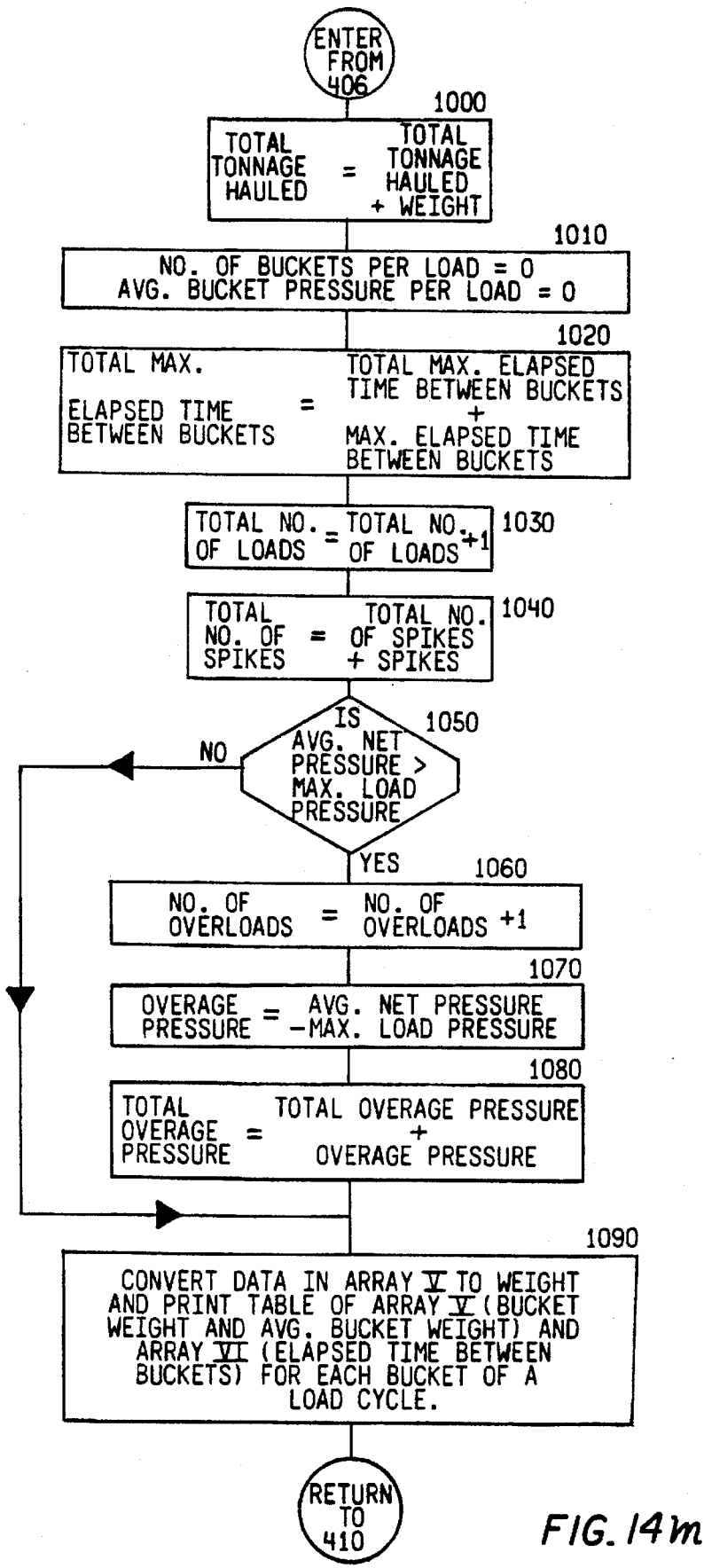

Turning now to FIG. 14m, the Dump Subroutine is called by step 406 of the main program after the dump sensor has been activated as detected in step 400. The Dump Subroutine summarizes selected parameters at the end of a hauling cycle which is indicated by the activation of the dump sensor 109. In step 1000, the current average net weight is added to the total of previous weights hauled in order to provide the total tonnage hauled by the vehicle while under control of the operator. The total tonnage hauled is used in connection with the Operator Summary Subroutine. Because the activation of the dump switch 109 indicates an end to a hauling cycle, the number of buckets per load and the average bucket pressure per load are set equal to zero in step 1010 in order to initialize these values for the next hauling cycle. In step 1020, a total maximum elapsed time between buckets is updated by adding the maximum elapsed time between buckets for the last loading cycle.

In order to record the number of hauling cycles, step 1030 increments a stored number identified as "total number of loads" which is used in connection with the Operator Summary Subroutine to provide averaged data indicative of operator performance. In order to keep track of road roughness, the total number of spikes recorded during a hauling cycle is added in step 1040 to the number of spikes during previous hauling cycles. The total number of spikes is used in connection with the Operator Summary Subroutine in order to provide an indication of road quality. Following step 1040, spikes are set equal to zero in order to provide a fresh basis for accumulating spikes in the next load cycle.

In step 1050, a test is conducted to determined whether the current average net pressure is greater than a predetermined maximum pressure which corresponds to the maximum weight capacity of the vehicle. If the test in 1050 is positive, the overloading of the vehicle is recorded in steps 1060–1080. In step 1060, an overload counter is incremented to indicate that the present hauling cycle was an overload cycle. In step 1070, the amount of overloading or "overage pressure" is calculated by subtracting the average net pressure from the maximum allowable pressure. The overage pressure for the present hauling cycle is added to a total overage pressure for all hauling cycles in order to provide a pressure value indicative of the total weight by which the vehicle has been overloaded. From either step 1080 or from a negative indication in step 1050 the Dump Subroutine moves to step 1090 wherein the printer 117 (FIGS. 3 and 12) is activated to print the weight of each bucket for the just completed haul cycle (stored in ARRAY V) and the elapsed time between each bucket (stored in ARRAY VI). This data may also be transferred to ARRAY VII for downloading.

XIX. Real-Time Downloading of Data

As is apparent from the foregoing description, large amounts of data are gathered from the on-board weighing device and related on-board sensors. When a plurality of trucks in a fleet are equipped to collect such data, in order for this data to be most efficiently collected and correlated it can be downloaded in order to create and maintain a historical data base of vehicle fleet activity and performance. Obviously, the printer 117 provides a permanent record. However, for large fleets it is cumbersome, at best, to store this data in this form with an intent of later analyzation and reference. Therefore, to allow the data generated to be more easily manipulated and analyzed, the sensor processing unit 101 may be coupled to a storage memory such as a cassette tape or non-volatile memory pack to download the ARRAYS when they reach their capacity. However, any downloading to paper tape, cassette tape or memory pack, in this manner is not on a real-time basis and this requires data collection operator or management intervention in order to assure that the downloaded data is collected in a timely manner—e.g., collection of paper tape.

Therefore, preferably, and in accordance with one aspect of the invention, the accumulated real-time data can be of the most value if it is downloaded by a data link from the on-board device to a remote fixed location where a historical real-time file can be created and analyzed in order to give management personnel at a remote site a current indication of vehicle fleet performance. By analyzing the downloaded real-time data, the truck loading equipment may also be evaluated. As a feature of the real-time data downloading, each vehicle in a fleet is able to communicate with a central station via data links. In turn, data may be communicated back from the central station to the individual trucks;. therefore, instructions/directions can be sent selectively to haulage vehicles.

Figure 25:
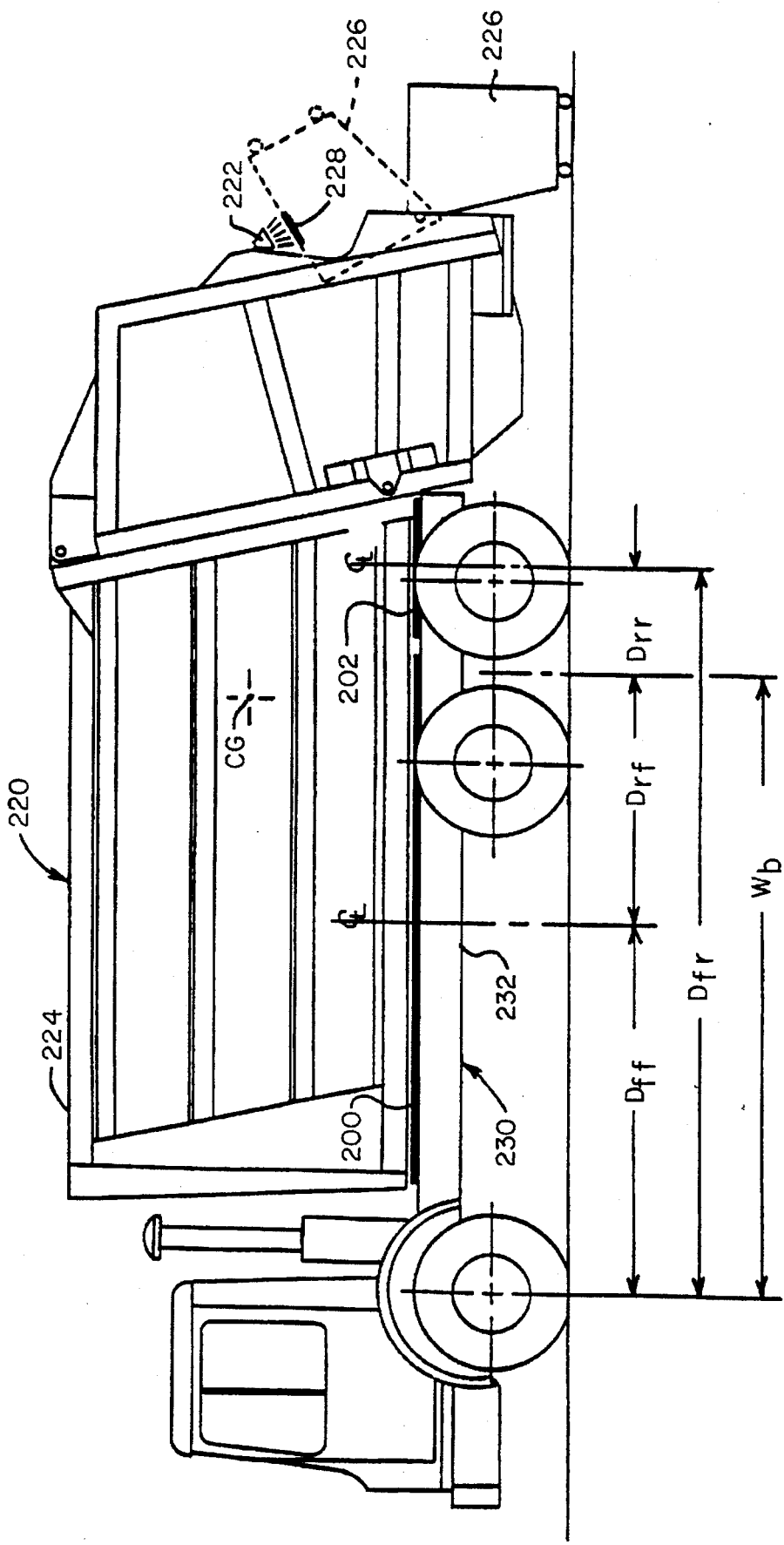
FIG. 25 illustrates a side view of a fixed-body vehicle wherein the body is supported on the frame of the vehicle by an on-board weighing device similar to that illustrated in FIGS. 1a and 1b, and the vehicle includes an on-board apparatus for providing location data according to an alternative embodiment of the invention.
Figure 27:
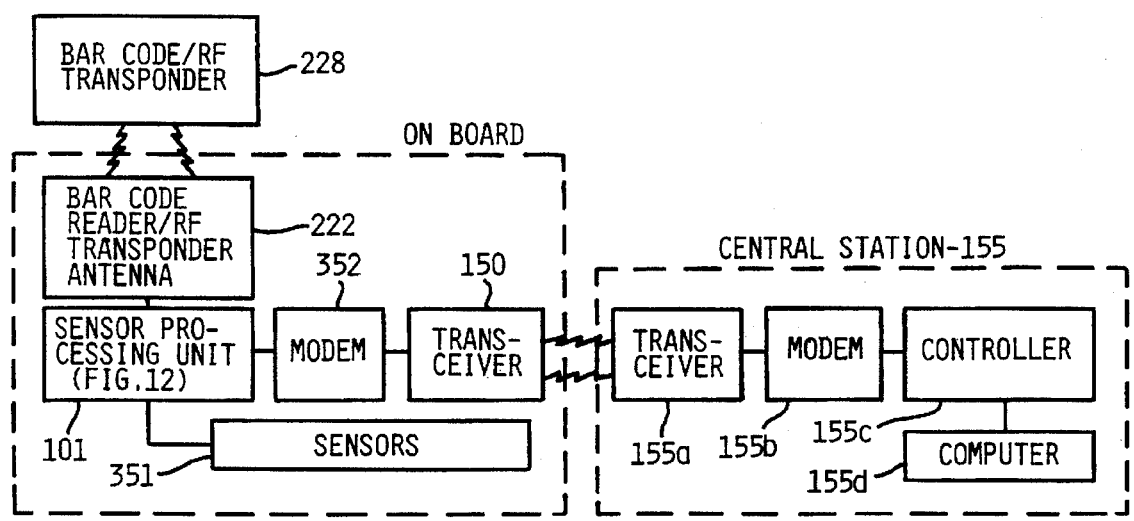
FIG. 27 is a system-level diagram of the data transfer of location and load data from on board the vehicle of FIG. 25 to a remote central station via a wireless data transfer link in accordance with the invention.

The organization of data to form the particular data bases discussed herein is intended to be only exemplary. The creation of particular data bases will depend on management objectives. In the embodiment in FIGS. 13 and 14, historical data bases are created in memory stored on-board the vehicle. It will be appreciated that these data bases may be downloaded to a fixed-site facility for use by management personnel either on a real-time basis or at periodic intervals such as the end of a work shift. The data base of FIGS. 19a–19d define files containing time segments of a haul cycle. In the illustrated embodiment, these files are used to implement dispatching of vehicles. Location data can be particularly useful in combination with weight data for providing information to management in the form of a historical data base. Such a data base allows management to critique vehicle performance and make adjustments to vehicle routes, for example, if necessary to improve performance. Such a data base may also serve as a basis for a real-time vehicle dispatching function. FIGS. 25 and 27 illustrate the implementation of a location/load system in accordance with the invention in connection with a refuse-hauling vehicle.

(A) Downloading to Implement Automatic Dispatching

Referring to FIGS. 15a and 15b, in mining operations or similar type hauling, it is not unusual for there to be simultaneously hauling of overburden, coal or the like. Also, in large operations, more than one loader 160 services the vehicle fleet and there may be more than one dump site. Gathering data generated by the sensor processing unit 101 and controlling traffic flow from the dump sites to the loaders 160 or vis-versa becomes unwielding, and therefore inefficient, when the mining operation is large and many trucks and loaders are involved. As a function of its data gathering capabilities, the on-board weighing system described herein allows the electronic system of FIG. 12 to accurately record the elapsed time of a hauling cycle or segments thereof and, since the on-board weighing system provides an indication to the electconic system when a load cycle begins and ends, as a transceiver 150 and 198 is mounted to each vehicle 11 (illustrated in FIG. 3) for data downloading with a central station 155 data can be gathered by the central station 155 and analyzed. This data can be utilized by the central station to provide instructions and directions for efficient traffic control and remote monitoring of vehicle performance. Other data, in addition to the above, as outlined in the flowcharts of FIGS. 14a–14m can also downloaded to the central station 155 for storage and analysis.

Because the on-board weighing device and its associated circuitry determines when vehicle loading starts (the first bucket is sensed) and vehicle loading ends (first gear shift after first bucket) and when dumping begins, the central station 155 is able to use this data (as well as other operating data) to provide instructions and directions for controlling movement of the haulage vehicles without depending on any human cooperation, e.g., no one need remember to manually hit a load or dump switch to signal the central station. Because the system is fully automated, it is highly reliable. In addition, the data gathered by real-time data downloading from the on-board weighing device, when stored and analyzed by the central station, allows precise control of the routing of the vehicles for top efficiency.

Figure 16A:
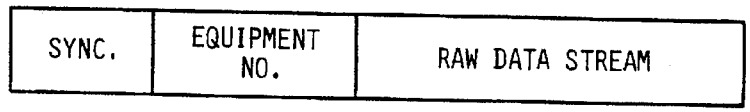
FIGS. 16a and 16b are schematic diagrams of the format used to transmit data from each vehicle to the central station in FIGS. 15a and 15b and, if a control function is operating from the central station to a desired vehicle, respectively.
Figure 16B:
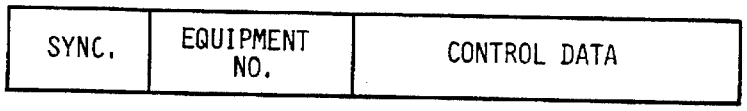

Referring to FIGS. 16a–16b, by way of RF transceiver 150 each of the vehicles 11 downloads a data frame comprising a synchronization word followed by the equipment (e.g., vehicle) number and the raw data, including equipment location from the signposts. The type of data is identified to the central station 155 by its position in the data stream. In response to the position of the data in the data stream, the central station 155 stores and analyzes the data in the appropriate manner. After the central station 155 properly analyzes this data it may, depending on vehicle status, send a data frame comprising a synchronization word sequentially followed by the particular equipment number and control data.

In operation, the central station 155 receives the raw data in the data stream from a vehicle 11 in response to a polling request provided by the RF link and updates its data base with new data. If the present status indicates the vehicle requires a dispatch instruction for its next destination, the central station makes a decision based on its data base and transmits by way of transceiver 155a (FIG. 17) a data frame as illustrated in FIG. 16b, containing a particular equipment number the central station wishes to address and a particular destination I.D. which the central station wishes to direct the vehicle.

Obviously, whether the data frame includes load or dump data indications depends on whether the dump switch 109 has been activated or whether a first bucket has been added. As will be explained in greater detail in Connection with FIGS. 21–24, the central station 155 receives the data in the data frame from the vehicles 11 and concludes from the data which loader 160 can provide the quickest load cycle time for a vehicle now loading and therefore ready for instructions and/or directions to a dump site and subsequent load site. Alternatively, designation of a loader 160 can wait until the vehicle 11 has reached its commanded dumpsite. Once the central station 155 has determined which loader will minimize the time of a haul cycle and/or which dump site is the proper one, the central station transmits by way of transceiver 155a (FIG. 17) the data frame containing a particular vehicle number the central station wishes to address and a particular loader or dump site number to which the central station wishes to direct the vehicle. Each vehicle receives the data frame from the central station 155, but only the vehicle having the same vehicle number as the number transmitted will respond to the data containing the loader/dump site destination number. When the vehicle number and the vehicle data number correspond, the loader/dump site or other site designation number transmitted with the vehicle number is either displayed on the LED display of the designated vehicle or printed as hard copy on the vehicle's printer 117. From the destination number, the vehicle operator knows which loader to go to for his next task. For example, the central station 155 delivers loading area destination data to a hauling vehicle in an open-pit mining operation after the vehicle has dumped its load. Many other useful destination commands will be appreciated by those familiar with mining operations.

In the system of FIG. 15a, the central station 155 communicates with each of the sensor processing units 101 on board the vehicles by way of an electromagnetic link (preferably an RF link). Data transmitted to the central station 155 from each of the sensor processing units 101 by way of the on-board RF transceiver 150 (FIG. 3) is processed by the central station and instruction data is returned to each sensor processing unit 101 via the RF link.

In keeping with the invention, means are provided for providing location data which compliments the weight data gathered by the on-board processor 101. The location data may be generated by the detection of signposts locally positioned with respect to the work areas of the vehicles. Alternatively, the signposts may be remotely located and together form a network which grids the work area. Such a remote system may be LORAN-based or GEOSTAR-based systems. In this regard, the system of the invention on-board the vehicle 11 may include a location device (200 in FIG. 12) similar to those used in other known applications to detect location signals generated by a LORAN or GEOSTAR system.

Referring to FIGS. 15a–15b, a plurality of local signposts are provided at intended locations of the vehicles wherein each signpost is characterized by indicia that are distinctive to the associated destination. On board each vehicle is an apparatus for detecting the indicia of each signpost and generating data indicative of vehicle location. The location data is correlated with data from some or all of the sensors 102, 105, 107, 109, 110, 113 and 116 in FIG. 3 by either the sensor processing unit 101 on board each vehicle or by the central station 155. A data base developed by the central station 155 from data downloaded from all the vehicle sensor processing units 101 provides the central station with an information base for monitoring and controlling the movement of the vehicles 11. Specifically, the downloaded data may be used by the central station 155 to route a vehicle which has just loaded to a dump site and then after the vehicle has dumped its load to a piece of loading equipment that is the least busy.

In a first embodiment, an infrared (IR) transceiver 198 in FIG. 3 is mounted to each vehicle for detecting coded IR radiation within a predetermined range of the source of the radiation such that detection of the coded IR radiation provides an indication of the location of the vehicle within the working area. Radiation from each IR source is uniquely coded so that the sensor processing unit 101 associated with the detecting transceiver may identify the region of the working area the vehicle is within. Because the IR radiation is greatly attenuated as it propagates through the air, the effective range of each source is quite limited. Although this feature of significant attenuation is commonly viewed as undesirable, in the system of the invention it is a desirable feature because multiple IR sources can be strategically placed in the working area of an open-pit mine site yet remain separated by distances such that their effective ranges do not overlap.

In FIGS. 15a and 15b, infrared or IR radiators 180 are signposts according to the invention that are strategically placed such that their effective ranges (indicated by the dashed closed loops) do not overlap. Distribution of the IR radiators may be limited to only load and dump sites or it may be more extensive and include intermediate or in-transit locations as suggested by IN-TRANSIT AREA 1 in FIGS. 15a and 15b. Finally, the IR link between a loader and a vehicle may be bi-directional in order to give the operator of the loader an indication of the vehicle's load condition. Such a communication link would be similar to the link set forth above in connection with the central station 155.

For example, as the vehicle 11 in FIG. 15a leaves the DUMP AREA 1, it is notified by the central station 155 which loading area (n) has the minimum delay. The vehicle 11 is then on its way to that particular loading area. The vehicle 11 may possibly accumulate some data in route to that particular loader 160. If the vehicle is polled again in transit, hauling and location data accumulated enroute to the designated loading area (n) is transmitted to the central station 155.

Once the vehicle 11 gets to its designated loader 160 or loading area, the gearshift is placed in neutral or reverse by the driver. This change in gear is detected by the F-N-R direction switch 107 of the on-board weighing apparatus and the data is downloaded via the RF transceiver 150 to the central station 155. Because the downloaded data includes a location code from the IR transceiver 198, the central station 155 thereby has further confirmation that the vehicle 11 has arrived at the designated loader. An example of an IR receiver suitable for implementing the invention on each vehicle is an Automata "IRRX" infrared receiver manufactured by Automata Corporation, Grass Valley, Calif. An IR transmitter suitable for use as a signpost is a pared down field station with an infrared transmitter that is also manufactured by Automata. The function of the IR signpost 180 is to send a location I.D. number to the IR receiver on board each vehicle 11. Each IR transmitter 180 is adjusted to have a wide angle transmit beam.

FIG. 15b illustrates alternative means for downloading data to the central station 155. If each signpost utilizes an IR transceiver (instead of only a transmitter as in FIG. 15a), data may be download from a vehicle within the effective area of the signpost via an IR link between the signpost and the IR transceiver 198 mounted on the vehicle. From each signpost, the downloaded data can be transferred back to the central station 155 via either an RF link provided by RF transceivers 181 similar to those on board the vehicles in the system of FIG. 15a or via a hard-wire link 182 provided by cable connections from each signpost to the central station. Data is transferred to the vehicles by the reverse routing—i.e., RF or hard-wire link to infrared link. In certain situations, the alternative approach suggested in FIG. 15b may be more economical than that of FIG. 15a since a RF transceiver need not be provided for every vehicle 11.

The central station 155 or base station may use its data base developed from information downloaded to it from the various on-board weighing devices to develop a dispatch signal for each vehicle as it leaves a signpost location site. Specifically referring to FIGS. 15a and 15b, the central station 155 includes means for determining the loading area (n) that is the least busy and means for dispatching the vehicle to that area. The data base developed by the central station 155 includes records of elapsed times for different segments of a haul cycle. Preferably, these segments include 1) loading time, 2) loaded haul time, 3) actual return time and 4) queuing time at the loading site. A complete haul cycle is defined as a completed round trip from a load site to a dump site and back to the load site or from a dump site to a load site and back to a dump site. In order to organize the collected data, the data base preferably is comprised of a file for each hauling segment. In order to fill each file with data, the sensor processing unit 101 accumulates the appropriate data and downloads it to the central station 155 via the RF link as will be explained more fully hereinafter.

For the loaded haul time, the sensor processing unit 101 begins to accumulate time after the F-N-R direction switch 107 is first shifted to its forward position for a measurable period of time after the on-board weighing device indicates loading has begun. The sensor processing unit 101 stops accumulation of loaded haul time when a signal is detected from the dump switch 109 indicating the load has been dumped.

For loading time, the sensor processing unit 101 reads data from the on-board weighing device and the F-N-R switch 107. When the sensor processing unit 101 senses an increase in the load carried by the vehicle, the sensor processing unit 101 begins to accumulate time as "loading time". Accumulation is stopped when the sensor processing unit 101 senses a shifting of the F-N-R direction switch 107 to a forward position after a measurable period of time.

For the return time, the sensor processing unit 101 begins to accumulate time after the dump switch 109 is activated, and it stops accumulating time when the on-board weighing device indicates loading has begun. In order to determine the actual return time, the processing unit 101 subtracts the "queuing time" from the return time, thereby providing a more accurate indication of the time required to return to the loading site. Queuing time is the time in which a vehicle waits at a loading area before it begins loading.

For the queuing time, the sensor processing unit 101 reads data from the distance sensor 105 (an odometer) and the F-N-R switch 107. The processing unit 101 begins to accumulate queuing time if it senses no movement of the vehicle while the F-N-R direction switch 107 is in a forward position for more than a predetermined period of time—e.g., five seconds. Alternatively, when the F-N-R direction switch 107 is placed in neutral, the sensor processing unit 101 will also accumulate queuing time.

Data gathered by each of the vehicle sensor processing units 101 are downloaded to the central station 155 wherein the accumulated data is organized into a data base having a plurality of files which not only allows the central station to dispatch vehicles to a piece of loading equipment with the shortest actual loading delay time, but also allows the central station to maintain fleet balance by sensing over or under utilization of equipment. Specifically, as part of the dispatch function, the central station 155 totals the waiting times associated with the pieces of loading equipment and determines if the overall operation is unbalanced—e.g., too many vehicles or too few pieces of loading equipment (vis-a-vis too few hauling vehicles or too many pieces of loading equipment).

During data downloading by the vehicles 11 to the central station 155, data may be transmitted indicating an "out-of-service" condition or an "in-transit" condition for the vehicle. By providing data such as the foregoing, the central station 155 may keep track of which vehicles are currently loading, dumping, in transit or out of service. As vehicles 11 are directed to various loaders 160, dump sites, etc., the central station 155 notes a projected time of arrival for the vehicle based on its historical data base as explained more fully hereafter. If a vehicle 11 fails to arrive at its designated location within this time period plus a predetermined percentage of the period, then the central station 155 may provide a sensory alert to management personnel so that the status of the vehicle can be checked. For those vehicles 11 which go out of service, the central station 155 can update the load delay for the particular loader 160 for which the out-of-service vehicle was destined.

Figure 19A:
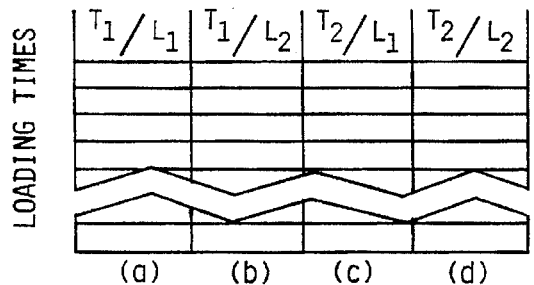
FIGS. 19a–19d are schematic diagrams of the data files formed in an electronic memory associated with the central station of FIGS. 15a and 15b which receives data from the on-board apparatus of various vehicles.
Figure 19B:
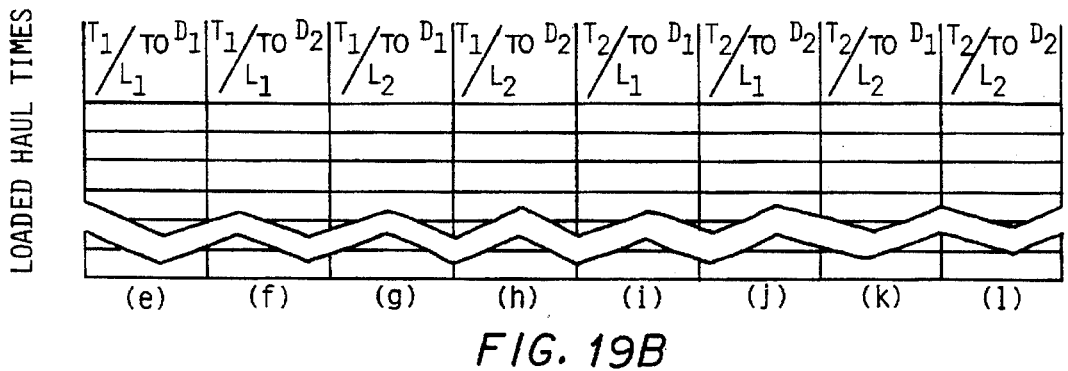
Figure 19C:
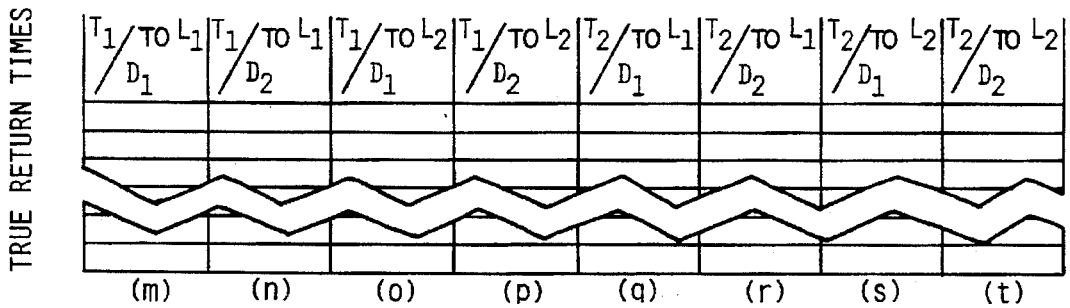
Figure 19D:
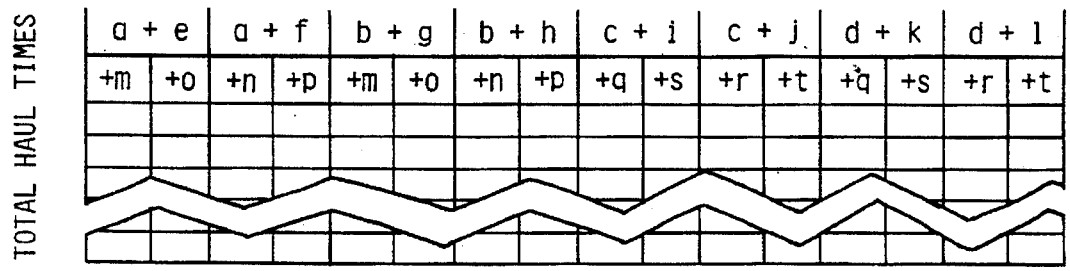

Information from each of the vehicle sensor processor units 101 is downloaded to form a central station master data base schematically illustrated in FIGS. 19a–19d that is associated with the central station 155. The files of the data base are easily manipulated in keeping with the invention to provide useful real time information to management personnel. Conceptually, the master data base shown in FIG. 19a–19d of the central station 155 contains four primary files from downloaded data:

1) Loading time for each type of vehicle with each type of loading equipment (FIG. 19a);

2) Loaded haul time from each type of loader to each dump area for each type of vehicle (FIG. 19b);

3) True return time from each dump area to each type of loader for each type of vehicle (FIG. 19c); and 4) Total haul cycle time for each type of vehicle from each type of loader to each dump area (FIG. 19d).

This master data base is constructed from an underlying data base for each vehicle (not shown).

Each of the first three data files (FIGS. 19a, 19b and 19c) records segments of a hauling cycle such that the sum of all three segments is a complete cycle. The sum of the three segments is provided in the fourth file shown in FIG. 19d. In the illustrated files, provision is made for two types of vehicles, $T_1$ and $T_2$, two loading sites, $L_1$ and $L_2$, and two dump sites, $D_1$ and $D_2$. For example, the first column in the data file of FIG. 19a is $T_1/L_1$, which indicates loading times for $T_1$ type vehicles at loading area $L_1$. In FIG. 19b, each column is the time recorded for a vehicle of a particular type ($T_1$ or $T_2$) to travel from a loading area ($L_1$ or $L_2$) to a dump area ($D_1$ or $D_2$). The data file of FIG. 19c is for the opposite route—i.e., from dump area to loading area.

As a particular example of the application of the four primary files in the master data base, if a mine has ten 170-ton Haulpak vehicles and ten 120-ton Euclid vehicles, then the central station 155 will have an underlying data base including historical subfiles for each vehicle. Data from the Haulpak subfiles are reorganized into the four primary files; a likewise reorganization is done for the Euclid data. Then, as each respective vehicle generates data, its corresponding historical subfile and the appropriate cells in the primary data files are updated. Data from the primary files may be used to dispatch the vehicles to particular locations and thereby control fleet movement to achieve a desired goal.

Finally, a portion of the data downloaded to the central station 155 may, in addition, be downloaded to a processor (not shown) on-board the loader 160 loading the vehicle in order to give the operator of the loader an indication of the vehicle's load condition. Such a communication link would be similar to the link set forth above in connection with the central station 155. The specific type of RF link could be any type of commercially available data link suitable for transfer of the type of data here involved such as the Telxon RF/FM data communication system using a two-way asynchronous protocol. Such a system is used in an RFX-10 system (full duplex), manufactured by Telxon, Inc., 3330 W. Market St., Akron, Ohio 44313. It will be appreciated from the foregoing that data such as the operator summaries of ARRAY II will be downloaded from the memory of the vehicle sensor processing unit 101 to the central station 155 for storage and analysis.

The central station 155 includes means for giving preference to certain loading sites in a dispatch decision, depending on selected parameters chosen by the operator. For example, the primary files of the data base used by the central station 155 to make dispatch decisions may be supplemented to include data for the blend of ore existing at each load site. From this additional data, certain load sites may be given preference in dispatch decisions in order to control the blend of ore at a dump site. Other factors may be integrated into the dispatch decisions in order to precisely control the mining of ore and the utilization of the vehicle fleet in a desired manner.

Figure 17:
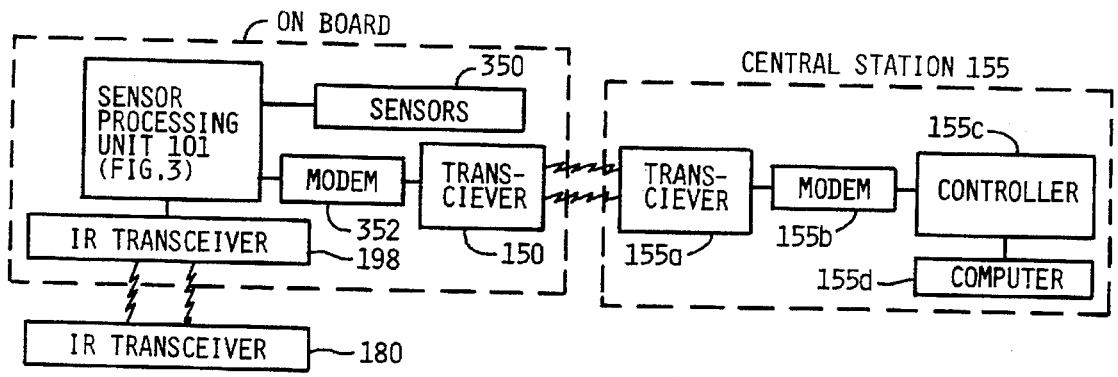
FIG. 17 is a schematic diagram illustrating the data transfer links between (1) the stationary signposts and the sensor processing unit of FIG. 12 on board each vehicle and (2) the sensor processing unit and the remote central station.

In order to provide a two-way RF link, the central station 155 includes a commercially available transceiver 155a, a modem 155b and a controller program 155c as shown in FIG. 17. Data received from the vehicles 11 is processed by a computer 155d by way of the execution of software written in accordance with the flowcharts of FIGS. 20–24. The computer 155d may be a commercially available computer such as the IBM PC AT.

To complete the RF data link in FIG. 17, a modem 352 connects the sensor processing unit 101 to the RF transceiver 150. The data inputs to the sensor processing unit 101 are provided by the on-board IR transceiver 198 and the various on-board sensors such as the on-board weighing device. The sensors are collectively symbolized by block 350 in FIG. 17 and a single signpost (IR transceiver 180) is also shown to illustrate the IR data link between a vehicle and a signpost.

Figure 18:
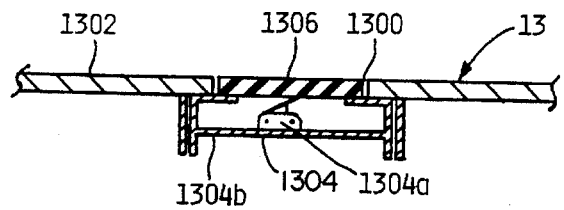
FIG. 18 is an enlarged, partial cross-sectional view of the bed of the body of a vehicle in FIGS. 15a or 15b showing an apparatus mounted below the bed as an alternative to the on-board weighing device illustrated in FIGS. 1a and 1b for sensing the presence of a load in connection with the monitoring and controlling of the vehicles of FIGS. 15a and 15b.

Referring briefly to FIG. 18, an opening 1300 may be provided in the bed 1302 of the body 13 of the vehicle shown in FIGS. 1a and 1b for allowing a switch assembly 1304 to sense the presence of a load and thereby indicate to the sensor processing unit 101 when loading begins. Such a device substitutes for the on-board weighing device of FIGS. 1a, 1b, 2 and 3 and combines with the sensor processing unit 101 to give a simplified vehicle dispatch system according to FIGS. 15a and 15b. With the addition of the switch assembly 1304 in FIG. 18, the on-board weighing device is not required for a simply dispatch system responsive to load and dump signals only.

The opening 1300 in the floor of the vehicle body 13 is covered by a flexible, but rugged material 1306 such as a thick rubber mat which is secured to the perimeter of the opening of the vehicle body. A microswitch 1304a comprises the switch assembly and is mounted to a platform 1304b positioned below the bed 1302 so that the switch is recessed into the body and the mat 1306 provides a planar continuation over the platform and switch. In response to the introduction of material into the body 13, the mat 1306 is depressed, thereby closing the microswitch 1304a. The closure of the switch 1304a generates a signal indicative to the vehicle sensor processing unit 101 of the starting of loading.

(1) On-Board Processing

Turning to the flowcharts of FIGS. 20–24, the programs for the sensor processing unit 101 and the computer 155d of the central station 155 are disclosed in connection with an open-pit mining operation as the intended environment. It will be appreciated by those skilled in the art that obvious modifications to the program may be made in order to accommodate other environments such as that of a refuse vehicle fleet. In this connection, a refuse vehicle is illustrated in FIG. 25, and FIG. 27 indicates a sensor processing unit of the type disclosed in FIG. 12 incorporated into the vehicle for communication with a central station in a similar manner and with a similar purpose-as that disclosed in connection with the open-pit mining environment.

Figure 20:
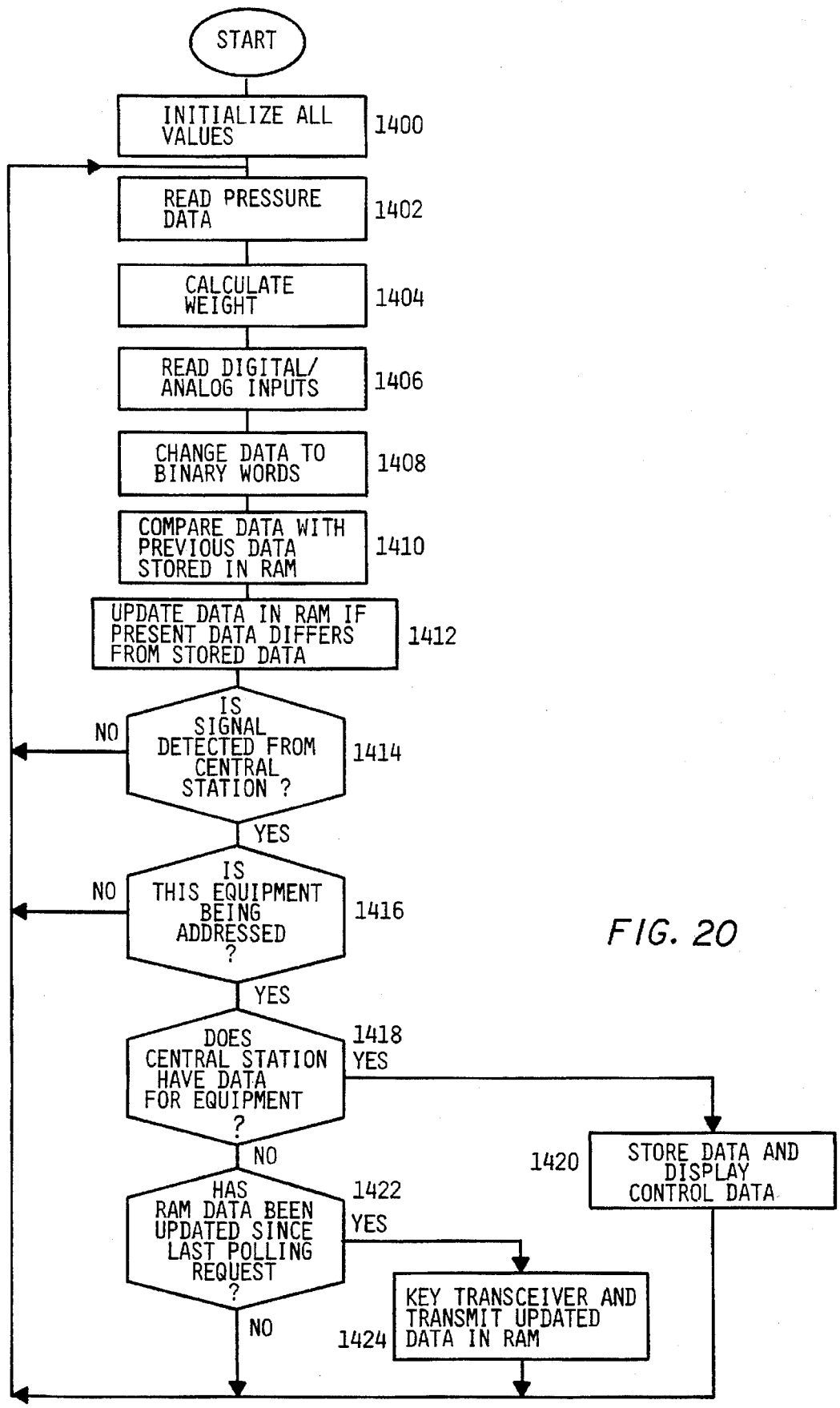
FIGS. 20 is a flowchart diagram for the software program preferably implemented in connection with the sensor processing unit of the on-board apparatus as shown in FIG. 12.

Referring first to the flowchart for the program of the sensor processing unit 101 shown in FIG. 20, data is collected from the various sensors mounted on board the vehicle and accumulated in memory (static RAM 125 in FIG. 12) until the data is downloaded to the central station 155. To start execution of program tasks, all values are first initialized at step 1400 before beginning execution of steps 1402–1414 which gather data from the various sensor inputs to the sensor processing unit 101.

In step 1402, the signals from the pressure sensors 51a–c are read via either the low or high resolution A/D converters 103d or 130. The pressure data is converted to weight data in step 1404 by way of a linear relationship determined during the calibration of the system. In step 1406, all other analog and digital data is read from the various on-board sensors exemplified by those shown in FIG. 3. In order for the sensor processing unit 101 to manipulate information from the analog sensors, the analog data must, of course, be converted to binary data as indicated in step 1408. In step 1410, the data read in steps 1402 and 1406 are compared with the data stored in the static RAM 125. If the newly acquired data is different or if the new data is time dependent, the data is placed into the RAM in step 1412 in order to update the data base.

Steps 1402 to 1412 are repeated until the sensor processing unit 101 detects a signal from the central station 155 at step 1414. When a signal from the central station 155 is detected, the sensor processing unit 101 first determines if an address word in the signal matches the I.D. code for the processor in step 1416. A match of the address code and the processor's I.D. causes the processor to react to incoming data in steps 1418 and 1420. If the central station is polling the vehicle sensor processing unit 101, steps 1422 and 1424 are executed. Steps 1414 through 1424 are preferably executed using the same or similar two-way asynchronous protocol and format used by the commercially available Telxon RFX-10 System, manufactured by Telxon Corporation, Akron, Ohio.

If the vehicle sensor processing unit 101 is not being addressed in step 1416, the program returns to step 1402 and the processing unit continues to update its data base stored in RAM 125. Also, once received data has been stored and displayed in step 1420 or vehicle data has been downloaded in step 1424, the vehicle sensor processing unit returns to updating the data base. In step 1422, if the static RAM 125 has not been updated since the last polling, no data is downloaded. The central station will poll the next vehicle and its sensor processing unit after a predetermined time has elapsed without a response to its last polling request.

The computer 155d at the central station receives the data downloaded from each of the vehicle sensor processing units 101 by way of the transceiver 155a, modem 155b and controller program 155c. The downloaded data is manipulated according to the flowchart program of FIGS. 20–24. By manipulating the received data in accordance with one important aspect of the invention, the central station 155 reports vehicle operating parameters that fall outside a predetermined range, and it also provides a dispatch command for directing vehicle movement in the working area. Correlation of vehicle location and vehicle operation data provides the central station 155 with a data base that allows for meaningful and precise monitoring of vehicle operation, identifying irregularities in vehicle operation and also allows for dispatching commands that maximize the efficiency of the fleet of vehicles.

(2) Processing at Central Station for Dispatching Vehicles

Figure 21:
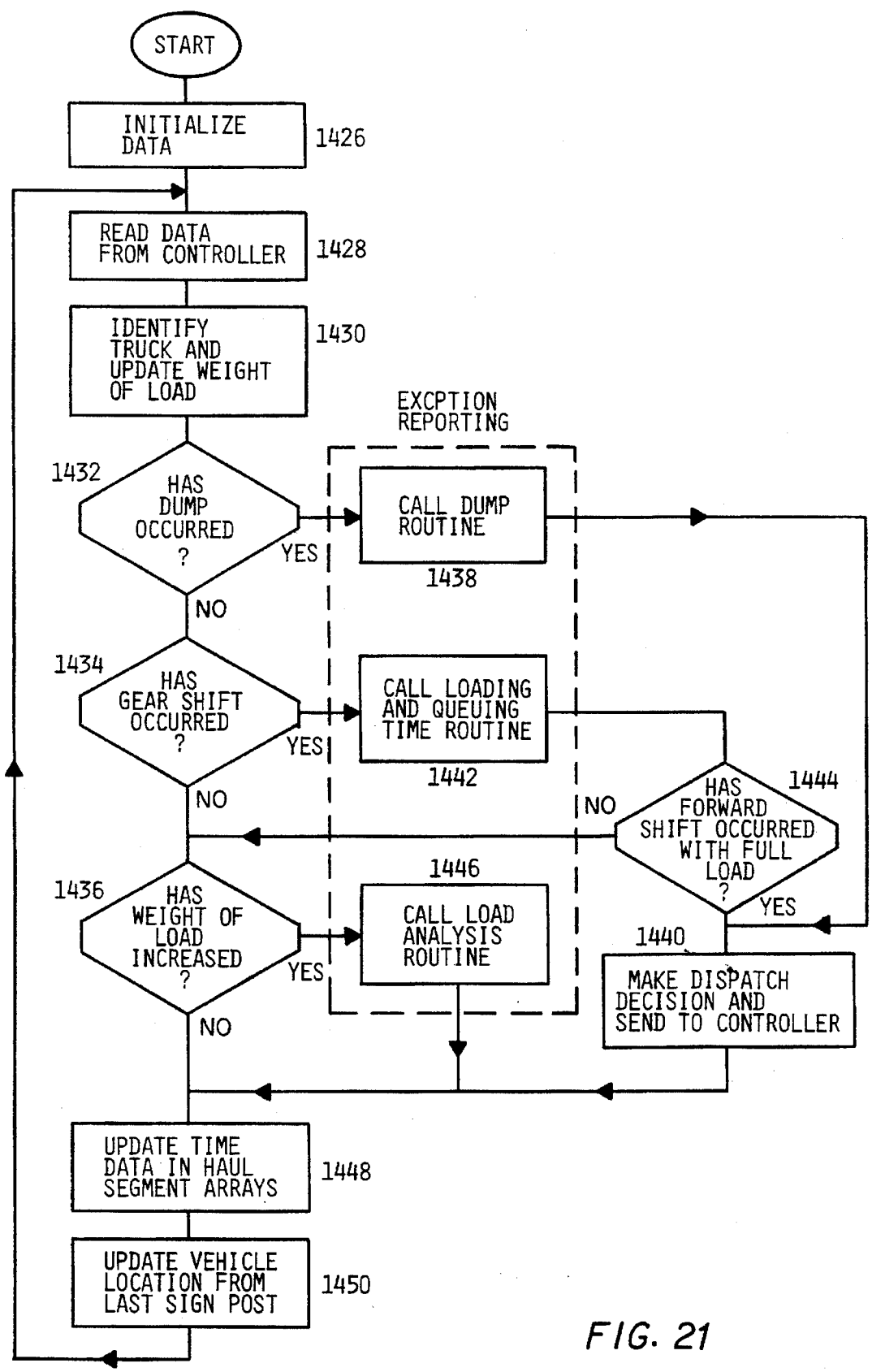

Referring to FIG. 21, the central computer 155d first initializes all its values at step 1426. At step 1428, data received from the RF link is read from the controller program 155c by the computer 155d. In order to monitor the vehicles for proper loading, the data read in step 1428 is identified with a particular vehicle in step 1430 and the weight of the vehicle's load is updated if new data is available. Preferably, an operator at the central station is alerted if an overload condition occurs. Of course, other tests can be executed on the weight data, depending upon the relative importance of particular operating parameters in the working environment.

Figure 22:
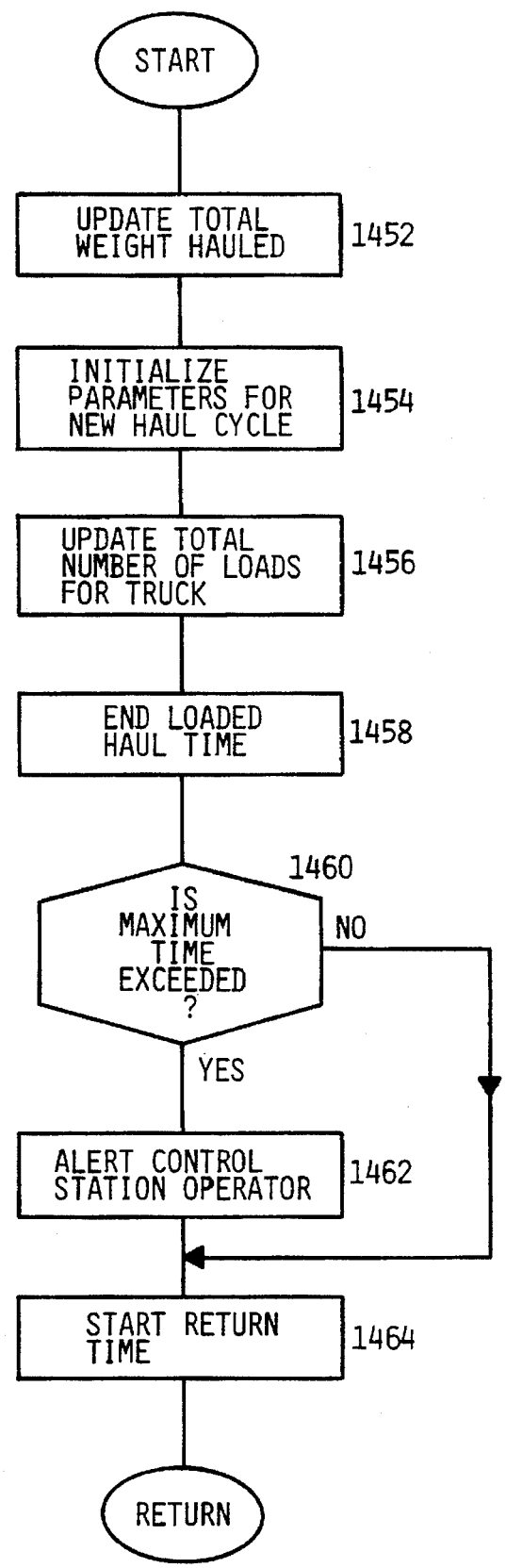

In steps 1432, 1434 and 1436, the data is examined to determine if one of three important events in a hauling cycle have occurred. In step 1432, the data is checked for the presence of a dump signal. If a dump signal is present, the program knows the vehicle is unloading or has unloaded and is ready for a new dispatch command. As explained in greater detail hereinafter, when a dump signal is detected in the received data, the Dump Routine of FIG. 22 is executed by the computer 155d at step 1438. In step 1438, the computer 155d calculates certain hauling cycle values and reports "exceptions" (i.e., values outside predetermined ranges) to the operator of the central station 155. From step 1438, the flowchart moves to step 1440 where the computer 155d makes a dispatch decision as discussed more fully hereinafter. The decision is relayed to the desired vehicle via the controller program 155c, modem 155b and the RF link provided by the transceiver 155a.

If the received data indicates the vehicle has shifted from forward, neutral or reverse, step 1434 branches the flowchart to step 1442 wherein a Loading and Queuing Time Routine is called. This routine, discussed in greater detail in connection with FIG. 23, determines certain values of a haul cycle associated with changes of gear and also reports to the operator of the central station 155 any values that are out of a predetermined range. If the shift data detected in step 1434 is a forward shift and if a full load is carried by the vehicle, step 1444 branches the flowchart to step 1440 where the computer decides which dump site to send the vehicle. In keeping with an important aspect of the invention, a particular dump site may be chosen by the computer 155d in order to control the blend of ore at the site. The selection of a particular dump site will be discussed in greater detail hereinafter.

If the weight of the load has increased in step 1436, the Load Analysis Routine is called in step 1446 wherein loading parameters are updated and out-of-range values are reported.

In each of the routines called in steps 1438, 1442 and 1446, values are calculated for the time segments required for the haul segment arrays of FIGS. 19a–19b. These new time segment values are placed into the arrays in step 1448. In step 1450, the position of the vehicle is updated.

The present position of each vehicle may be visualized on a CRT screen or a matrix of individual lights. In keeping with the invention, an operator display (not shown) at the central station 155 is responsive to location data received from each vehicle so as to track the movement of each vehicle relative to the last signpost location. The present location relative to the last signpost is determined by direction data from the on-board compass 116 and distance data from the on-board distance sensor 105. An example of a suitable compass is models 508 or 550 Fluxgate compass sold by Litton Industries, C. Plath North American Division, Annapolis, Md.

In the Dump Routine of FIG. 22, a running total of the weight hauled by each vehicle is updated in step 1452. Because the dumping of a load is Chosen to be the point where the haul cycle is summarized, the values for hauling cycle parameters are initialized for a new cycle at step 1454. Step 1456 updates the total number of loads for the vehicle and step 1458 ends the time for the current segment of the haul cycle—the loaded haul segment (FIG. 19b). In step 1460, the value of the haul segment time is compared against a predetermined maximum time; if the value exceeds the maximum, the operator of the central station 155 is alerted at step 1462. To start incrementing time for a new hauling cycle, step 1464 starts measuring "return time" or the time for the vehicle to travel from its present location to the location to which it is dispatched.

Figure 23:
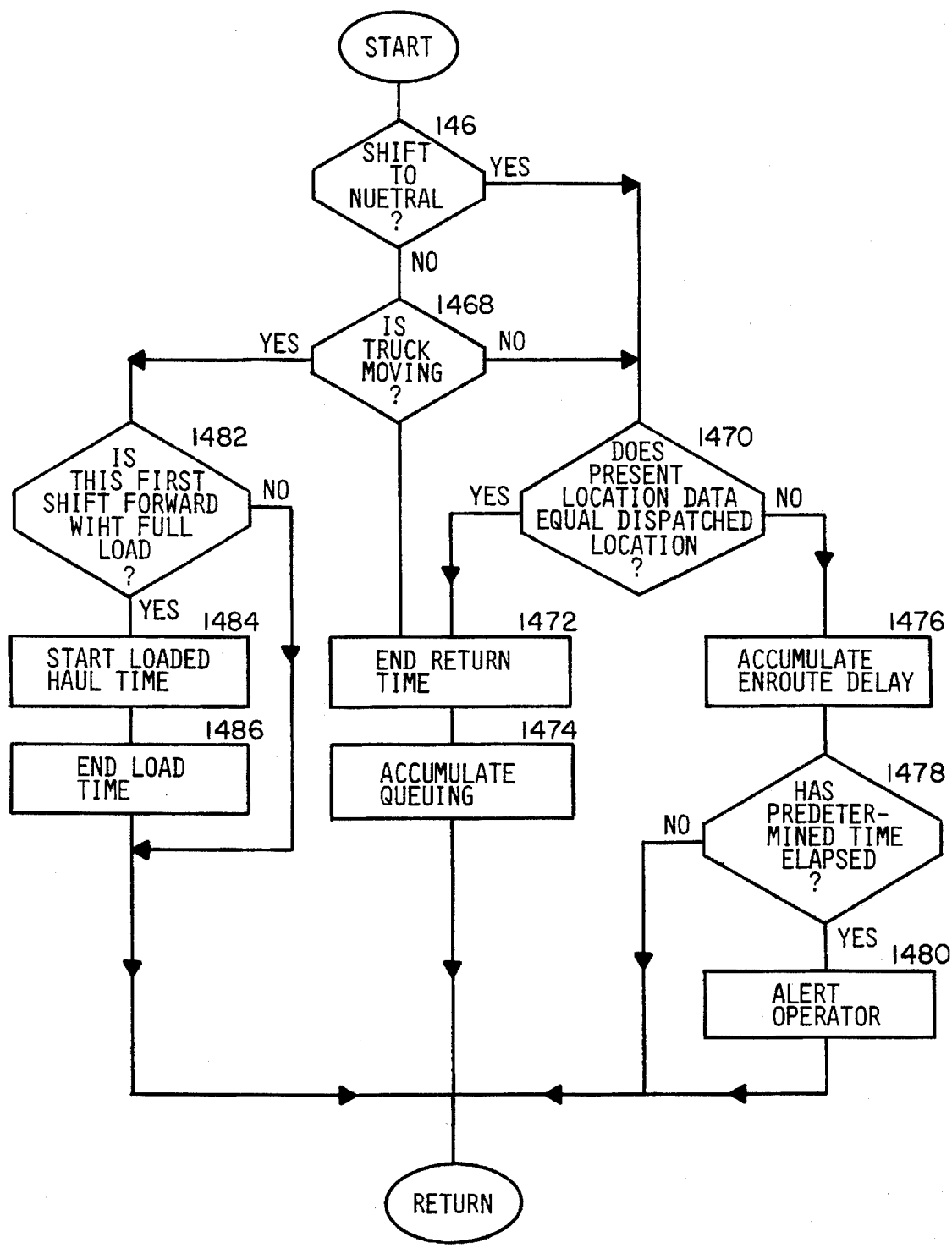

In the Loading and Queuing Routine of FIG. 23, the data indicating a change in gears is used to update hauling cycle data in the primary files of FIGS. 19a–19b. In steps 1466 and 1468 the Routine checks to determine if the vehicle is in neutral or if it is moving. If the vehicle is in neutral or if it is in gear but not moving, the flowchart checks the present location data for the vehicle at step 1470. If the present location is the location to which the vehicle has been dispatched by the central station 155, the return time haul segment (FIG. 19c) is calculated at step 1472 and queuing time is initiated at step 1474. By recognizing when a vehicle has reached its intended destination such as a loader 160, the central station 155 can find actual return time for each vehicle—i.e., the time to go from one signpost to another. The time spent waiting at a signpost location is separated from the return time and identified as "queuing" time. Typically, queuing time accumulates while a vehicle is waiting in line at a loader site to be serviced by the loader 160 or at a dump site to dump.

If the vehicle is not at its dispatched location in step 1470, enroute delay time is accumulated at step 1476 and the operator of the central station 155 is alerted if the elapsed travel time exceeds a predetermined maximum in steps 1478 and 1480.

If the vehicle is moving in step 1468, the flowchart branches to step 1482 where it is determined whether the shift is a first shift into forward with a full load. If it is a first forward shift with a full load, the loaded haul time segment (FIG. 19b) is started in step 1484 and the loading time segment (FIG. 19a) started in step 1494 (FIG. 24) is ended in step 1486. The accumulated time for the loading time segment is added to the array of FIG. 19a in step 1448 of FIG. 21.

Figure 24:
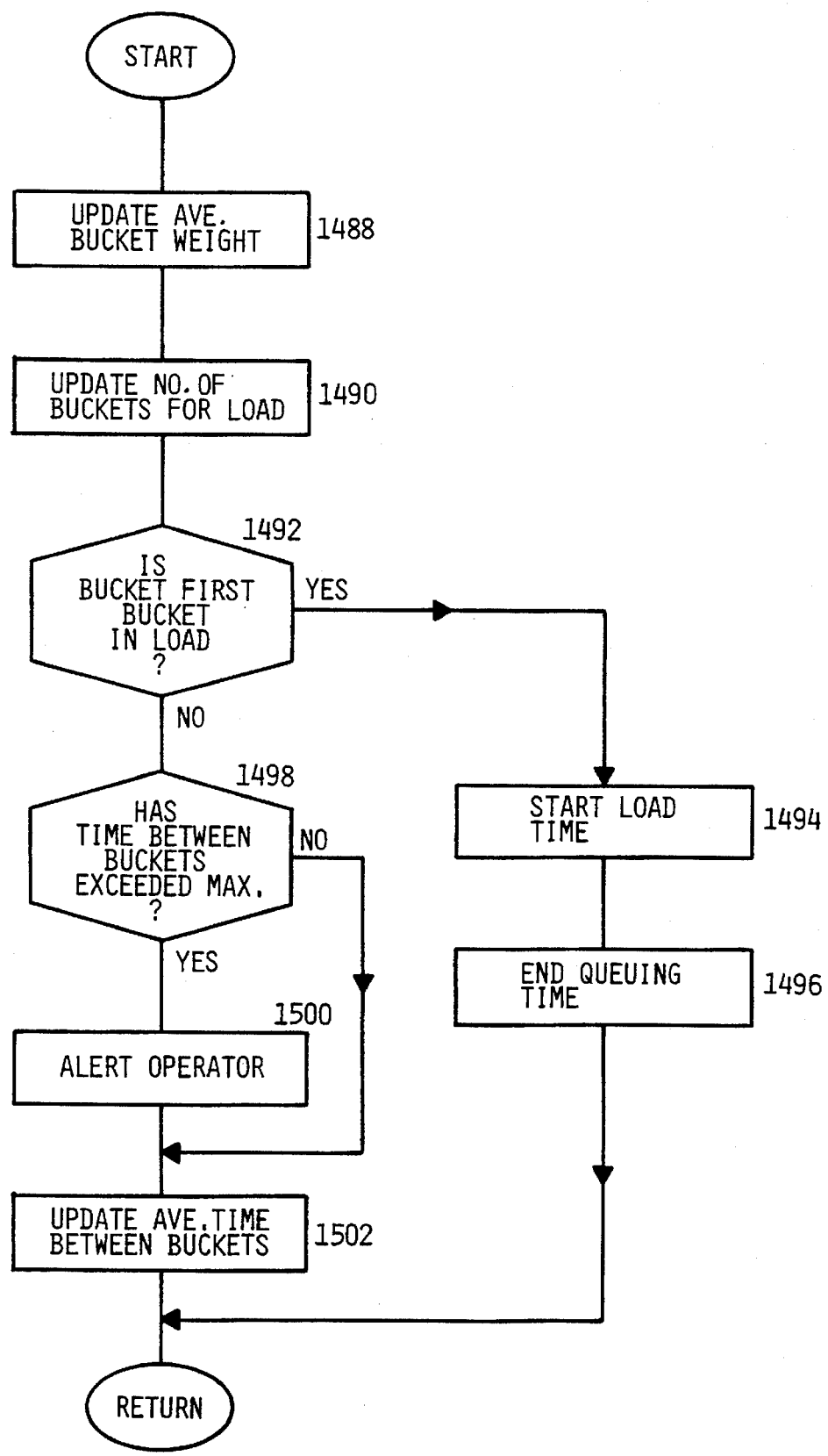

When an incremental increase is detected in the weight data received by the central station 155, the Load Analysis Routine of FIG. 24 is executed. In steps 1488 and 1490, values of loading parameters are updated. Specifically, the incremental increase in weight is used in step 1488 to provide a weight of the bucket added to the vehicle load by the current loader 160. The bucket weight is used to update an average bucket weight for the loader 160. In step 1490, the average number of buckets needed for a full load is updated by tracking the number of incremental weight increases and, when a full load is reached, averaging the total number of buckets for the load with the average from previous loads.

An end of a haul segment is detected if the present incremental increase of weight is based from an empty load condition. In other words, if the present bucket is detected in step 1492 to be the first bucket of a load, the loading time segment is started at step 1494 and the accumulation of queuing time is ended at step 1496. If the current bucket is not a first bucket, the time between buckets is checked to determine if it exceeds a maximum value in step 1498. If the time exceeds the maximum, the operator of the central station 155 is alerted at step 1500. Ion step 1502, a running average of the time between successive buckets is updated.

Turning now to a more detailed discussion of the dispatch decision made by the computer 155d in step 1440 of FIG. 21, the following discussion is directed to particular algorithms for use by the computer in controlling movement of the vehicles 11 in an open-pit mining environment such as that illustrated in FIGS. 15a and 15b.

From its data base, the computer 155d at the central station knows the number of vehicles 11 that have been dispatched to a particular loader but have not yet begun loading. The computer 155d also has data indicating if any vehicle has begun loading at a particular site, but has not completed loading. From the foregoing information, as the vehicles 11 become available from a dump site or other areas, the computer 155d executes an algorithm in step 1440 to determine which load area 1-N in FIGS. 15a or 15b will most quickly load the current vehicle. In keeping with the invention, the computer 155d calculates a "delay" time for each load area 1-N and identifies the load area with the minimum delay as the vehicle's destination. For each loading area 1-N in FIGS. 15a or 15b the expected delay for the vehicle 11 leaving DUMP AREA 1 may be determined as follows:

$$\text{DELAY}(n) = \begin{array}{c}\text{SUM OF}\\\text{LOAD TIMES}\\\text{OF ALL TRUCKS}\\\text{ENROUTE TO}\\\text{LOAD AREA}(n)\end{array} + \begin{array}{c}\text{TIME NEEDED}\\\text{TO COMPLETE}\\\text{CURRENT LOAD}\end{array} - \begin{array}{c}\text{ESTIMATED}\\\text{TRAVEL TIME}\\\text{OF VEHICLE}\\\text{TO BE}\\\text{DISPATCHED}\end{array} \quad (9)$$

For equation (9) the computer 155d calculates in a conventional manner from available data in its data base the number of vehicles in transit to the loading area (n). A calculation of the number of vehicles in transit to the loading area (n) is easily derived from available data since the computer 155d identifies which vehicles have been directed to a given loading area and have not yet downloaded data indicating loading has begun.

For each vehicle enroute to a particular loading area (n), the primary file containing load times (FIG. 19a) is accessed in order to provide an estimated load time for vehicles of its type (type $T_1$ or $T_2$). The estimated load time is established by averaging the stored load times for the vehicle type—e.g., $T_1/2$. After an estimated load time is established for each vehicle enroute to the loading area (n), the load times are summed to provide the first factor in equation (9) for determining delay at the loading area (n).

Added to the sum of the various expected load times is the time estimated to be required to complete the loading of the vehicle currently being serviced by the loader 160 at the loading area (n). The beginning of loading is detected by the computer 155d when the downloaded data indicates the on-board weighing device has sensed the presence of added weight to the vehicle body 13. From this available data, the computer 155d calculates the remaining loading time of the vehicle currently being loaded by simply subtracting the time that has elapsed since loading started from the estimated load time. The difference is added in equation (9) to the sum of the load times for the vehicles enroute to the loading area (n).

The final consideration in determining the delay time (n) is the estimated amount of time for the vehicle to reach the loading area (n). From the primary files in the data base, the average empty return time can be estimated for vehicles of the type to be dispatched from the haul segment array of FIG. 19c. This average empty return time is used as an estimated travel time to loading area (n) for the vehicle to be dispatched. This time is subtracted from the estimated time which the vehicle may expect to wait before it can be serviced by the loader 160 at the loading area (n).

For example, two loading areas (n) and (n+1) may have load delays of five minutes and ten minutes, respectively, before considering vehicle travel time. However, if the travel time to the first loading area (n) is 12 minutes while the second loading area (n+1) has a five minute travel time, this travel time is subtracted from the time delay to arrive at a total delay time which is −7 minutes for the first loading area (n) and +5 minutes for the second loading area (n+1); thus, the computer 155d designates the first loading area (n) as the vehicle's destination since the minus delay time indicates the time the loader 160 will be waiting 7 minutes for a vehicle. After the delay of each of the (n) loading areas is calculated, the central computer 155d transmits a dispatch signal at step 1440 in FIG. 21 having data identifying the particular equipment for which the transmission is intended and also having data indicating the particular loader number with the current minimum delay time.

In response to the transmission from the computer 155d, the transceivers 150 of all the vehicles 11 lock onto the signal during the sync portion of the transmission and compare the transmitted equipment number to their own numbers. In each vehicle 11, the MPU 103 of FIG. 12 checks to see if its transceiver 150 is receiving a transmission. If a signal is present, the transmitted equipment number is captured and compared to the vehicle's own number. When a match occurs between equipment numbers, the computer 155d completes the data transmission to dispatch the vehicle to a loading area (n), dump area (n) or other designated site.

Table 1 illustrates an example of the vehicle dispatch decision executed by the computer 155d each time a vehicle becomes available for loading. In the example, there are five loading areas. Applying equation (9) in order to determine the delay time before loading begins at each of the areas, the least busy area is loading area 3. The negative time value at load area 3 indicates the loader 160 at that location will be free to load the vehicle approximately four minutes before the vehicle can get to the area. The most busy loading area is loading area 2 which equation (9) indicates has a five minute wait associated with it if the vehicle is dispatched to that area. In order to make the fleet of vehicles the most time efficient, the computer 155d dispatches the vehicle to loading area 3 because the wait is the shortest for the loader 160 at that area.

If the availabilities of the fleet of vehicles and the loaders 160 were balanced, the delay to each of the loading areas (n) would theoretically be zero. Obviously in practice, each of the delays (n) will not always be zero. But, in keeping with the invention, the total system delay should approximate zero when the loading and hauling fleets are properly matched. By matching the availability of loaders and vehicles, excessive or insufficient vehicle/loading equipment capacity can be avoided. In general, the total delay equals, $$\sum_{1}^{N} \text{delay}(n). \tag{10}$$

In the specific example illustrated by TABLE 1, the total delay is, $$\text{Total Delay} = \sum_{1}^{3} \text{delay}(n) = -2 + 5 - 3 = 0 \tag{11}$$

A negative net or total system delay indicates an excess of loading capacity or an insufficiency of hauling capacity. Depending on whether extra vehicles are available and other operating parameters, the mine operator can increase the efficiency of the loading equipment by either removing loading equipment or adding vehicles. Of course, the size of the loader and vehicle fleet in operation impacts on how small or large a change in system delay occurs for each addition or subtraction of a piece of hauling or loading equipment.

In summary, the closer the sum of the totals come to zero the more a fleet is in balance. A total of zero for all the delays (n) indicates vehicles do not wait for loading equipment to become available and the loading equipment does not wait for vehicles to arrive. In the foregoing dispatch logic example, the sum of the totals is zero which indicates the overall system is balanced. If the number becomes too negative, the fleet operator may choose to remove a vehicle from service or add an additional piece of loading equipment. If the sum becomes too positive in value, the operator may choose to add a vehicle or remove a piece of loading equipment.

(3) Biased Dispatching

Many operating factors other than which piece of loading equipment will be first available may enter into the decision of where to dispatch a vehicle after it has completed a haul cycle. For example, it is often important to maintain the percentage composition of certain minerals within a predetermined range. Because the totals in TABLE 1 do not take into account the blend ratios of the ore being mined at the loading area (n) of each piece of loading equipment 160, the dispatching of the vehicles 11 will result in a random determination of the ore blend at a particular dump site.

In keeping with the invention, in order to provide a controlled blend of mined minerals, a Blend Ratio Biasing Time may be added to each of the load delays in order to bias selection of the vehicle dispatch to particular loading areas. More generally, "correction factors" may be added to the load delay for each load area (n) in order that the various parameters may be weighed in the decision to

DISPATCH LOGIC EXAMPLE

TABLE 1

| | LOADING AREA NOS. | | |
|---|---|---|---|
| | 1 | 2 | 3 |
| Number of vehicles enroute to each loading area | 3 | 4 | 2 |
| Sum of loading times of all vehicles enroute to each loading area (Plus) | 12 | 15 | 7 |
| Time needed to complete loading of vehicle presently being loaded | +1 | +2 | +2 |
| SUBTOTAL (Minus) | 13 | 17 | 9 |
| Travel time from vehicles existing location to each loading area | −15 | −12 | −12 |
| DELAY | −2 | 5 | −3 |
| Loading area whose equipment will be waiting for vehicle and time of wait | −2 | | −3 |
| Loading area at which vehicle will have to wait and time of wait | | 5 | | dispatch a vehicle to a particular load area. Beside blend ratio, some other hauling parameters that may be considered are (1) cross pit travel biasing times, (2) enhanced (dynamic) cross pit travel bias times, (3) specific loading equipment or pit biasing times, (4) specific dump area biasing times, (5) stripping ratio biasing times, (6) vehicle tire ton-mile-per-hour (TMPH) biasing times, (7) minimization of vehicle travel biasing times, and (8) vehicle queuing time biasing times. Each one of these biasing times may be successively applied to the basic dispatch logic decision from TABLE 1 to arrive at a weighted dispatch decision which takes the foregoing parameters into account.

The Blend Ratio Biasing Factors for load areas (1), (2) and (3) are determined as set forth in the following particular example. As a beginning, the computer 155d is provided with data of the various mineral percentages desired for the ore being mined. In TABLE 2, the ingredients A, B, C and D are provided with optimum values and upper and lower limits.

TABLE 2

| | Ingredient | | | |
|---|---|---|---|---|
| | A | B | C | D |
| Lower Limit | | 2.00% | 5.65% | 5.75% | 4.50% |
| Optimum | 3.00% | 6.00% | 7.00% | 5.25% | |
| Upper Limit | | 4.00% | 6.35% | 8.25% | 6.00% |
| Range | 2.0% | .7% | 2.5% | 1.5% | |

From testing at the various loading areas (1), (2) and (3), the actual percentage content of each mineral at each area is known. These values and their deviation from the optimum value (in TABLE 2) are entered into the memory of the computer 155d at the central station, and they are organized in a manner such as shown in TABLE 3.

TABLE 3

| Loading Area | INGREDIENT | | | |
|---|---|---|---|---|
| | A | B | C | D |
| 1 Actual Blend | 2.5% | 5.0% | 4.25% | 6.0% |
| Deviation From Optimum | −.5% | −1.0% | −2.75% | +.75% |
| 2 Actual Blend | 4.0% | 4.5% | 8.0 % | 5.5 % |
| Deviation from Optimum | +1.0% | −1.5% | +1.0 % | +.25% |
| 3 Actual Blend | 3.0% | 7.0% | 8.0% | 4.0 % |
| Deviation from Optimum | 0% | +1.0% | +1.0% | −1.25% |

TABLE 4

| Loading Sites Hauled From | Size of Loads Hauled Tons | Running Total Hauled Tons | INGREDIENT | | | |
|---|---|---|---|---|---|---|
| | | | A | B | C | D |
| 1 | 128 | 128 | 3.2/3.2 2.5% | 6.4/6.4 5.0% | 5.4/5.4 4.2% | 7.7/7.7 6.0% |
| 3 | 165 | 285 | 5.0/8.2 2.88% | 11.6/18.0 6.32% | 13.2/18.6 6.53% | 6.6/14.3 5.02% |
| 1 | 85 | 370 | 2.1/10.3 2.78% | 4.3/22.3 6.03% | 3.6/22.2 6.00% | 5.1/19.4 5.24% |
| 2 | 115 | 485 | 4.6/14.9 3.07% | 5.2/27.5 5.67% | 9.2/31.4 6.47% | 6.3/25.7 5.30% |
| 2 | 80 | 565 | 3.2/18.1 3.20% | 3.6/31.1 5.50% | 6.4/37.8 6.69% | 4.4/30.1 5.33% |
| 3 | 175 | 740 | 5.3/23.4 3.16% | 12.3/43.4 5.86% | 14.0/51.8 7.00% | 7.0/37.1 5.01% |
| 1 | 135 | 875 | 3.4/26.8 3.06% | 6.8/50.2 5.74% | 5.7/57.5 6.57% | 8.1/45.2 5.17% |
| 2 | 110 | 985 | 4.4/31.2 3.17% | 5.0/55.2 5.60% | 8.8/66.3 6.73% | 5.5/50.7 5.15% |

As loads are hauled, the computer 155d has sufficient information to compute the amount of each critical ingredient hauled to a particular dump area (n) (the amount equals the tons of ore hauled multiplied by the percentage of each critical ingredient A, B, C or D).

For each dump area (n), a record of the ore dumped at the area is kept by the computer 155d. The data may be arranged for storage as illustrated by TABLE 4. Data from each new load dumped by a vehicle 11 at the particular dump area is added to TABLE 4 as the load is delivered. Because each load may be from any one of the loading areas (n) and probably has a different weight than previous loads, the percentage of ingredients A, B, C and D may differ in total tons. In order to keep an accurate record of the current composition of the ore at each dump area (n), the computer 155d updates the percentage of each ingredient at the dump area with the addition of each new load. For example, in TABLE 4 the first load to dump area (n) is from loading area (1).

From the data in TABLE 3, the computer 155d knows the actual blend for each of the ingredients. From the on-board weighing device, the computer 155d knows the total weight of the ore carried by the vehicle 11. From this available data, each of the columns in TABLE 4 can be completed. Specifically, for the first load from the loading area (1), the size of the load is indicated from the on-board weighing device to be 128 tons (column 1). Because this load is the first load to the dump area (n), the "Running Total" is also 128 tons (column 2). For each of the ingredients of interest—A, B, C and D—a column is provided which sets forth the tonnage of the ingredient in the current load, the running total of the ingredient at the dump area (n) and the running total percentage of the ingredient with respect to the running total of the ore hauled to the area.

With the running total percentage of each ingredient known from TABLE 4, the actual percentage of each ingredient at the dump area (n) can be compared with the optimum percentage which is entered into the data base of the computer 155d and is shown in TABLE 2. The comparison between the actual running total percentage and the optimum or ideal percentage is illustrated in TABLE 5 for each important ingredient A, B, C and D. For example, ingredient A has a composite running total percentage of 3.17% from the last load to the dump area (n) as can be seen from the last row in TABLE 4. The variance of the percentage content of ingredient A from the optimum percentage (TABLE 2) is 0.17%. As indicated in TABLE 2, acceptable range of the ingredient A is 2.0%.

By dividing the actual percentage variance from the optimum percentage content by the acceptable percentage range of ingredient A, the percent of the total range represented by the variance can be determined. For the example in the tables, these values are the "Percent Of Range" values in TABLE 5. For ingredient A, the 0.17% variance represents 8.5% of the total range. But, the variance of ingredient B represents 57.1% of the total range for ingredient B. Because the optimum percentage of ingredient B is at the center of the acceptable range, the computer 155d knows that the percentage of ingredient B at the dump area (n) exceeds either the upper of lower limit of the acceptable range for that ingredient. Because the variance from optimum for ingredient B is a negative number, the composite running total percentage is known to be less than the minimum percentage content of 5.65%. The same percent of range calculations are made for ingredients C and D.

TABLE 5

|  | INGREDIENT | | | |
|---|---|---|---|---|
|  | A | B | C | D |
| Composite Running Total Percentage Blend | 3.17% | 5.60% | 6.73% | 5.15% |
| Variance From Optimum Percentage Blend | +.17% | −.40% | −.27% | −.10% |
| Percent of Range | 8.5% | −57.1% | −10.8% | −6.67% |
| Ingredient Loading Site Priority | 1 | 3 | 2/3 | 1 |

From the percent of range numbers for each ingredient, each ingredient is associated with a loading area (1), (2) or (3) whose actual percentage of that ingredient will tend to bring the content of the ingredient at the dump site toward its optimum value by reducing the value of the "Percent Of Range". For example, ingredient A has a positive 8.5 Percent Of Range. To reduce the percentage amount of that ingredient, the computer 155d identifies from the data in TABLE 3 the loading area with the least percentage of ingredient A. The data in TABLE 3 indicates loading area (1) has the least amount of ingredient A—2.5%.

Because the dump area has too small of a percentage of ingredient B, the computer 155d finds the loading area with the greatest percentage amount of that ingredient—loading area (3). For ingredient C, either loading area (2) or (3) may be given priority since both have 8.0 percentage of ingredient C. There is too little of ingredient D, so the loading area to be given priority is loading area (1).

In TABLE 1, the delay (n) for each of the loading areas is determined in minutes. For dispatching based on minimum delay time, the computer 155d identifies in step 1440 of FIG. 21 the loading area with the least delay. In order to bias this basic dispatch logic toward certain loading areas so that the percentage of each ingredient may be brought closer to its optimum value, a numerical value is assigned to each delay (n) before the computer 155d identifies a minimum delay. The absolute magnitudes of these numerical values must be empirically determined for each mine site; but the relative magnitudes are determined from the Percent Of Range values in TABLE 5. In TABLE 6, each of the absolute values for the "Percent Of Range" is divided by 100 and associated with the appropriate loading area. Specifically, the −57.1% value for the "Percent Of Range" becomes 0.57 and this latter value is associated with loading area (3) as a biasing factor. Ingredient C splits its biasing factor of 0.10 between loading areas (2) and (3). The biasing factors for ingredients A and D are both associated with loading area (1).

TABLE 6

| INGREDIENT DESIGNATION | LOADING SITE | | |
|---|---|---|---|
|  | #1 | #2 | #3 |
| A | .09 | | |
| B | | | .57 |
| C | | .05 | .05 |
| D | .07 | | |
| TOTAL BIASING FACTOR | .16 | .05 | .62 |

From the total biasing factors for each loading area in TABLE 6, it can be seen that loading area (3) has the largest value for its total biasing factor. The total biasing factor considers all the ingredients A, B, C and D. In order to bias the delay time toward loading area (3), the highest total delay −0.62 for loading area (3) is used as a base number from which the total biasing factor for each loading area is subtracted. Of course, loading area (3) is left with a zero resultant. But, load areas (1) and (2) are left with values that are added to their delay times calculated in TABLE 1, thereby making these areas less likely to have the minimum delay time when the computer 155d identifies the loading area to dispatch a vehicle 11. Specifically, referring to TABLE 7, the delays for loading areas (1) and (2) from TABLE 1 are added to the amounts 0.46 and 0.57, respectively. The added delay for loading area (3)—the area we want to bias most heavily toward—has a value of zero.

TABLE 7

|  | LOADING AREA | | |
|---|---|---|---|
|  | 1 | 2 | 3 |
| SINGLE HIGHEST BIASING FACTOR | .62 | .62 | .62 |
| BIASING FACTOR FOR EACH AREA | −.16 | −.05 | −.62 |
| ADDED TIME | +.46 | +.57 | +0 |
| DELAYS FROM TABLE 1 | −2 | 5 | −3 |
| BIASED DELAYS | −1.54 | 5.57 | −3 |

In the biased dispatch example illustrated by TABLES 1–7, the computer 155d will still choose loading area (3) as the destination for the vehicle 11 leaving a dump area (n). But it can be appreciated from the example that the additional delay times generated from the biasing factors may under certain circumstances cause the computer 155d to dispatch the vehicle 11 to a loading area (n) whose true loading/delay time is actually not the shortest time available. These additional delay times can be factored as required to achieve meaningful blending results—e.g., of 1.2, 1.4, etc.

Another example of a use for biased dispatch is in open-pit mining operation where multiple pits are present and where the mine operator wishes to limit cross-pit dispatching of the vehicles. Specifically, without biasing the dispatch decision, the computer 155d may dispatch a vehicle in pit A to a loading site in pit B. Even though the vehicle may be loaded the fastest at the loading site in pit B, the vehicle must travel a considerably longer distance to arrive at the loading area. Because the vehicles 11 represent a very large fraction of capital expenses at an open-pit mining operation, as previously discussed, an operator may wish to bias the dispatching of the vehicle fleet to discourage cross-pit travel. By minimizing cross-pit travel the mine operator is sacrificing some ability to balance the use of the vehicle fleet and loading equipment.

Referring to TABLE 8, the same delay values found in TABLE 1 are repeated. Therefore, the loading area with the least delay time is loading area (3) as before. But, in TABLE 8 loading area (3) is in the south pit of the mine site and for this example we assume the vehicle to be dispatched has indicated in its downloaded data that it is at a dump area (n) associated with the north pit.

TABLE 8

|  | LOADING AREA | | |
|---|---|---|---|
|  | NORTH PIT | SOUTH PIT | |
|  | 1 | 2 | 3 |
| Number of trucks enroute to each loading area | 3 | 4 | 2 |
| DELAY FROM TABLE 1 (Plus) | -2 | 5 | -3 |
| Dump site/truck location to loading equipment correction factor | +0 | +0 | +5 |
| TOTAL | -2 | 5 | +2 |

In order to discourage cross-pit travel of the vehicle fleet, the computer 155d adds a predetermined time delay to the actual delays calculated for the loading areas in the pit or pits which the vehicle to be dispatched is not in. In the example shown in TABLE 8, the delay of loading area (3) is increased by five minutes. This heavy biasing of the loading area in the south pit causes the computer 155d to dispatch the vehicle to loading area (1), even though loading area (3) would provide the actual fastest load time.

As indicated earlier, the dispatch decision can be biased to account for multiple hauling parameters. Accordingly, the actual delay may first be biased to account for a proper blend of ore as illustrated in TABLES 1–7 and then biased to account for cross-pit travel as illustrated in TABLE 8. Many other hauling parameters may be factored into the dispatch decision by weighting the delay times in a manner similar to that illustrated in TABLES 1–8.

(B) Downloading to Implement Management of Vehicle Useage Using Data Files

As evidenced by the foregoing dispatch function using downloaded data, the communications link between vehicles 11 and the central station 155 is potentially the basis for a total vehicle management system. Downloading of all or selected portions of data generated by the vehicle sensor processing unit 101, allows the central station 155 to function as a mine management system. The following description of the functioning of such a system is intended as an outline of the programming steps made possible by the organization of memory in the central station 155 into a data base with subfiles for each vehicle/loader combination and primary files for each class of vehicle as described herein and the downloading of data in addition to load and dump data as previously discussed in connection with FIGS. 15a and 15b.

As an alternative to or an extension of the foregoing controlling of vehicle movement based on downloaded data, the interaction of the vehicle 11 sensor processing units 101 and the computer 155d also provides the ability for data file management at a remote location. Specifically, information from each of the sensor processing units 101 is downloaded to a master data file associated with the computer 155d where the data may be manipulated in order to provide useful real time information to management personnel. For example, from real time data the computer 155d may analyze the average number of loads or tons loaded per hour by a particular loader 160 and/or average number of loads or tons hauled by a particular vehicle. From the foregoing analysis, accurate projections for the best utilization of the vehicles and loaders can be developed.

In addition to receiving the downloaded data and dispatching vehicles 11 to proper loaders 160, dump sites or designated sites,. the computer 155d maintains data on tonnage loaded by particular loaders, tonnage hauled by particular vehicles and total tonnage hauled to each dumping area. The computer 155d records the out-of-service times for all vehicles 11 and loaders 160 and identifies the vehicles and loaders which are out of service for the longest times in a predetermined time period.

Mine management with this system can see what has been done in terms of mine production and can make extremely accurate projections, one month, six months, possibly even 12 months down the road. With these projections as to what total mine production can be, e.g., anticipated tons of various material to be moved, the mine operating personnel can make equipment assignments and changes to those equipment assignments so that mine production does, in fact, meet mine production projections.

For example, the computer 155d cumulatively records ton-mile per hour data over a given time frame so that as a vehicle accumulates ton-mile per hour figures the cumulative figures for all trucks are compared and the trucks with excessive ton-mile per hour numbers can be dispatched to locations from which less ton-mile per hour figures occur.

Additionally, the computer 155d as well as the vehicle sensor processing units 101 may analyze vehicle component strain, such as engine operating temperature, hydraulic oil temperature, heat buildup in the tires, etc. As a particular component on a vehicle approaches a preset limit, the vehicle may on future haul dispatches be dispatched to a haul that might be less trying on the vehicle, i.e., for a mine with a multi-bench operation vehicles may be rotated so that no one vehicle is continually hauling off of the lowest bench. This analyzation of vehicle component strain obviously turns on the need to add additional vehicle monitors to the vehicle and provide data downloading transmission capabilities from these monitors to the computer 155d.

As indicated by FIGS. 19a–19d, each of the four primary files of the master data file may be separated by loading equipment type, vehicle type-and dump site, e.g., make, model, size, type of body or type of material to be hauled, whether it is ore, overburden, dual purpose, etc. For example, data for 170-ton vehicles are filed separate from data for 120-ton vehicles. Each class of vehicle, loader and dump site combination has a separate historical subfile to be used to determine how long it should take a vehicle of that class to get from a dump to loading site or vis versa. With respect to the loaders 160, a similar subfile system exists for each class. In addition, loader 160 has a subfile for each type of vehicle it loads. These subfiles store historical data on how long it takes the loaders 160 to load any particular type of vehicle 11.

As a particular example of the data base and master data file, if a mine has ten 170-ton Haulpak vehicles and ten 120-ton Euclid vehicles, the computer 155d has a data base comprising a historical subfile for each vehicle—i.e., 20 vehicle subfiles. Each subfile contains data for a particular vehicle relative to different loader/dump site combinations. Data from the ten Haulpak subfiles are averaged together to comprise a master Haulpak data file; likewise, a master Euclid data file is created for the Euclid trucks. Then, as each respective vehicle generates data, its corresponding historical subfile is updated. In response to downloading data for updating of these historical subfiles for each vehicle, the four primary files of the master data file for the vehicle class (e.g., Euclid or Haulpak) are also updated.

(1) Estimate Load Cycle Time

At the same time that loader destination information is transmitted to a vehicle 11, the central station 155 may review a historical data file of total haul cycle time for that vehicle from the loader to which the vehicle has been dispatched and identifies a median haul cycle time to all possible vehicle dump locations. A percentage of the median time is added to the median in order to provide a time period within which the vehicle should be expected to complete a haul cycle i.e., dumping another load. For example, if the median haul cycle were 12 minutes and the central station 155 is programmed to add 20% to this time, if dump data were not registered as being downloaded from this vehicle within this 12 minutes+20%, the central station then would flash to its operator that the vehicle in question is late in completing its haul cycle to a dump area; whereupon, the operator of the central station 155 may contact the vehicle 11 driver via conventional two-way radio to see if there is a problem with the vehicle.

If a vehicle driver parks the vehicle for a break or a rest stop, the driver alerts the operator of the central station 155 to that fact via conventional two-way radio. In response to this received data, the operator of the central station 155 calls up that vehicle number and indicates that truck's location and that no loads will be hauled for a predetermined time period and that possibly no data transmissions will be occuring over this same time period. In some cases it is possible to communicate the same information via data downloaded through an interrupt instituted by the vehicle driver's selection of an appropriate key of the keyboard 122.

When a vehicle goes out of service because of a breakdown, driver rest or the like, the central station 155 dispatches new available vehicles to the loading area previously transmitted to the parked vehicle and then transmits to the parked vehicle a new updated loading location. This procedure is repeated until the parked vehicle is indicated as being back in service by data indicating such things as the shifting of gears.

If no data has been received, at the end of the time period selected by the vehicle driver as his break time or down time, the central station 155 will flash the vehicle number to the operator of the central station. The central station operator may contact, via conventional two-way radio, the vehicle driver to check on the vehicle's status. If the central operator finds the vehicle is still down for whatever reason, he may call up the vehicle number and indicate how many more minutes the vehicle will be down. This process continues to be repeated by the central station 155 until the vehicle is back in service or temporarily taken out of service.

With respect to vehicle travel from the dump area to a loader, the central station 155 records the time of vehicle dispatch and looks for that vehicle to arrive at the designated loading area within a predetermined time based on historical vehicle return time in a primary data file. If the vehicle is late in arriving at its designated loading area, i.e., no data downloading to indicate arrival, the vehicle number is flashed to the operator of the central station whereupon he may radio, via conventional two-way radio, the vehicle driver to check on that vehicle's status.

The central station 155 also follows the foregoing steps when it detects a vehicle leaving a loading area headed for a designated dump area. The central station 155 identifies in its data file the average haul travel time it takes a like vehicle to get to the designated dumping area. If further data is not detected by the central station 155 within this average time, then that vehicle number is flashed to the operator of the central station whereupon he may check on that truck's status.

(2) Monitor Loaders

In addition to receiving downloaded data, monitoring and dispatching vehicles 11 in the foregoing manner, the central station 155 also identifies and monitors the various loaders 160 by identifying 160a through which vehicle 11 data is coming to the central station. Accordingly, the central station 155, as data is downloaded to it, analyzes the average number of loads and/or tons loaded per hour by a particular loader 160 and how many minutes occur between each load. As the central station 155 monitors each loader 160 through data downloading, if it detects a lack of load information coming from a particular loading location, it flashes to the operator of the central station the identity of that loader. The operator of the central station 155 may contact, via conventional two-way radio, the loader operator and determine whether there is a problem with that loader. If that particular loader 160 is down, the loader operator may respond to the operator of the central station 155 with an estimate of how long he will be down. The operator of the central station 155 then enters into the system an indication that this loader will be down for a particular time period.

The central station 155 adds a percentage of this particular time period to the estimated time period in order to provide a buffer range. At the end of this increased time period, the central station 155 checks the status of loader 160 and determines whether loading data is present. If no loading data is present from this loader, the loader number is again flashed to the operator of the central station 155 whereupon he may again check with the operator of that loader to see how much longer the loader will be down. This additional time is entered into the central station 155 and the steps are repeated.

As soon as data is entered by the operator of the central station 155 indicating that a particular loader 160 is down, the central station redispatches vehicles 11 away from this loader. For redispatching, the central station 155 does not consider specific travel times; rather, by way of simplification, it sets all travel times equal for the loading locations to which the vehicles are redispatched.

When that piece of loading equipment is supposed to be back up, it can be automatically registered in the central station 155. The computer 155d, depending on programming, can automatically dispatch one or more vehicles to that piece of loading equipment. Or, if so programmed, the central station 155 can flash the respective number of the piece of loading equipment to the central Station operator, whereupon he asks, via conventional two-way radio, the loading equipment operator whether that piece of loading equipment is again up and ready to run so that vehicles can be dispatched to it. If the answer is yes, the operator of the central station 155 enters in on his keyboard that the particular piece of loading equipment is again up and running. The central station 155 then immediately takes over automatic dispatching and dispatches the first available vehicle to that piece of loading equipment.

(3) Excess Hauling or Loading Capacity

If the central station 155, through data being downloaded to it, determines there is either excess haulage capacity or loading capacity, it signals the computer operator. If excess haulage capacity is indicated, the station 155 indicates which vehicle 11 is closest to a required preventive maintenance period. A similar determination is made for the loaders 160 when excess loading capacity is indicated. As soon as the excess vehicle 11 or loader 160 is identified and if maintenance personnel are available, the central station 155 dispatches the identified vehicle or loader to the maintenance shop for preventive maintenance work and/or notifies maintenance personnel to work on the loader 160.

(4) Vehicle Maintenance Using Code Entries

With reference to equipment maintenance, if so desired by mine management, equipment maintenance can be incorporated with the vehicle sensor processing unit 101 and the central station 155 data downloaded so that as equipment maintenance occurs, equipment maintenance costs can be accurately tracked, since the sensor processing unit 101 and the central station 155, via data downloading, will be tracking amount of equipment operating time, it will conversely be tracking equipment down time. As down time occurs, through the proper use of the operator number function of the sensor processing unit 101 and data downloading from this unit to a central station 155 with the driver number function, it is possible to identify why a piece of equipment is down and through the proper use of operator number codes as well as when a piece of equipment goes back into service, and as this data is generated for downloading to the central station 155 via the operator number code on keypad 122, the cost of all parts and supplies used during the time that the vehicle is out of service can be entered directly into the central station 155 via the operator of the central station, i.e., a vehicle is down for transmission repair. The code for transmission repair is entered, via the operator number code on keypad 122 into the sensor processing unit 101 for data downloading, when the vehicle goes back into service, the cost of parts and supplies to repair the transmission is entered into the central station via the operator of the station. If, however, the actual cost of transmission repairs is not immediately known as a vehicle goes back into service, when they do become known, the operator of the central station 155 can still enter the cost of parts and supplies, what they were for, and during what time period they were incurred so that the central station can go back and allocate for each period of equipment down time as identified from data downloaded from sensor processing unit 101, the cost of repair parts and supplies associated with that segment of equipment down time.

From the foregoing it will be appreciated that the on-board weighing device provides the sensor processing unit 101 with raw data that can be downloaded to a computer 155d for storage and analysis and then be refined to provide indications of vehicle and operator efficiency. By analyzing the parameters based on this downloaded raw data, the vehicle performance can be improved, thereby reducing the substantial cost of operating off-road, heavy duty vehicles.

XX. The System as Applied to a Refuse Hauling Vehicle

Turning now to an alternative embodiment of the invention, signposts fixedly located throughout a working site may be implemented by passive devices such as bar codes or RF transponders. In FIG. 25, a rear-loading refuse vehicle 220 includes a laser bar code reader 222 strategically mounted to the vehicle body 224 so when a dumpster 226 is lifted by a conventional loading mechanism (not shown) and its contents dumped into the body (as shown in dashed line), a bar code 228 mounted on the side of the dumpster is brought within sensing distance of the laser bar code reader. As in the embodiment of FIGS. 15a–15b, the location data may be used in connection with other data retrieved from on-board sensors to establish a data base from which vehicle commands may be generated and vehicle performance may be evaluated. In FIG. 25, the on-board weighing device of FIGS. 1a and 1b is placed between the body 224 and the frame 230 of the vehicle. Preferably, the fluid-filled tubing comprising the on-board weighing device includes two sections 200 and 202 on each beam member 232 of the frame.

In as much that the side view of FIG. 25 only allows illustration of one beam member 232 and one set of fore and aft fluid-filled tubings 200 and 202, respectively, it will be appreciated that the symmetrical nature of the refuse vehicle provides for a mirror-image configuration of the weighing device on the side of the vehicle not shown in FIG. 25.

Preferably, the fluid-filled tubing extends along substantially the entire length of the interface between the vehicle frame member 232 and body 224. For reasons explained hereafter, the tubing is broken into fore and aft sections 200 and 202. Preferably, the tubing supports the entire weight of the body 224 on the frame members 232.

In rear-loading refuse vehicles such as the illustrated vehicle 220, the loading mechanism typically extends substantially beyond the end of the frame 230 of the vehicle. Consequently, the center of gravity (CG) of the body 224 is located toward the back of the vehicle body as generally demarcated by the point CG in FIG. 25. In order to prevent the pressure sensor assembly from providing a distorted reading, the length of tubing supported on each beam member 232 of the frame of the vehicle is divided into two sections. The length of the forward section 200 is selected such that the center line $C_L$ for the section is always forward of the center of gravity CG. In complementary fashion, and the center line $C_L$ for the aft section 202 is always rearward of the center of gravity CG. The foregoing restrictions on the length of the two sections of tubing assures that transfer of weight from the body 224 to the frame member 232 is distributed along the length of the tubings 200 and 202.

Because the center of gravity, CG, is located toward the rear of the vehicle 220, the forward tubing 200 is considerably longer than the aft tubing 202. But, it will be appreciated that other configurations of bodies (such as a front-loading body) may be characterized by locations of the body's center of gravity, CG, that alter the length relationship between the forward and aft tubings 200 and 202, respectively.

Because the forward tubing 200 is much longer than the aft tubing 202 in FIG. 25, the pressure change for a given change in weight is different for each length of tubing. In order to relate the voltage changes in each pressure sensor connected to each tubing (the pressure sensors are the same type of sensors as pressure sensors 51a–c in FIG. 3), the ratio of the contact areas between the tubing and the body for the two portions 200 and 202 is used to provide an adjusted voltage from the pressure sensor associated with the shorter tubing which is the aft tubing 202 in the illustration. The adjusted voltage may be expressed as $$\Delta V_R \text{ (adjusted)} = \Delta V_R \cdot P_F \quad (12)$$

where $P_F$ equals the ratio of the contact areas of the forward and aft tubings 200 and 202, respectively, and $\Delta V_R$ is the raw voltage from the pressure sensor associated with the aft tubing 202.

In order to determine the weight on the front and rear axles, simple moment arm calculations are made about each axle. For the situation shown in FIG. 25 where the center line $C_L$ of the aft tubing 202 is behind the rear axle, the moment arm equations are that of a third class lever arm. Therefore, the moment about the rear axle may be expressed as, $$\Delta V_1 \text{(Front axle)} = \Delta V_F \cdot \frac{D_{RF}}{W_B} - \Delta V_R \text{(adjusted)} \cdot \frac{D_{RR}}{W_B} \quad (13)$$

where $\Delta V_F$ is the sum of the raw voltages from the pressure sensors associated with the two forward tubings 200 supporting the vehicle body 224 and $\Delta V_R$ (adjusted) is the sum of the adjusted voltages from the pressure sensors associated with the two aft tubings 202. $D_{RF}$ is the distance between the rear axle and the center line $C_L$ of the foreward tubing 200 in FIG. 25, and $D_{RR}$ is the distance between the rear axle and the center line $C_L$ of the aft tubing 202 in FIG. 25. Solving for $\Delta V_1$ in equation (5) will give the voltage that when converted to weight is the weight on the front axle. The denominator value $W_B$ is the wheel base of the vehicle 220 as indicated in FIG. 25.

For the weight over the rear axle, a simple moment arm equation is set up about the front axle, and it may be expressed as, $$\Delta V_2(\text{Rear axle}) = \Delta V_F \cdot \frac{D_{FF}}{W_B} + \Delta V_R(\text{adjusted}) \cdot \frac{D_{FR}}{W_B} \quad (14)$$

where $D_{FF}$ is the distance from the center line $C_L$ of forward tubing 200 to the front axle of the vehicle 220 in FIG. 25, and $D_{FR}$ is the distance from the front axle to the center line $C_L$ of the aft tubing 202. Solving for $\Delta V_2$ gives a voltage that when converted to weight is equal to the weight on the rear axle.

It will be appreciated that the foregoing moment equations are for a third class lever since the center of the aft tubing 202 is behind the rear axle of the vehicle 220 in FIG. 25. IF the center line $C_L$ of the aft tubing 202 is forward of the rear axle, the system is modeled as a second class lever and the equations should be modified accordingly.

The total weight of the body 224 can be found by summing the voltages representing the weights over the front and rear axles $$V_T = \Delta V_1 + \Delta V_2 \quad (15)$$

and converting the total voltage $V_T$ to a weight measurement.

Figure 26:
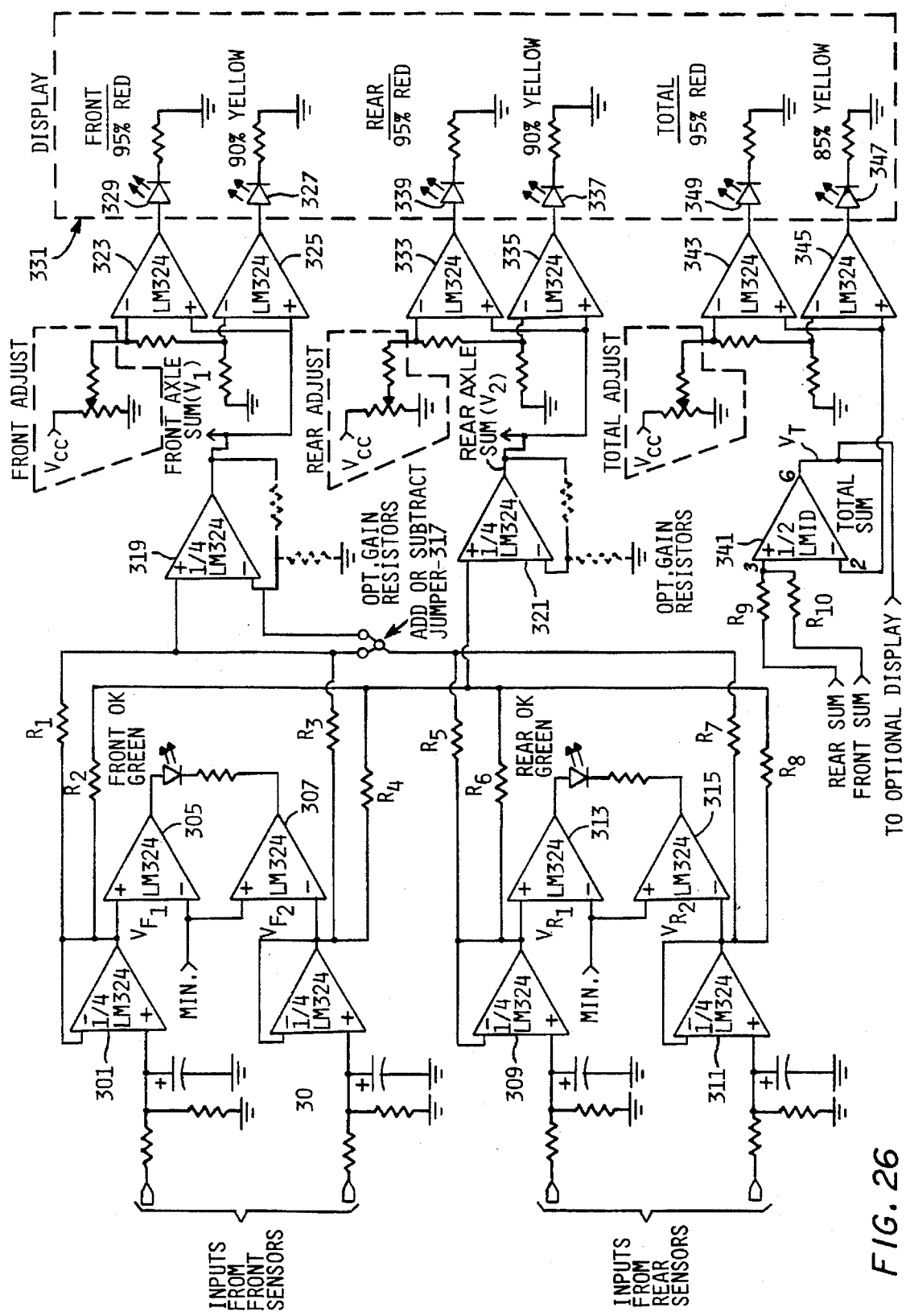
FIG. 26 is a schematic diagram of a sensor processing unit for receiving and processing load data from the on-board weighing device associated with the vehicle illustrated in FIG. 25.

In order to provide front and rear axle weight readings and total weight readings in accordance with equations 12 through 15, a circuit made up of discrete operational amplifiers is preferably used if data recording or downloading is not required. Such a circuit is shown in FIG. 26. If data is to be recorded and downloaded to the central station 155, the sensor processing unit 101 in FIG. 12 is used in place of the op-amp circuitry as shown in FIG. 26.

Turning first to FIG. 26, each of the on-board weighing devices 200 and 202 on each side of the vehicle 220 is assumed to have one pressure sensor associated with it. Specifically, the two front on-board weighing devices 200 (only one of which is shown in FIG. 25) have one corresponding pressure sensor (they are not tied together) that provides one voltage to the circuitry of FIG. 26. Likewise, the two rear on-board weighing devices 202 have two corresponding pressure sensors that provide two voltages to the circuitry of FIG. 26. The particular operational amplifier circuit illustrated in FIG. 26 is for the situation where the forward and aft tubings 200 and 202 are of equal lengths. Certain obvious design modifications would be required for tubings of different lengths.

The voltage from the front sensor is received by operational amplifier 301 in a buffer or unity-gain amplifier configuration. Operational amplifier 305 is in comparator configuration and receives the unity-gain output from the op-amp 301, respectively. A reference voltage (MIN) is provided to the comparator 305 in order that a green LED mounted to the housing for the circuit of FIG. 26 is always lit when the voltage from the front sensor is greater than a predetermined minimum voltage. By providing a check for minimum voltage from the front sensor, the vehicle driver can easily verify the front sensor is correctly functioning when the green LED is lit.

The foregoing arrangements of operational amplifiers is duplicated for the voltages from the sensors for the rear on-board weighing devices 202. Specifically, operational amplifiers 309 and 311 are configured as unity-gain amplifiers or buffers that receive the voltages from the rear sensors in a conventional manner. Operational amplifiers 313 and 315 are configured as comparators in order to determine if the voltage from the two rear sensors exceeds a minimum predetermined value. A green LED is also provided for the rear sensors.

The voltages $V_{F1}$, $V_{R1}$ and $V_{R2}$ at the outputs of each of the buffer op-amps correspond to the voltages from the load sensors associated with the four fluid-filled tubings 200 and 202. By summing these voltages in a manner corresponding to the moment equations (12) through (15), a value for front and rear axle weight and total weight may be calculated. In order to implement the equations, the values of resistors $R_1$ through $R_{10}$ should correspond to the following load dimension ratios:

$R_1$ = Front axle load/total load
$R_2$ = Rear axle load/total load
$R_3$ and $R_6$ = Distance from $C_L$ of aft tubing 202 to front axle/wheel base
$R_4$ and $R_5$ = Distance from $C_L$ of aft tubing 202 to rear axle/wheel base
$R_7$ and $R_{10}$ = Distance from $C_L$ of forward tubing 200 to rear axle/wheel base
$R_8$ and $R_9$ = Distance from $C_L$ of forward tubing 200 to front axle/wheel base Depending on whether the system is a second or third class lever as discussed above, the jumper connection 317 is strapped to either the plus or minus input of a summing amplifier 319 in order to provide the voltage $V_1$ (equation 13), corresponding to the weight of the front axle. For the voltage $V_2$ corresponding to the weight over the rear axle (equation 14), summing amplifier 321 receives the voltage $V_{F1}$, $V_{R1}$ and $V_{R2}$ via resistors $R_2$, $R_6$ and $R_8$, respectively. Because the moment equation about the front axle is the same for both second and third class levers, there is no need for a jumper connection similar to that associated with summing amplifiers 319.

A pair of operational amplifiers 323 and 325 in comparator configurations compare the voltage $V_1$ with predetermined reference voltages in order to activate LEDs 327 and 329 mounted on a panel display 331 inside the cab of the vehicle 220. The LEDs 327 and 329 indicate when the load over the front axle has reached 90% and 95% of maximum allowable load. Similarly, operational amplifiers 333 and 335 are in comparator configurations for comparing the voltage $V_2$ with predetermine voltages representing 90% and 95% of the maximum load for the rear axle. LEDs 337 and 339 are provided on the panel display 331 and are responsive to op-amps 335 and 333.

Finally, summing amplifier 341 receives the voltages $V_1$ and $V_2$ and provides an output voltage $V_T$ that corresponds to the total weight of the body 224. As with the front and rear axle weights, comparators 343 and 345 provide indications of when the total weight exceeds predetermined maximum total weights (e.g., 85% and 95% in FIG. 26). LEDs 347 and 349 provide a visual display on the display panel 331.

For a system according to the invention wherein the location data retrieved from the bar codes is used in connection with front and rear axle and total weight measurements in order to generate a data base from which command signals may be generated, the sensor processing unit 101 of FIG. 3 is fed by the circuit of FIG. 26. FIG. 27 illustrates a block diagram of the hardware necessary to implement the invention on the refuse vehicle 220 of FIG. 25.

Referring to FIG. 27, the system for downloading data from the refuse vehicle 220 is identical to the system shown in FIG. 17, except the IR transceivers are replaced by the bar code 228 and the laser bar code reader 222 or RF transponder 228 and RF transponder antenna 222. In a similar manner as the sensor block 350 in FIG. 17, sensors 351 include the same type of sensors shown in FIG. 3. In addition, the circuit of FIG. 26 may be included in the sensor block 351 in order to provide additional analog data to the sensor processing unit 101. This data, plus location data from the bar code reader 222, are organized by the sensor processor unit 101 and transferred to an on-board RF transceiver 150 via a modem 352.

As in FIG. 17, the link between each on-board sensor processor 101 and the central station 155 is provided by a data link similar to the Telxon RF/FM Data Communication System of Telxon Corporation, 3330 W. Market St., Akron, Ohio 44313. At the central station 155; the transceiver 155a, modem 155b and controller program 155c are the same as those in FIG. 17. The computer 155d executes software for monitoring and controlling the refuse vehicles in a manner similar to the flowchart diagrams of FIGS. 20–24 for the open-pit mining environment. Unlike the open-pit mining environment, the dispatch decision is considerably simplified since most refuse vehicles follow a predetermined route. But, it will be understood that the tracking of vehicle location and the execution of exception reporting steps are similar to that of the open-pit mining environment.

It will be appreciated from the foregoing description, that the invention correlates values of predetermined operating parameters recorded by sensors on-board a haulage vehicle so as to provide historical data bases such as the four primary files of FIGS. 19a–19d. From these files, each vehicle can be managed to achieve a desired management goal at a level of attainment heretofore not possible. Data bases may be kept on-board each vehicle or downloaded to a central station to be combined and compared with data from other vehicles. Downloading data provides management an opportunity to make decisions within a time frame which approaches a "real-time" response—i.e., an immediate response to any condition. For example, a central station that receives data from each vehicle can monitor certain operating parameters and report to an operator when values for these parameters are outside a range of accepted values. By providing such "exception reporting", the operator is immediately alerted to situations that if left uncorrected may potentially damage the vehicle. As a further use of the "real-time" feature of downloading data, dispatching of vehicles can be achieved so that the alternative routings of a vehicle are evaluated by using the historical data base and commands are issued to the vehicle for its most efficient route given the hauling conditions at that time as reflected by the data base.

In summary, the on-board sensors and the historical data bases of the invention provide a broad range of options regarding the monitoring and control-of haulage vehicles. In its simplest form, the data base is merely collected on-board the vehicle and manually "downloaded" to management either by way of a printed report from the on-board printer 117 or a machine-readable report contained in a magnetic storage device (e.g., tape cassette). By adding a data link to a central station, the data bases from the various vehicles in a fleet can be downloaded automatically either on a virtual realtime basis or at a particular time of day such as an end of shift. Exception reporting can be implemented by management by analyzing the collected data and flagging occurrences of hauling parameters falling outside a range of values which have been predetermined as acceptable. If data is collected continuously, management can be alerted to these occurrences as they happen, thereby allowing an operator of the central station to contact the operator of the vehicle in order to correct or control the situation. Finally, real-time downloading can be used in a fully automated control scheme where each vehicle is routed by a centrally located computer which analyzes the collected data in accordance with algorithms developed to implement a management goal.

What is claimed is:

1. An apparatus on-board a haulage vehicle for identifying and recording as an event a change in a load hauled by the vehicle, the apparatus comprising: a first sensor on-board the vehicle for interrogating a device having a machine-readable code and retrieving the code in conjunction with the event; a second sensor on-board the vehicle for sensing the change in the load and generating data indicative thereof; an electronic processor on-board the vehicle responsive to the first and second sensors for (1) collecting the data and the machine-readable code, (2) correlating the data and the code and (3) compiling a historical record of the events for later use; and a memory in communication with the electronic processor for containing the historical record.

2. The apparatus as set forth in claim 1 including a mechanism for adding material to the load hauled by the vehicle and bringing the device having the machine-readable code into close proximity with the first sensor in order for the first sensor to successfully retrieve the code only in conjunction with the adding of material to the load.

3. The apparatus as set forth in claim 2 wherein the material added to the load is from a container to which is secured the device having the machine-readable code.

* * * * *